United States Patent [19]

Schlosser et al.

[11] 3,879,581

[45] Apr. 22, 1975

[54] PROCESSING REPEATER FOR TDMA COMMUNICATION SYSTEM

[75] Inventors: Leslie H. Schlosser, Los Angeles; James B. Reeves, Reseda, both of Calif.

[73] Assignee: Hughes Aircraft Company, Culver City, Calif.

[22] Filed: Nov. 24, 1972

[21] Appl. No.: 309,371

[52] U.S. Cl. .......... 179/15 BS; 325/4

[51] Int. Cl. .......... H04j 3/06

[58] Field of Search .......... 179/15 BS; 325/4; 178/69.5 R

[56] References Cited

UNITED STATES PATENTS

| | | | |
|---|---|---|---|
| 3,639,838 | 2/1972 | Kuhn | 325/4 |
| 3,730,998 | 5/1973 | Schmidt | 179/15 BS |
| 3,742,498 | 6/1973 | Dunn | 179/15 BS |

*Primary Examiner*—Ralph D. Blakeslee
*Attorney, Agent, or Firm*—John M. May; W. H. MacAllister, Jr.

[57] ABSTRACT

The present invention relates to a processing repeater for use in a TDMA communication system which is capable of providing the individual data terminals with synchronization error measurements and other control data. In the particular embodiment disclosed, the processing repeater is also capable of receiving a narrowband coarse synchronization signal from an inactive data terminal in response to an interrogation command, thereby permitting rapid initial synchronization to be achieved. The disclosed processing repeater is also capable of controlling the demand assignment process for the allocation; of time slots in response to either narrowband or wideband call requests from inactive or active data terminals respectively.

6 Claims, 57 Drawing Figures

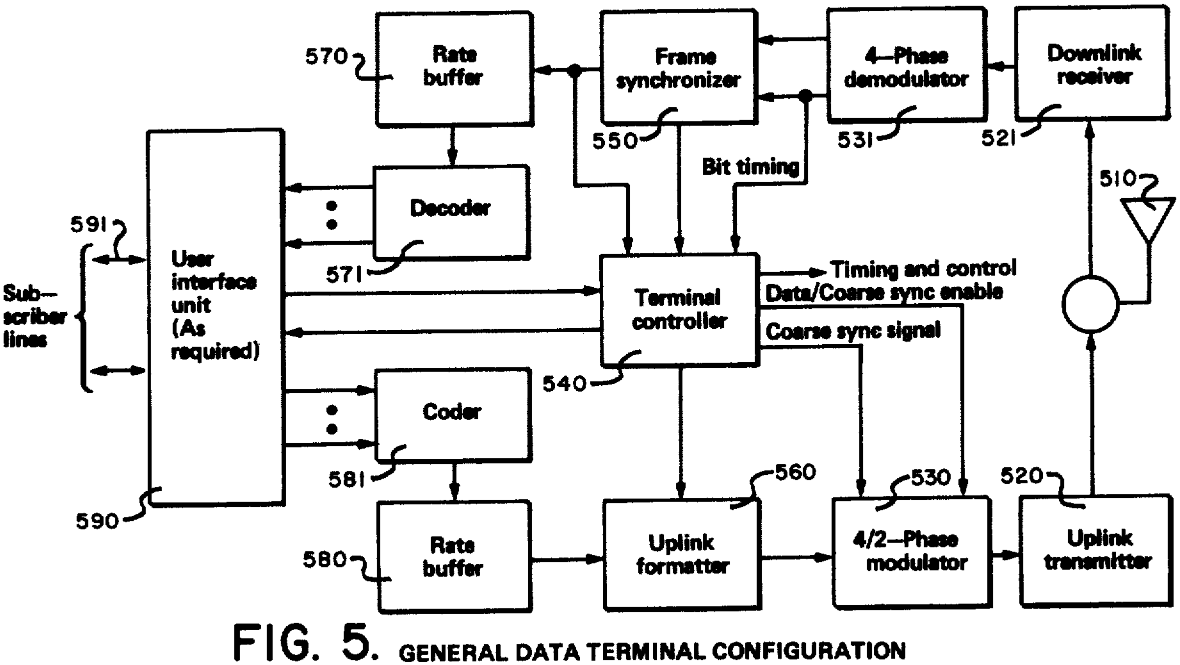
FIG. 5. GENERAL DATA TERMINAL CONFIGURATION
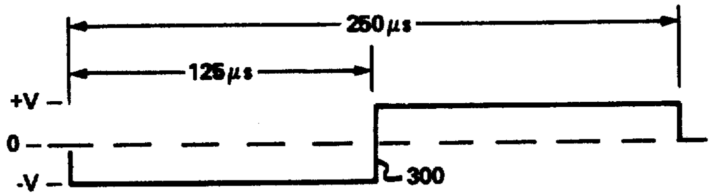
FIG. 3. COARSE SYNC SIGNAL
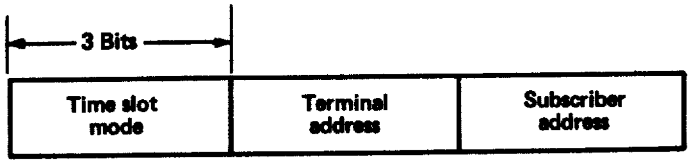
FIG. 17. MEMORY DATA WORD FORMAT
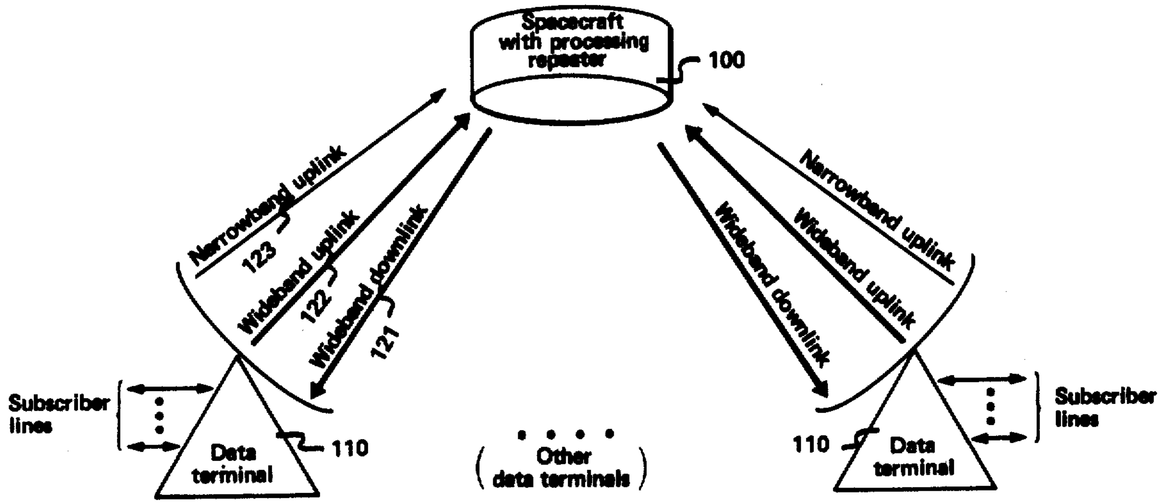
FIG. 1. S2TDMA COMMUNICATION SYSTEM

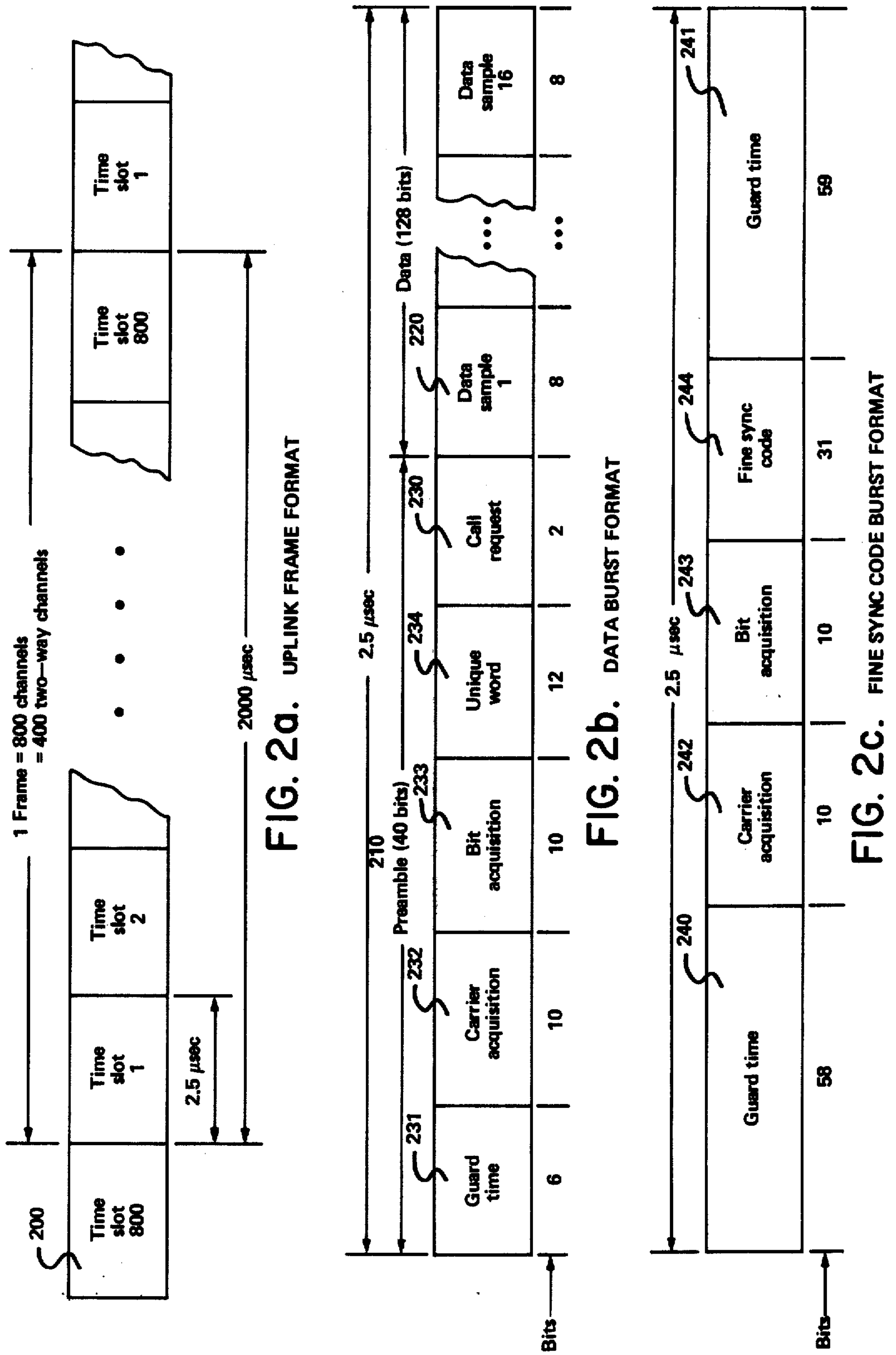
FIG. 2a. UPLINK FRAME FORMAT, FIG. 2b. DATA BURST FORMAT, FIG. 2c. FINE SYNC CODE BURST FORMAT

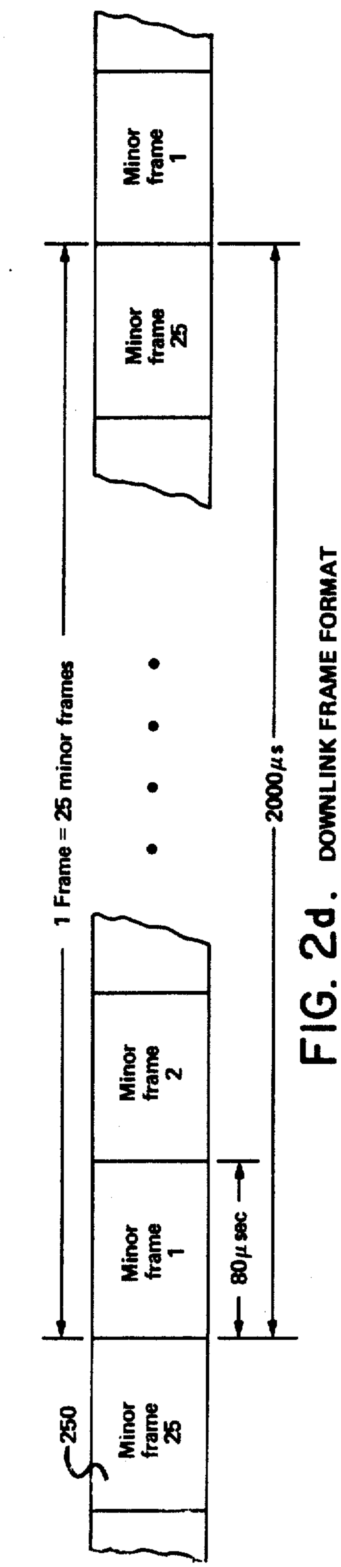
FIG. 2d. DOWNLINK FRAME FORMAT
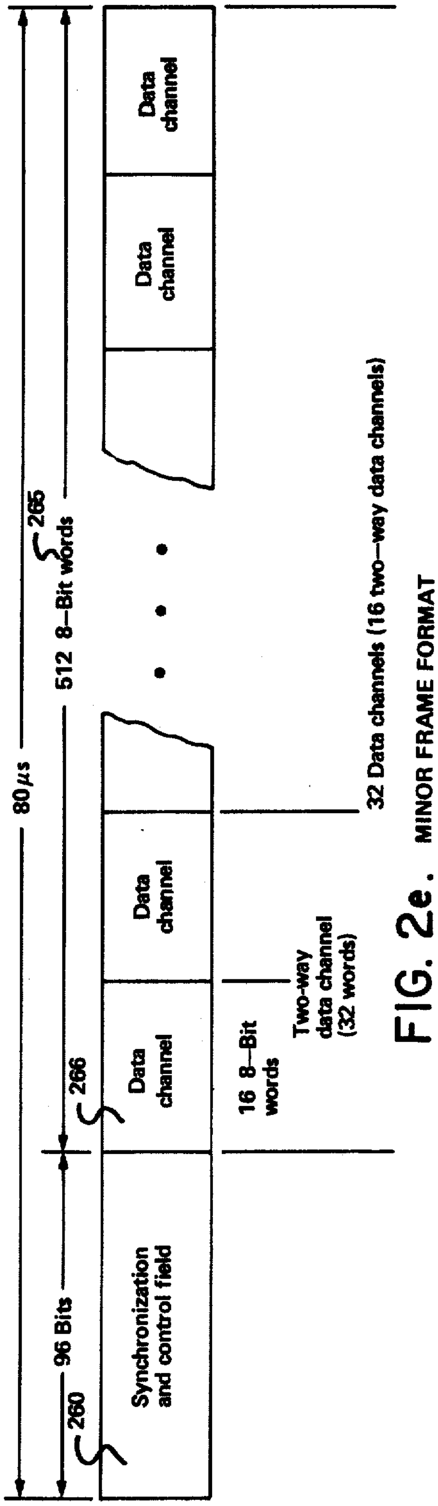
FIG. 2e. MINOR FRAME FORMAT
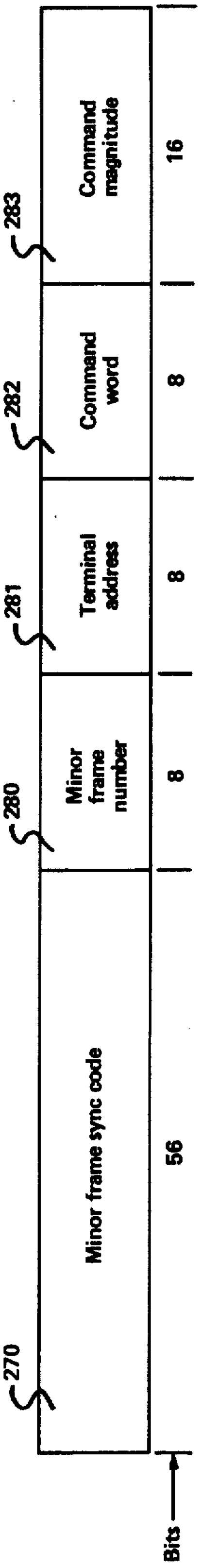
FIG. 2f. SYNCHRONIZATION AND CONTROL FIELD

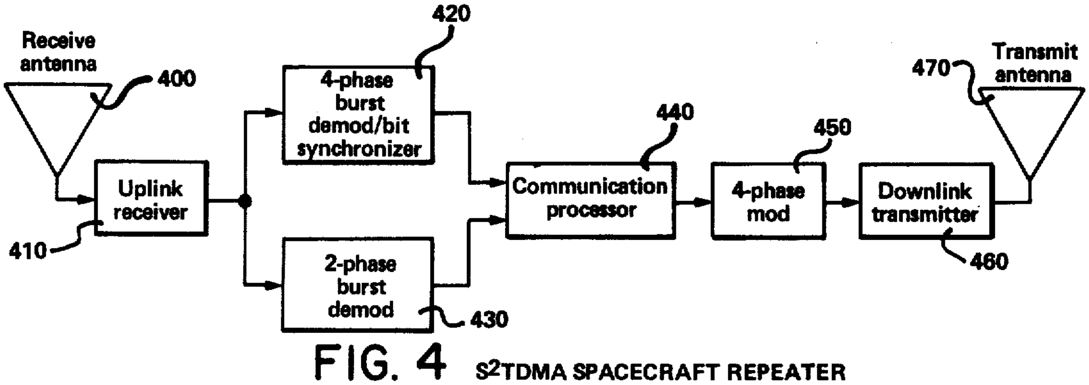
FIG. 4 S2TDMA SPACECRAFT REPEATER
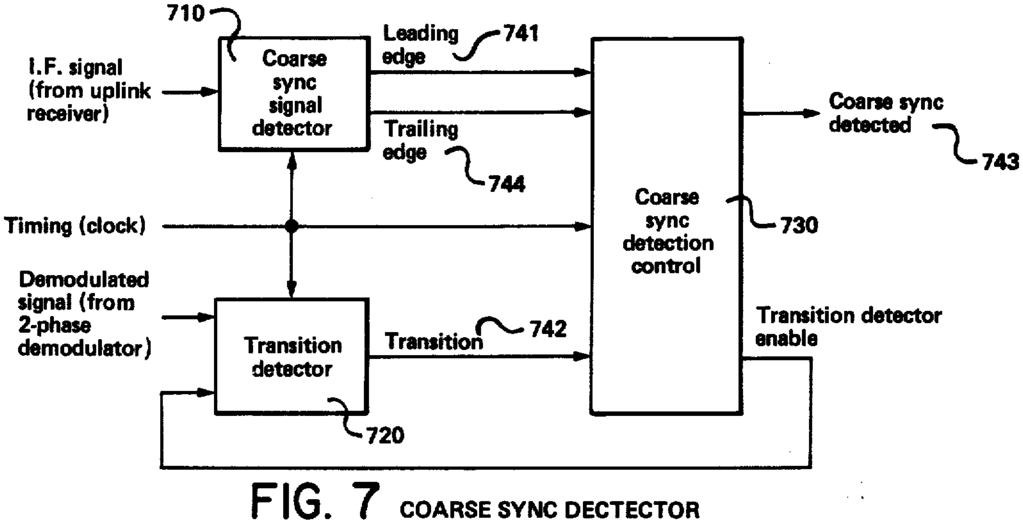
FIG. 7 COARSE SYNC DECTECTOR
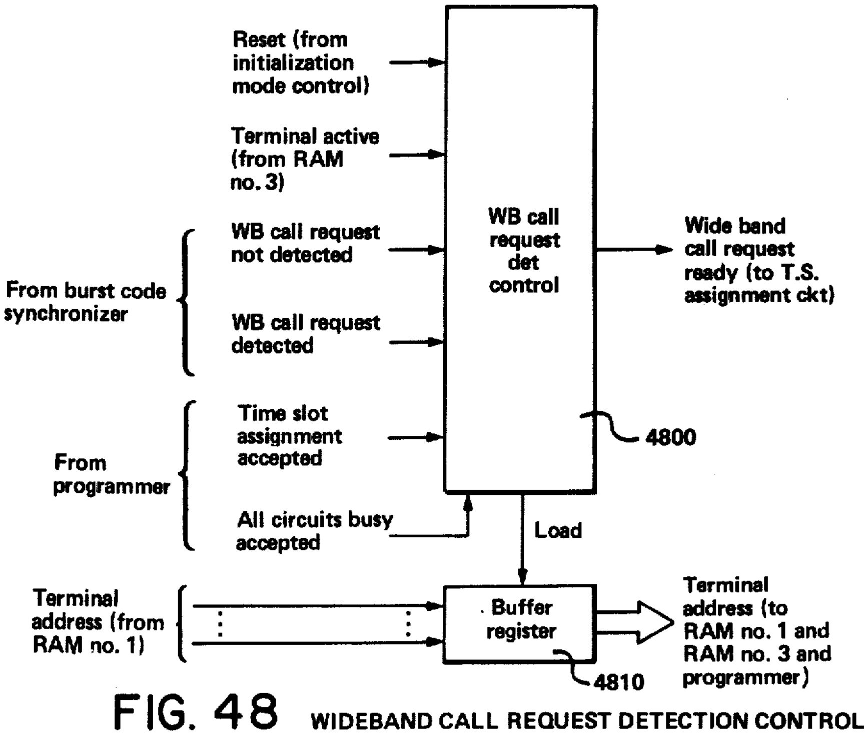
FIG. 48 WIDEBAND CALL REQUEST DETECTION CONTROL

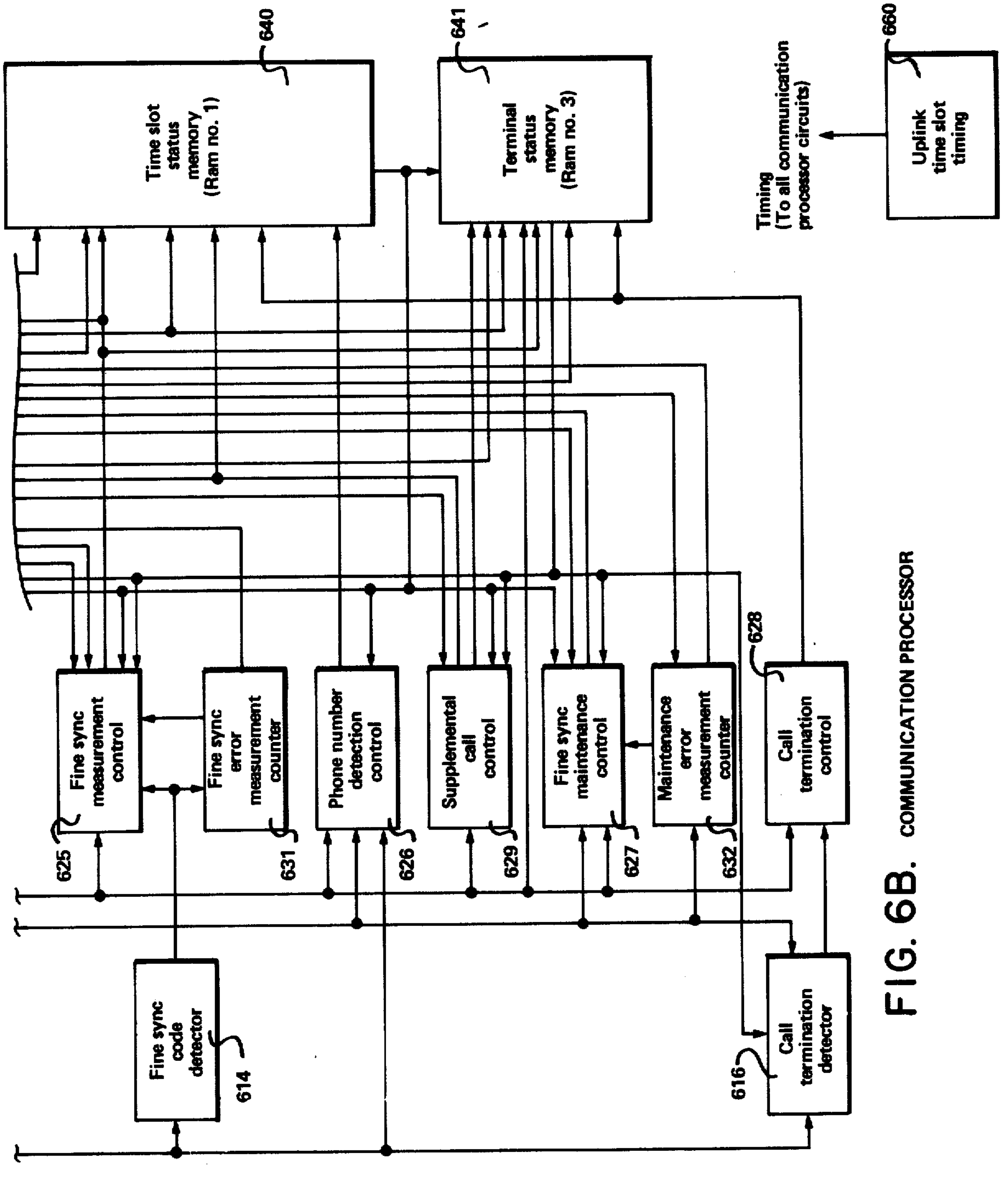
FIG. 6B. COMMUNICATION PROCESSOR

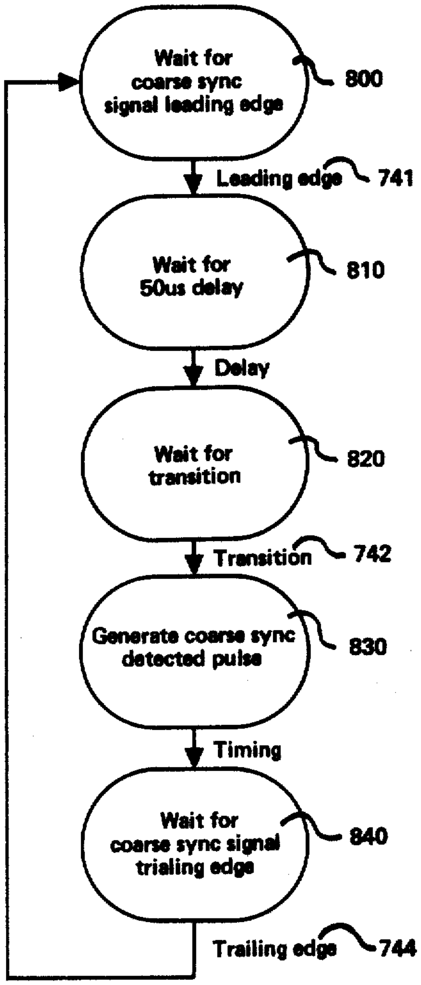
FIG. 8 COARSE SYNC DETECTION
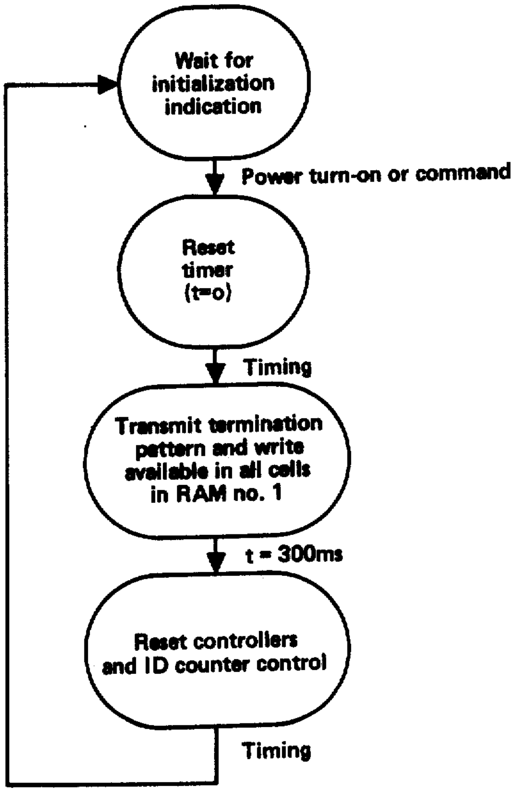
FIG. 21 INITIALIZATION CONTROL

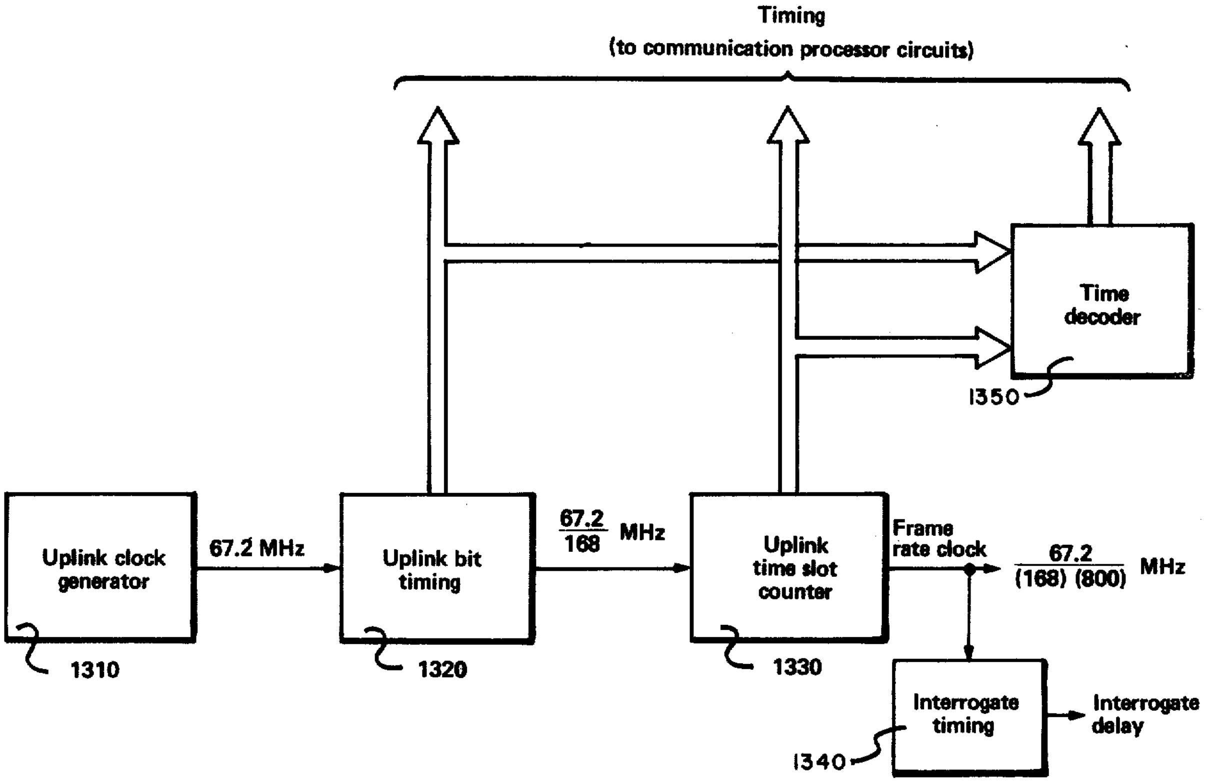
FIG. 13 UPLINK TIME SLOT TIMING
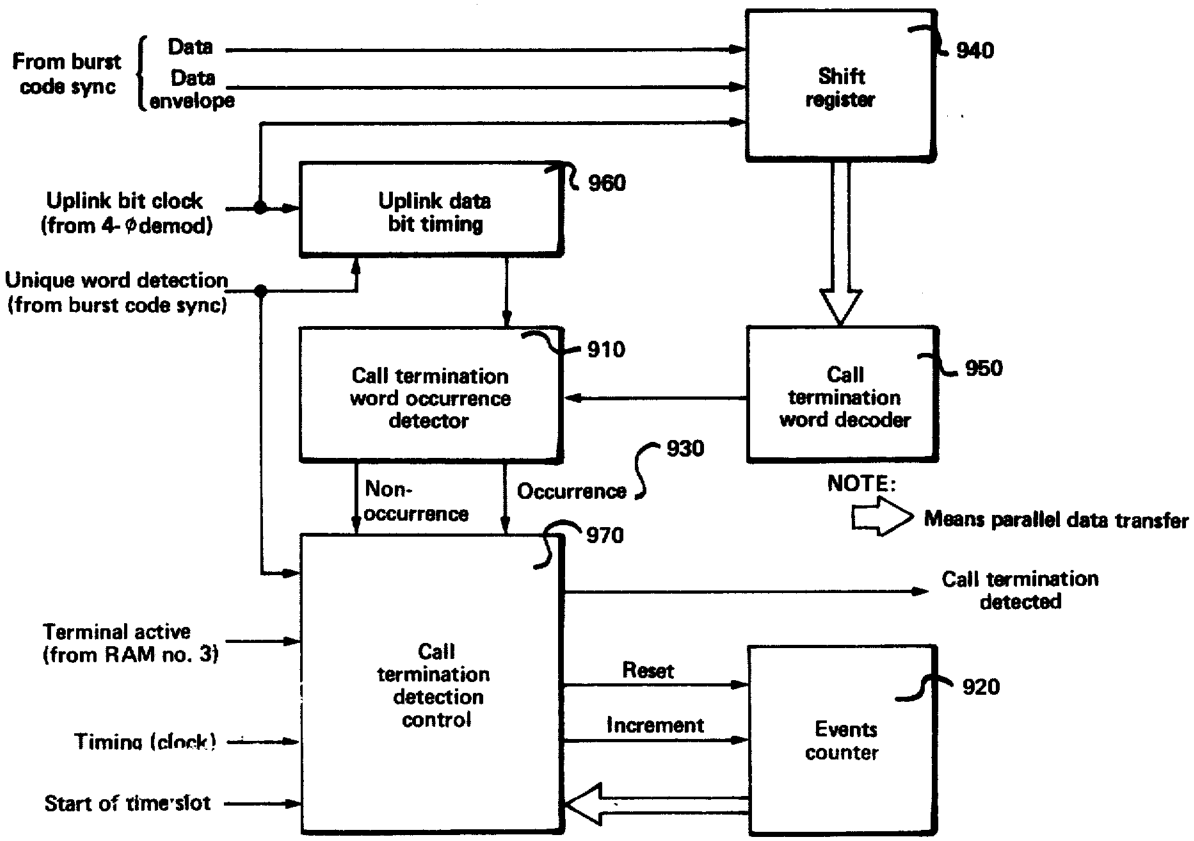
FIG. 9 CALL TERMINATION DETECTOR

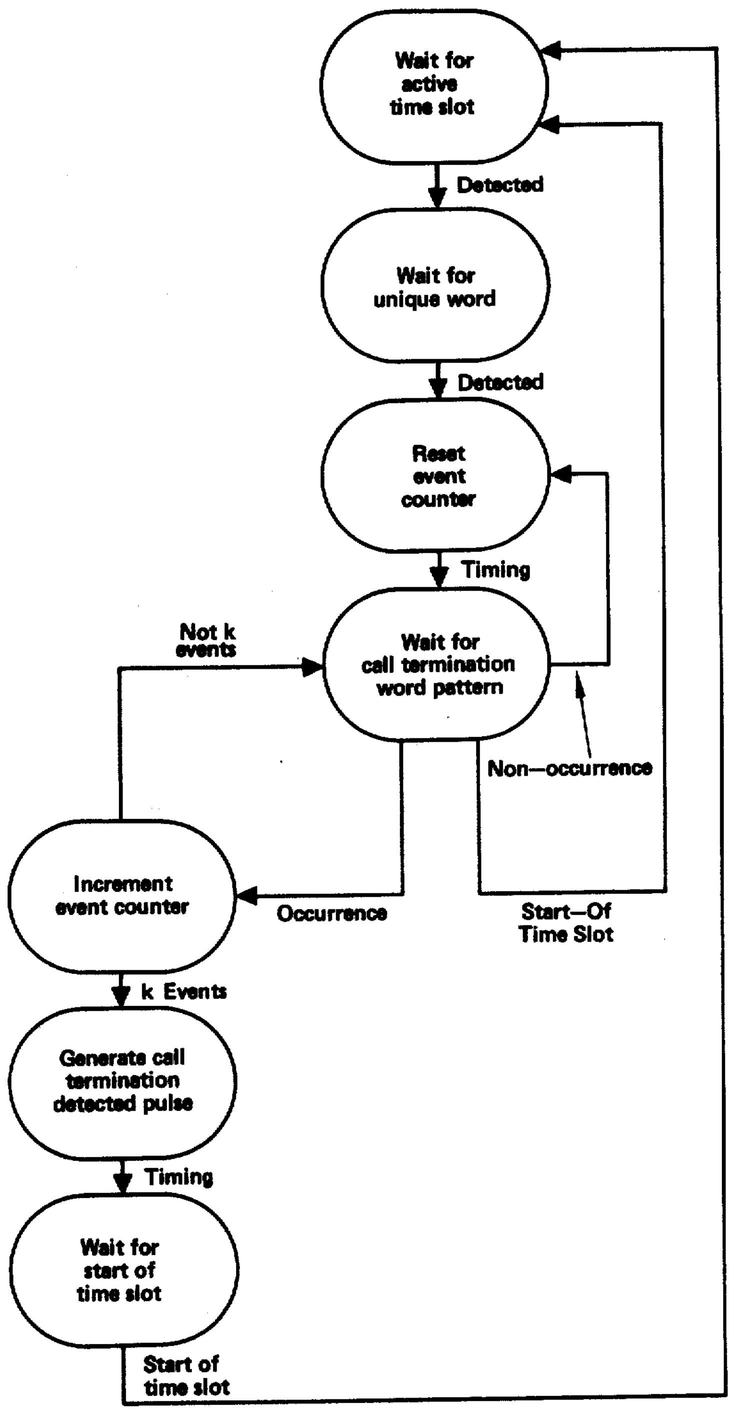
FIG. 10 CALL TERMINATION DETECTION

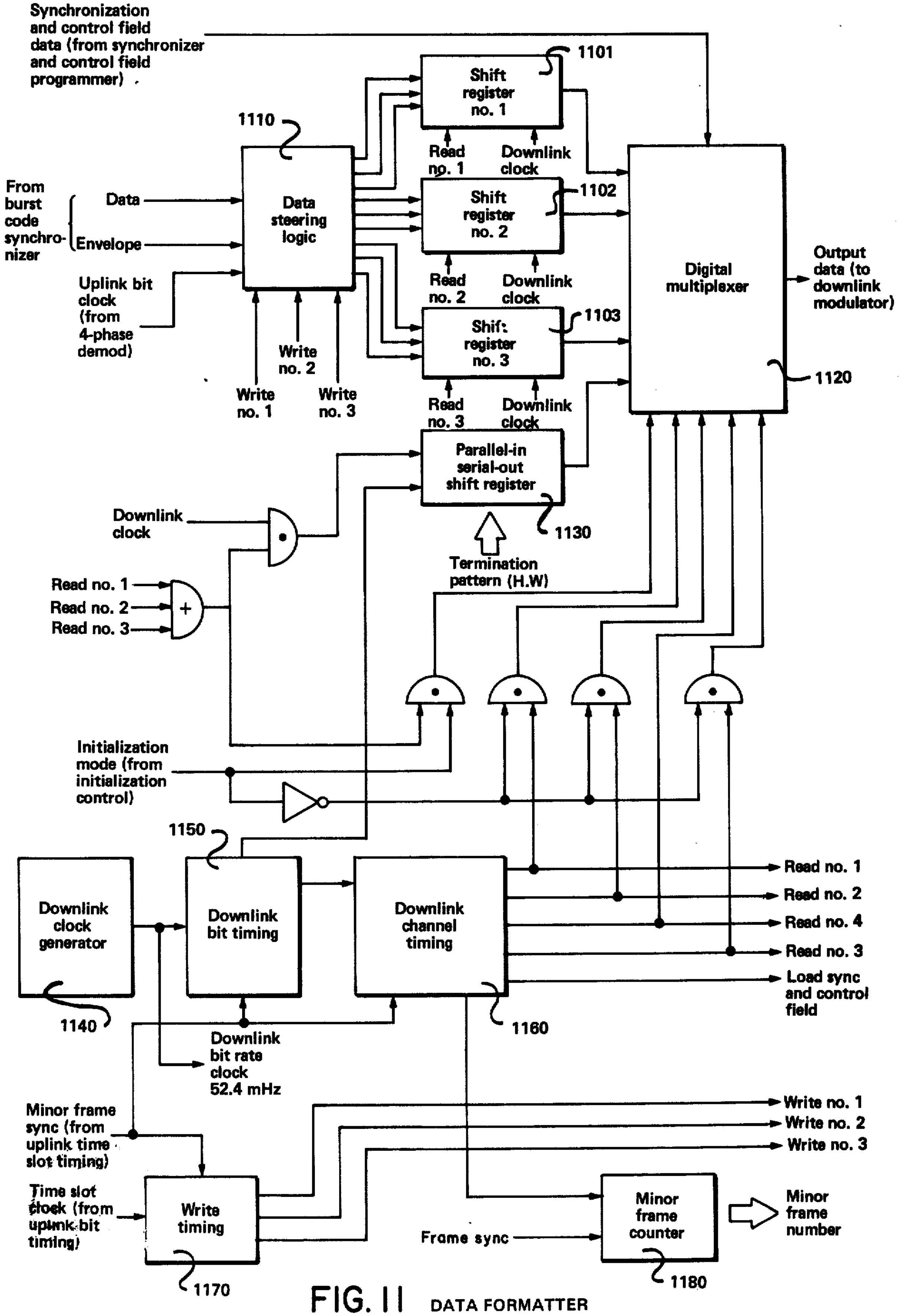
FIG. 11 DATA FORMATTER

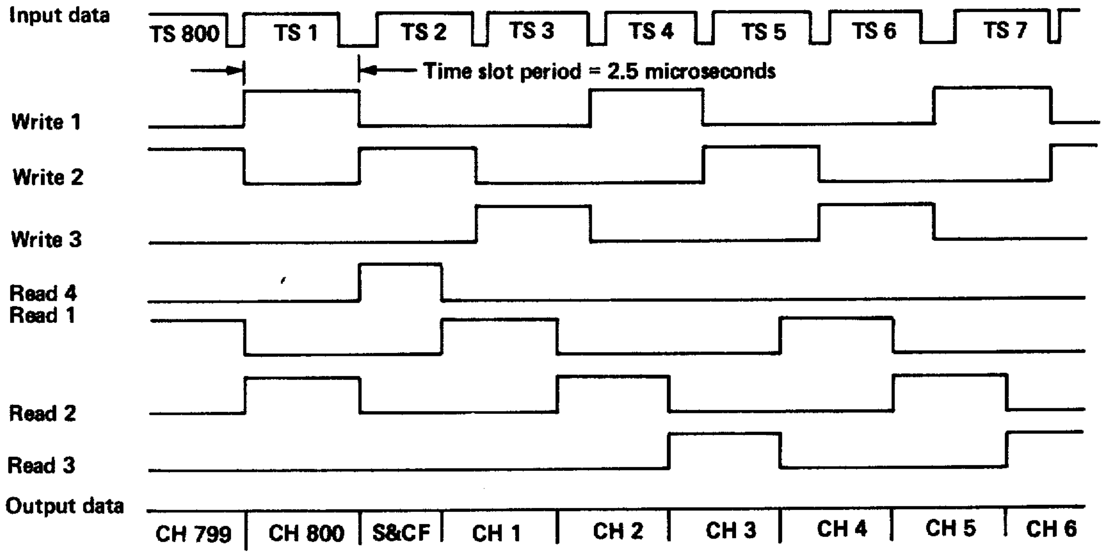
NOTES:
1. 1 Minor frame = 32 time slots
2. 1 Frame = 800 time slots
FIG. 12 DATA FORMATTER TIMING
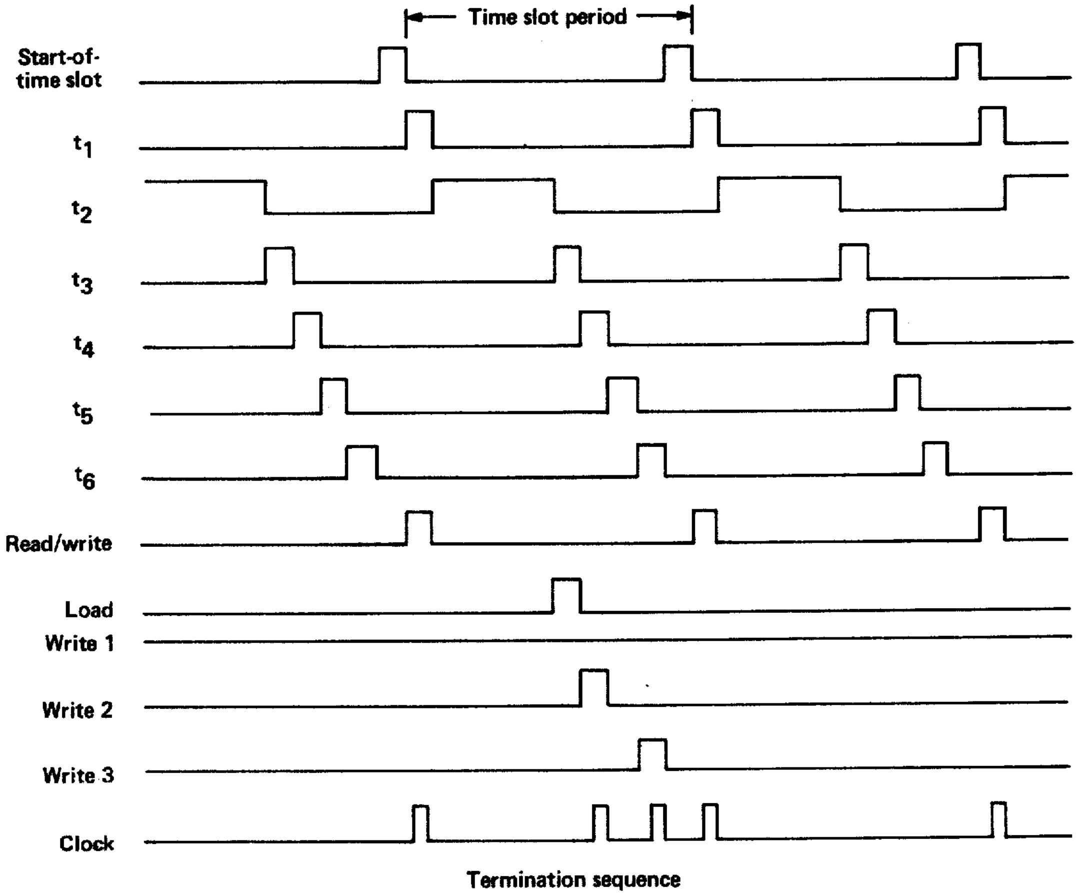
FIG. 19 TIME SLOT STATUS MEMORY CONTROL TIMING

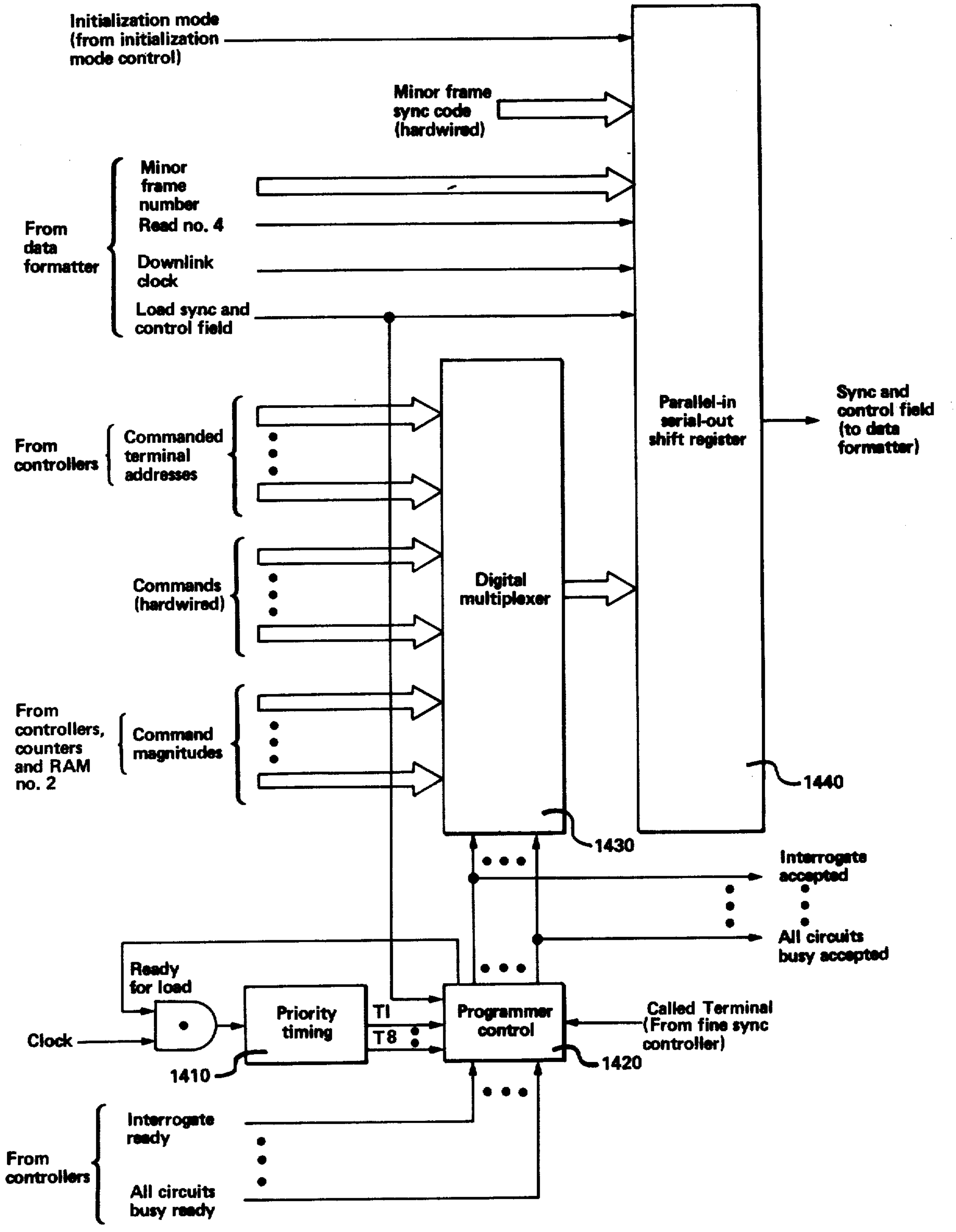
FIG. 14 SYNCHRONIZATION AND CONTROL FIELD PROGRAMMER

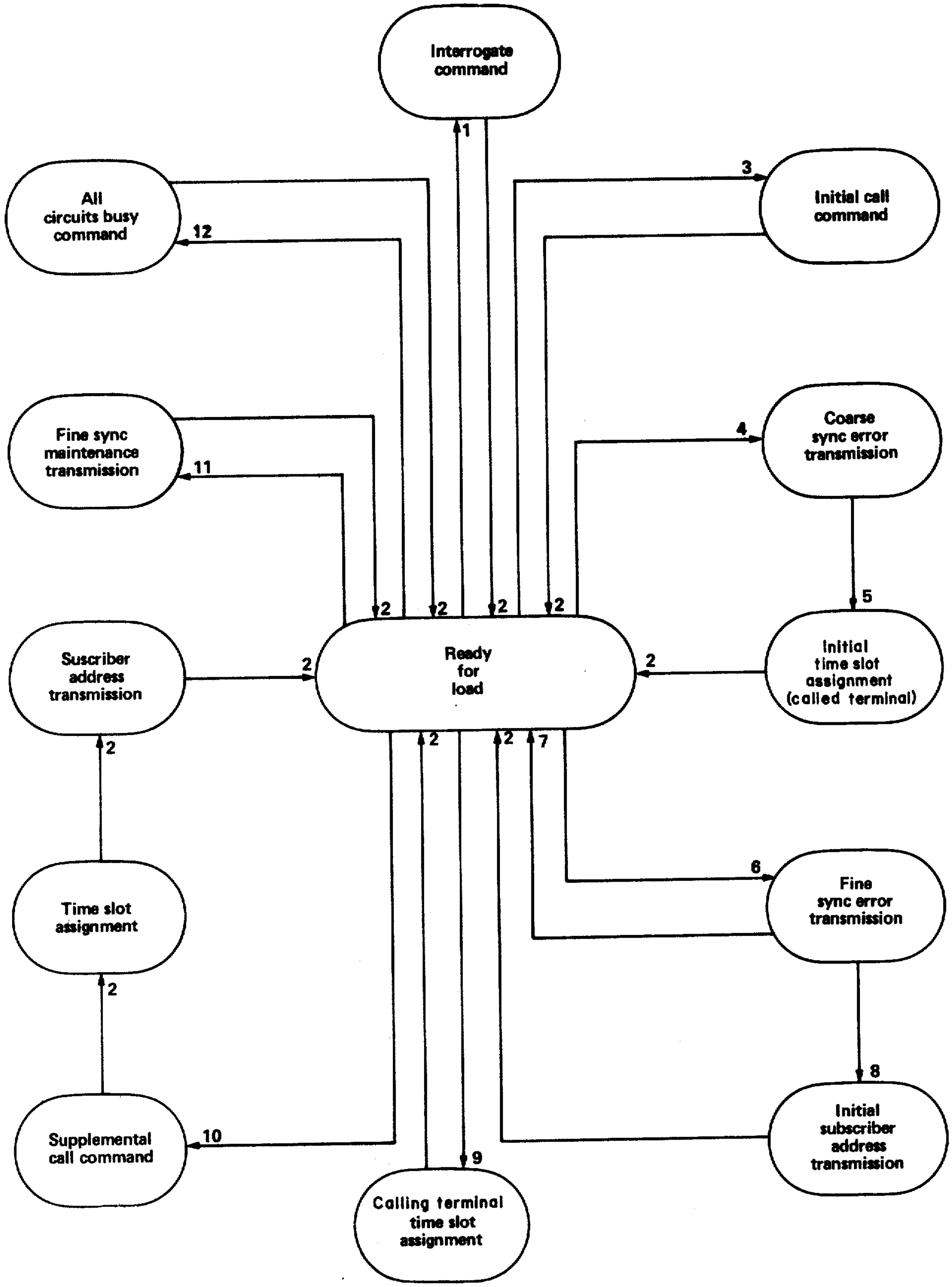
FIG. 15 SYNCHRONIZATION AND CONTROL FIELD PROGRAMMER

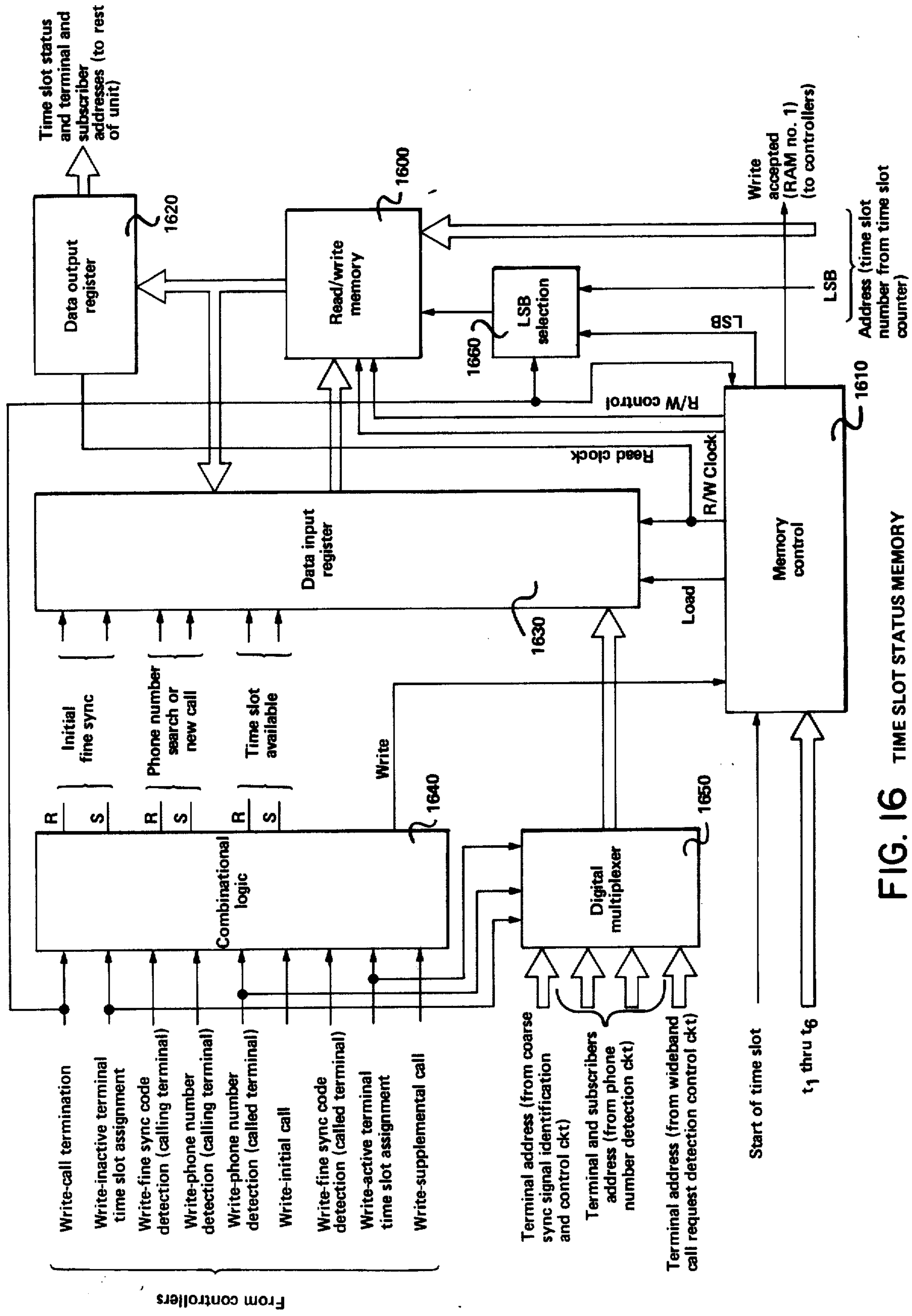
FIG. 16 TIME SLOT STATUS MEMORY

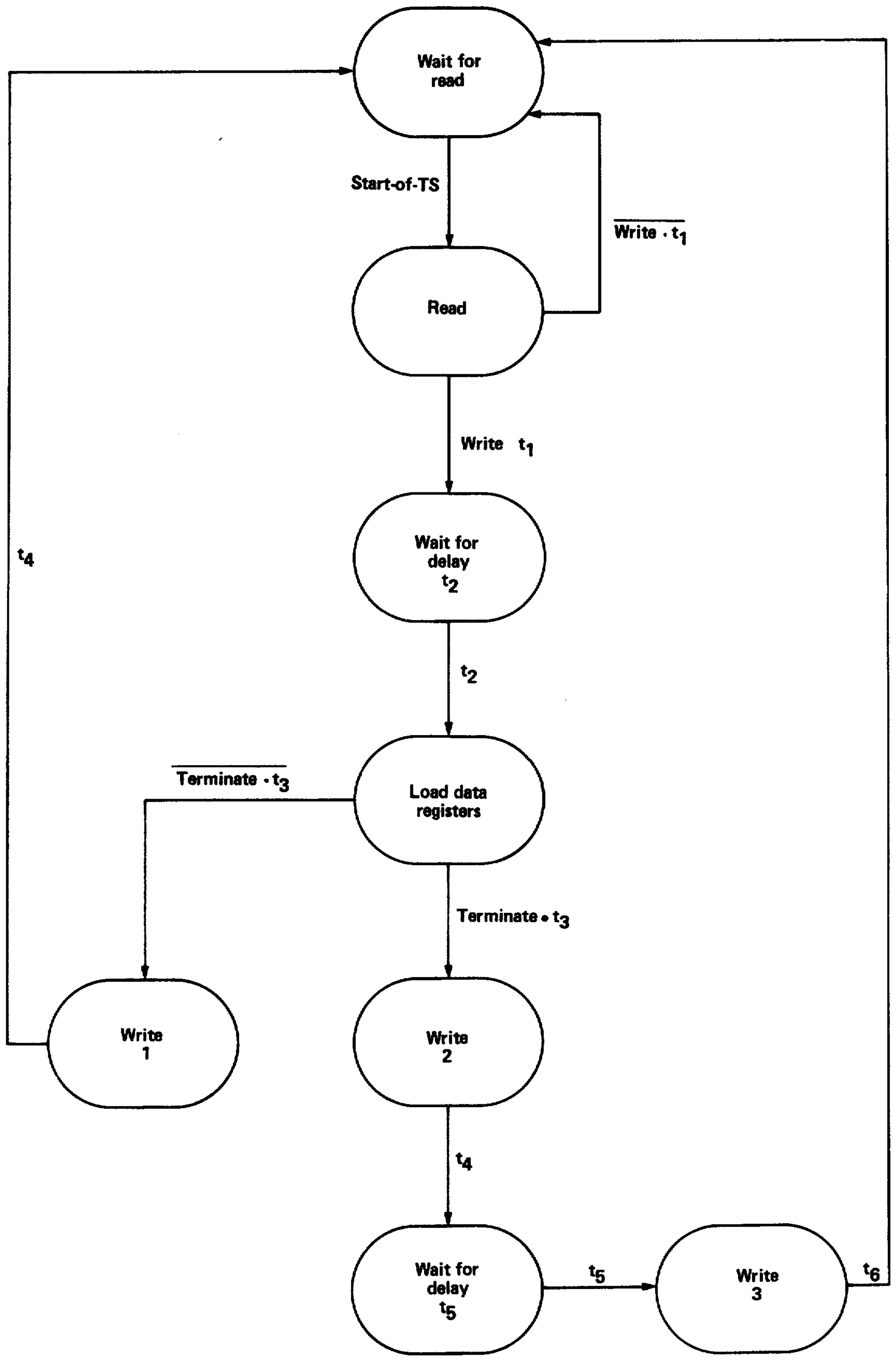
FIG. 18 TIME SLOT STATUS MEMORY

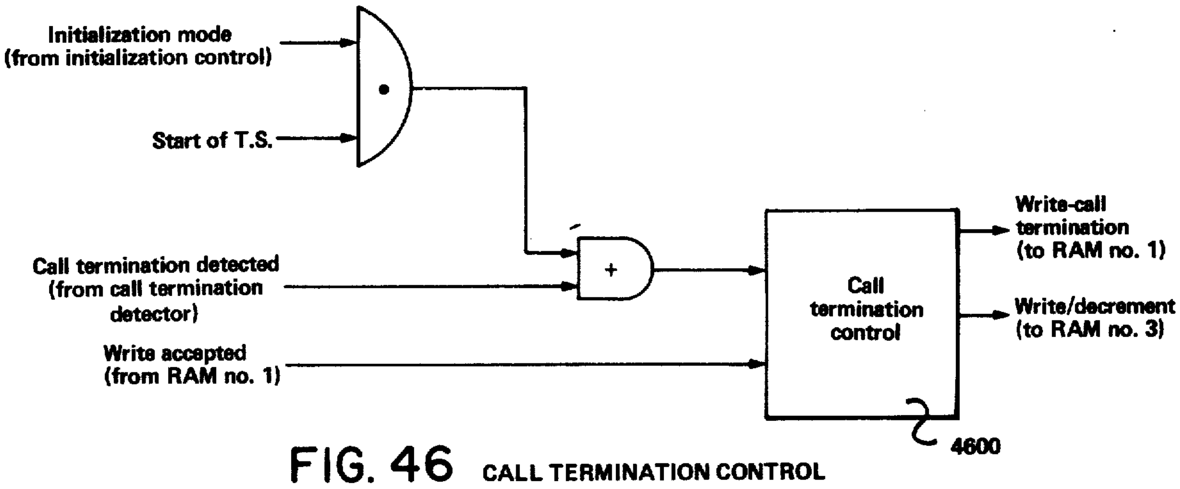
FIG. 46 CALL TERMINATION CONTROL
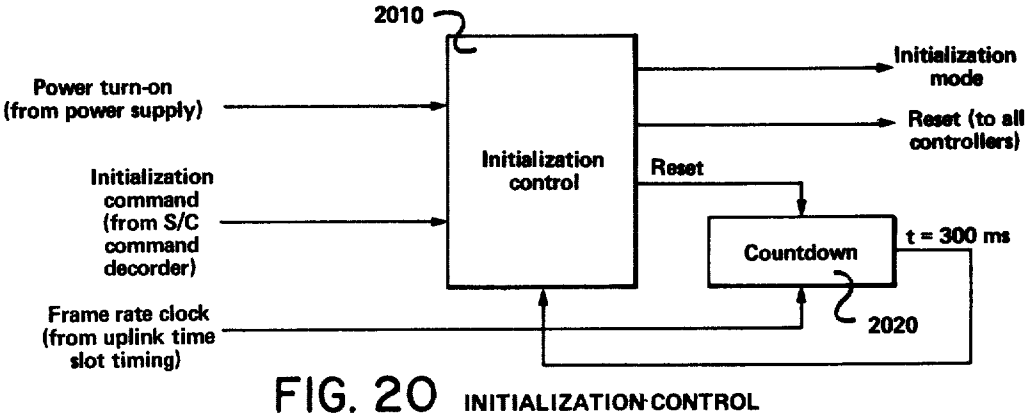
FIG. 20 INITIALIZATION CONTROL
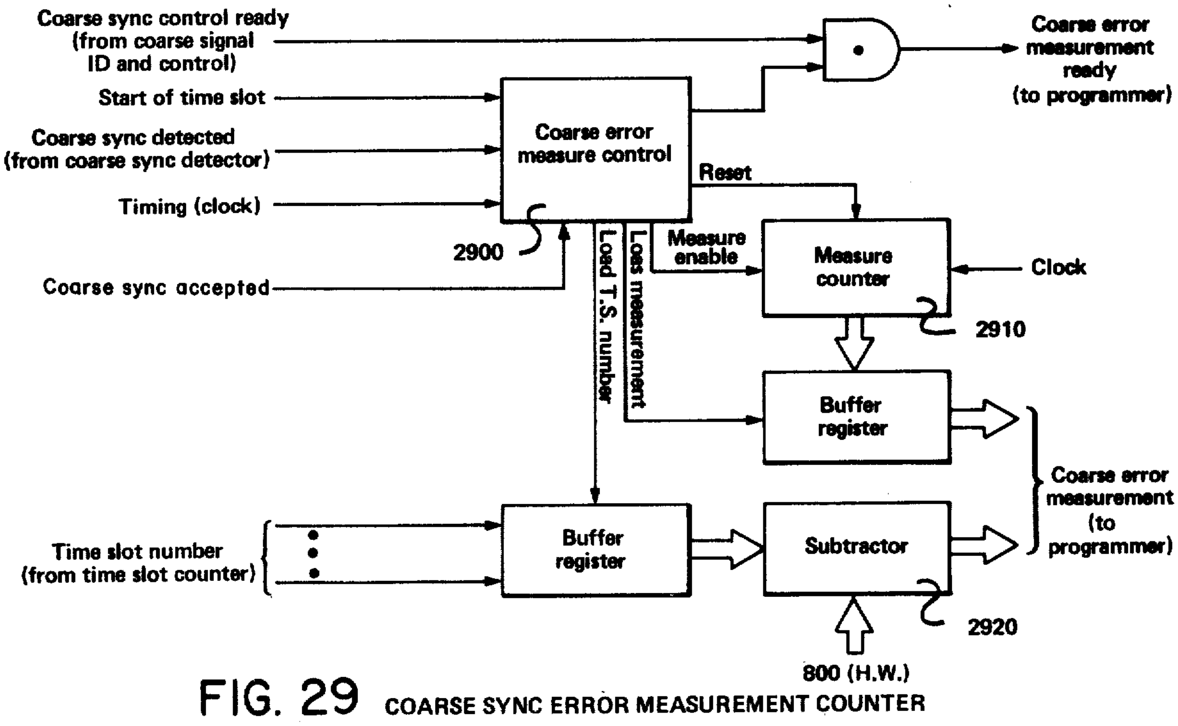
FIG. 29 COARSE SYNC ERROR MEASUREMENT COUNTER

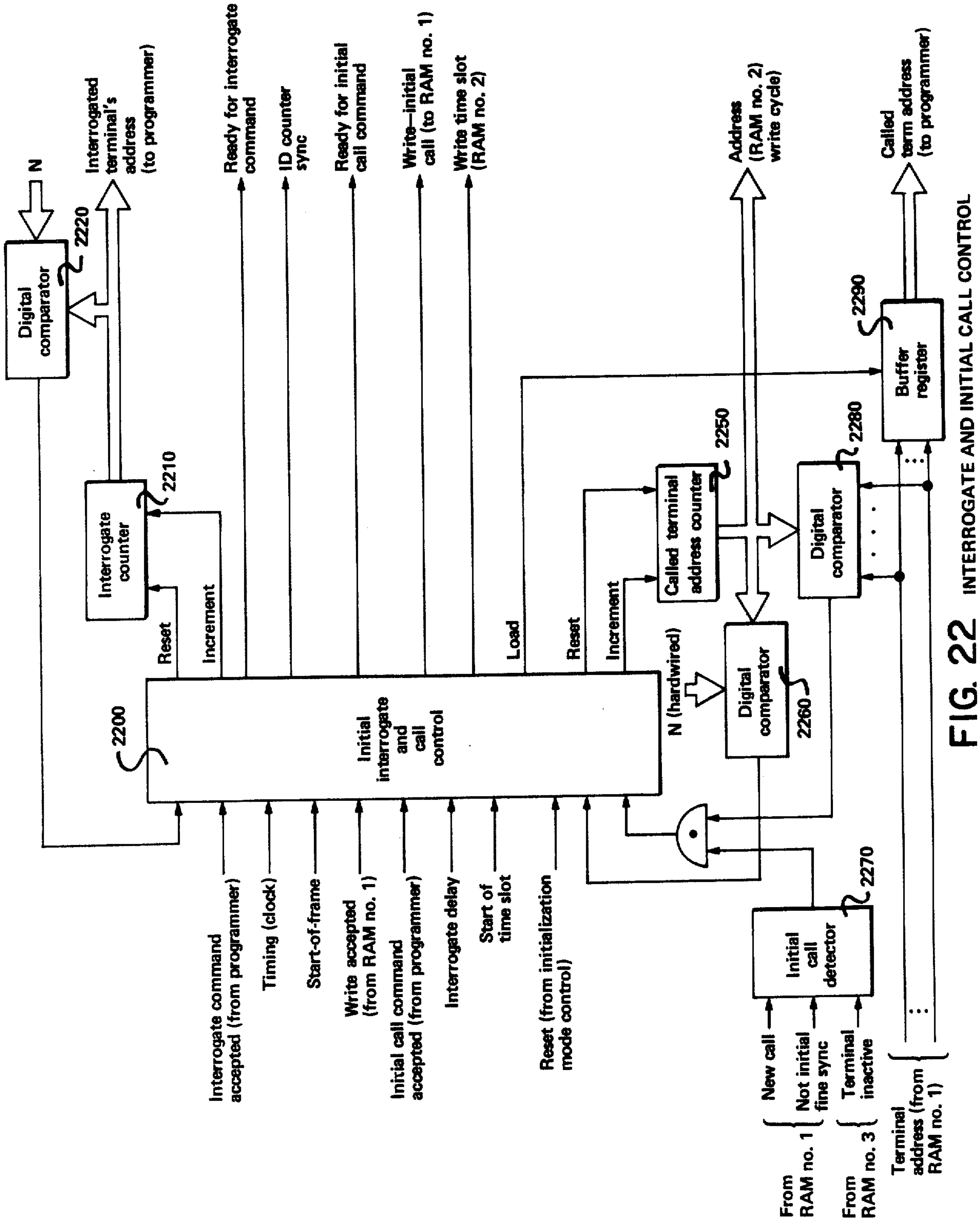
FIG. 22 INTERROGATE AND INITIAL CALL CONTROL

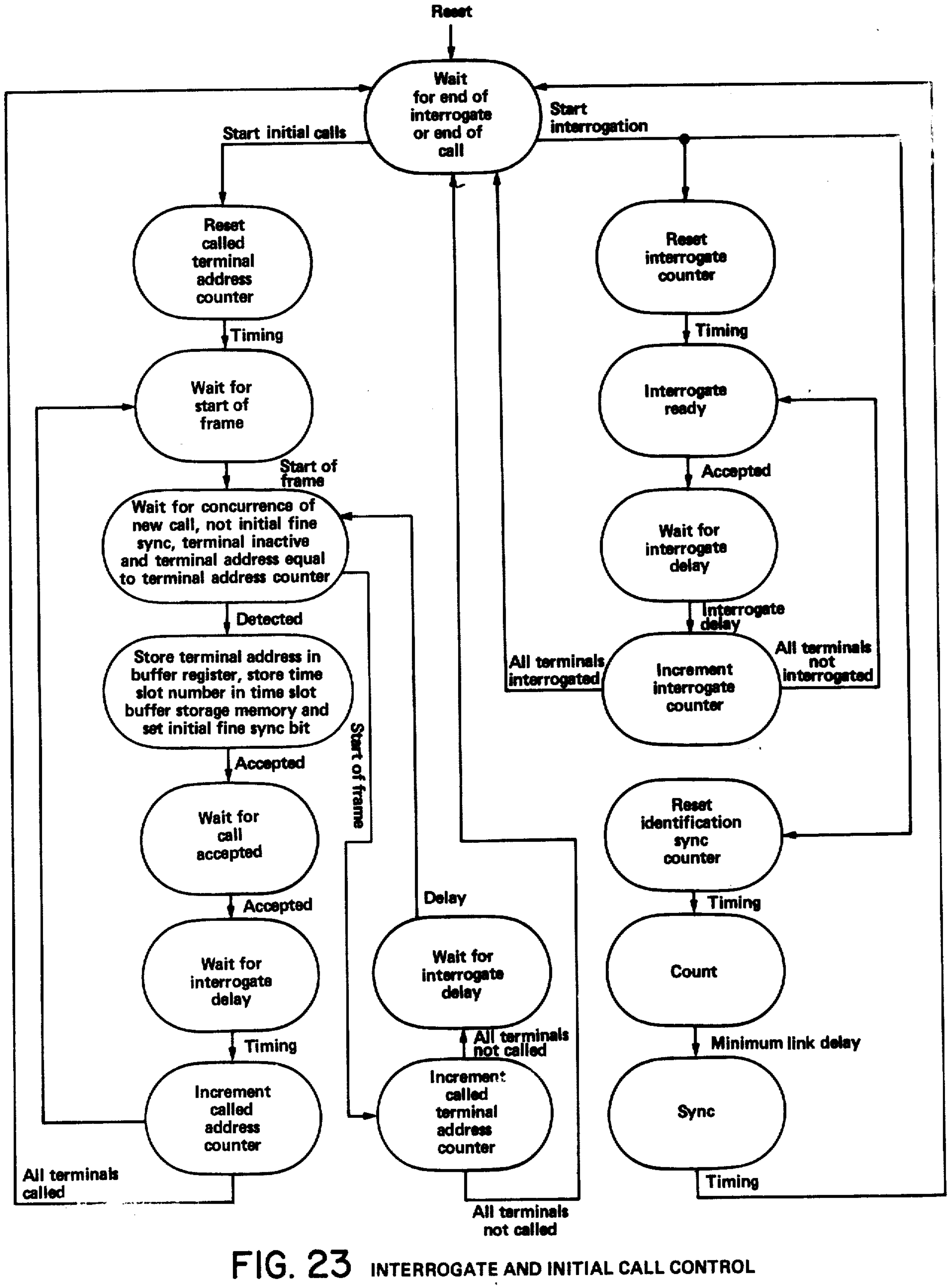
FIG. 23 INTERROGATE AND INITIAL CALL CONTROL

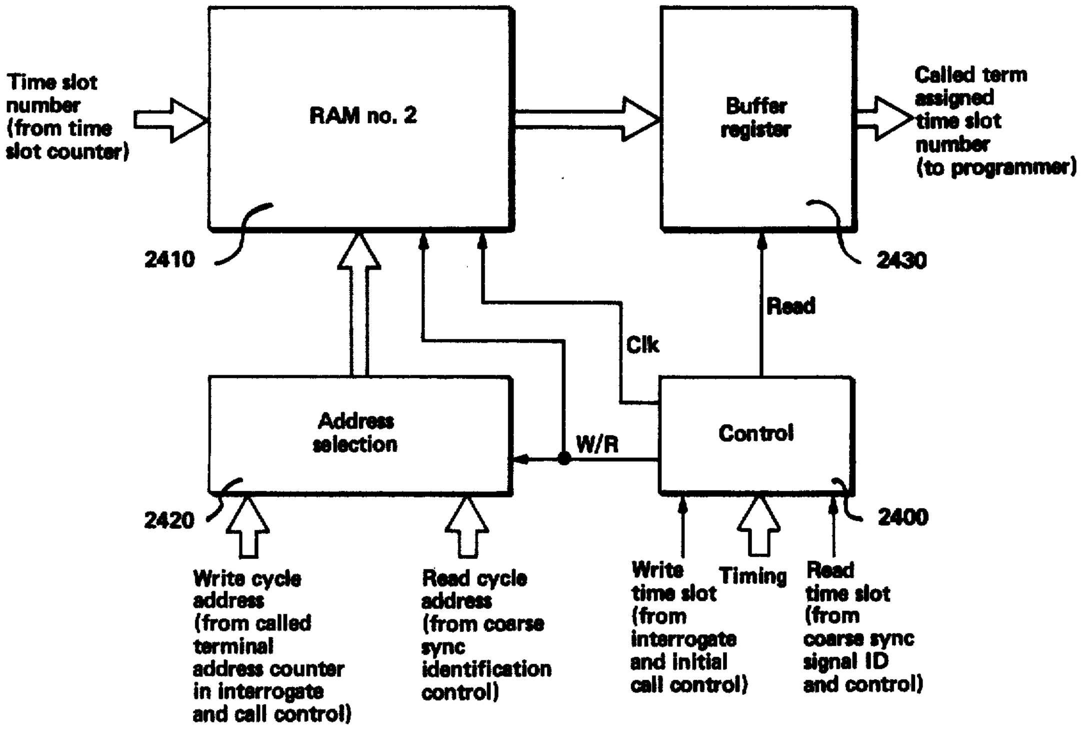
FIG. 24 TIME SLOT BUFFER MEMORY
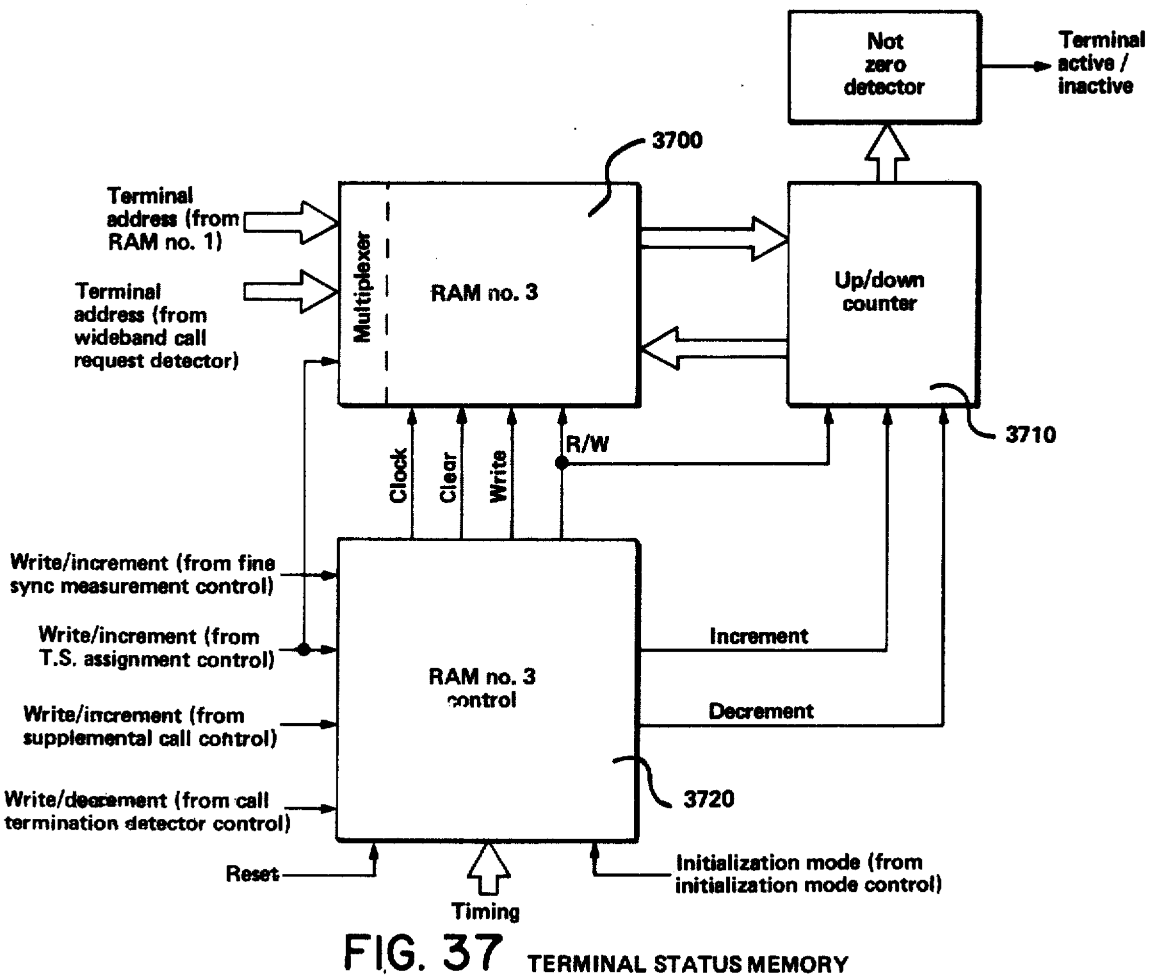
FIG. 37 TERMINAL STATUS MEMORY

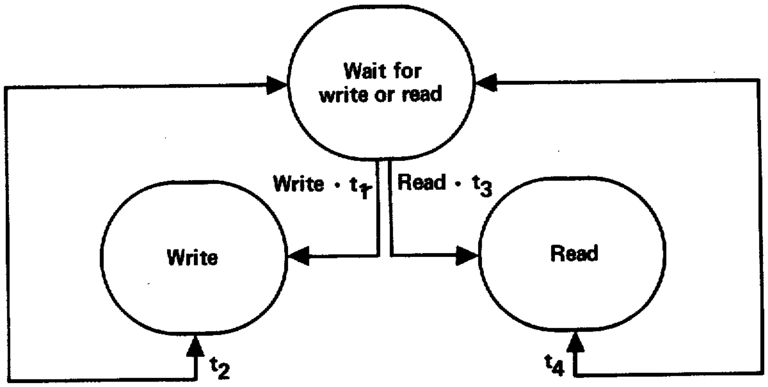
FIG. 25 TIME SLOT BUFFER MEMORY
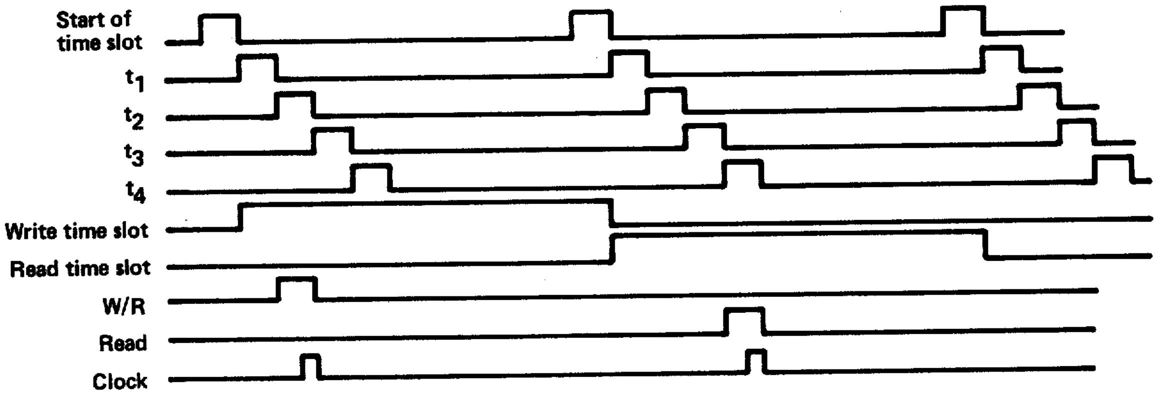
FIG. 26 TIME SLOT BUFFER MEMORY TIMING
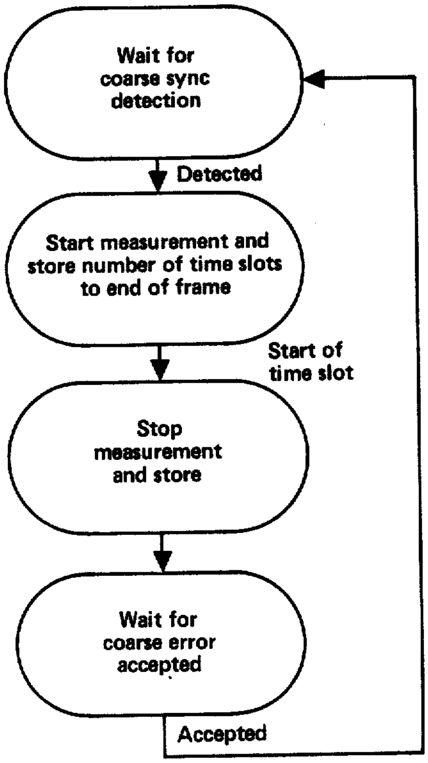
FIG. 30 COARSE SYNC ERROR MEASUREMENT COUNTER

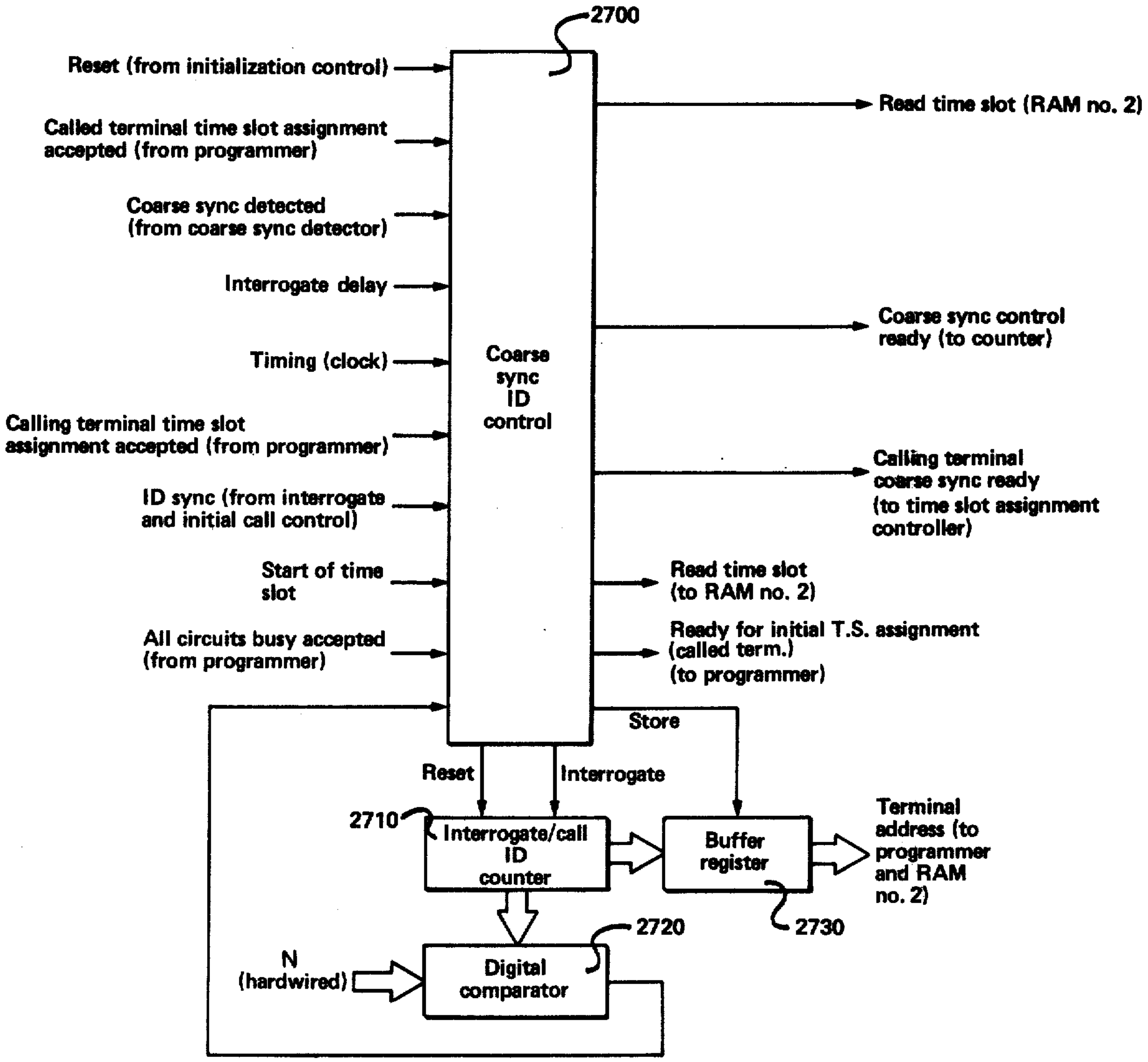
FIG. 27 COARSE SYNC SIGNAL IDENTIFICATION AND CONTROL

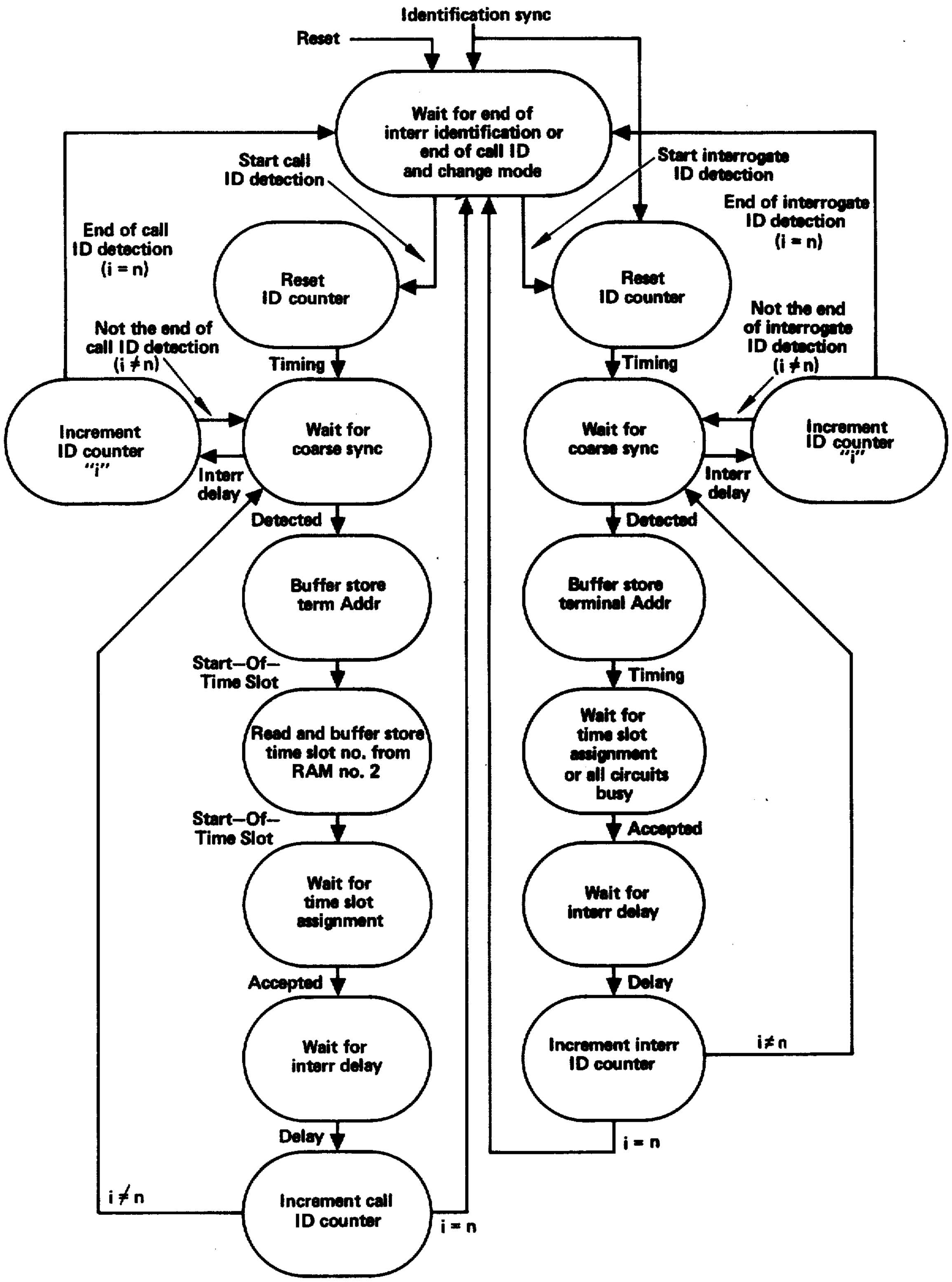
FIG. 28 COARSE SYNC SIGNAL IDENTIFICATION AND CONTROL

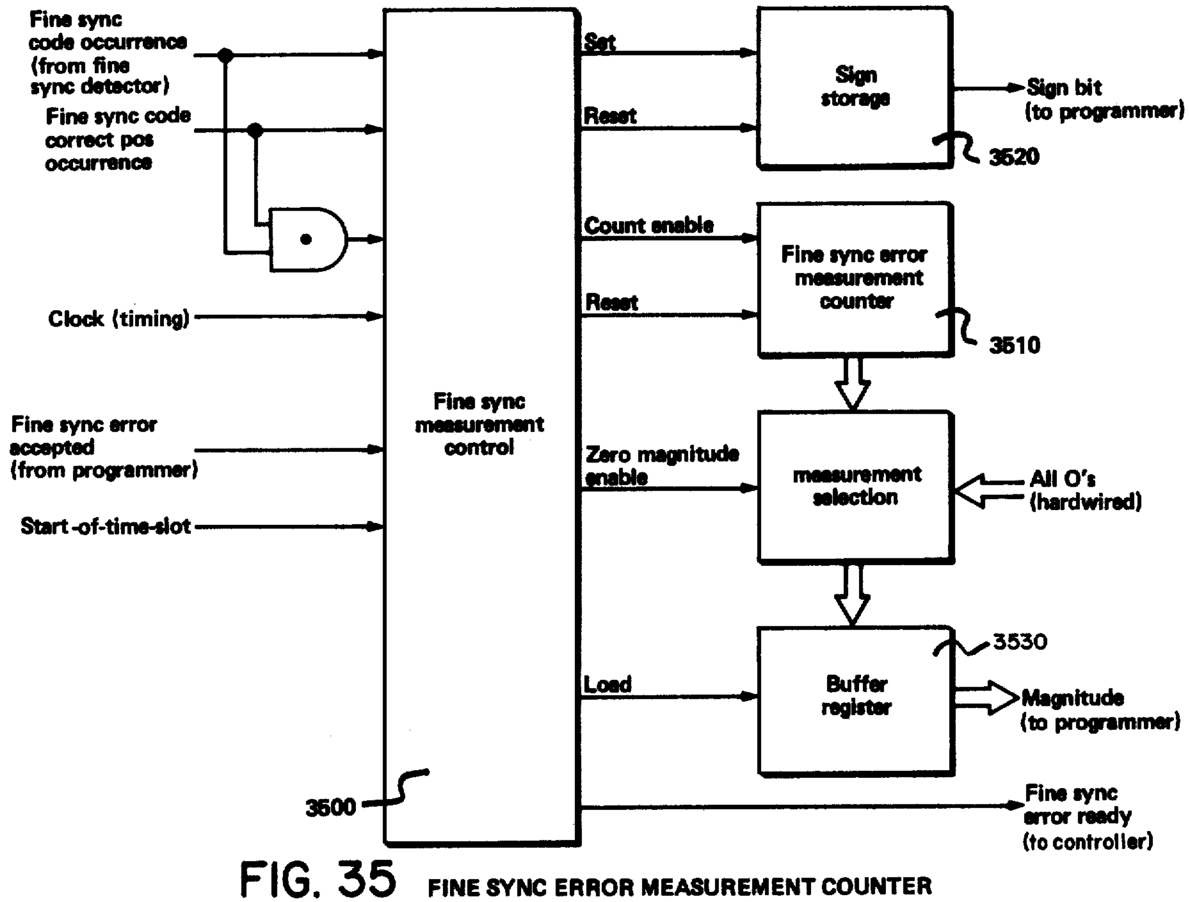
FIG. 35 FINE SYNC ERROR MEASUREMENT COUNTER
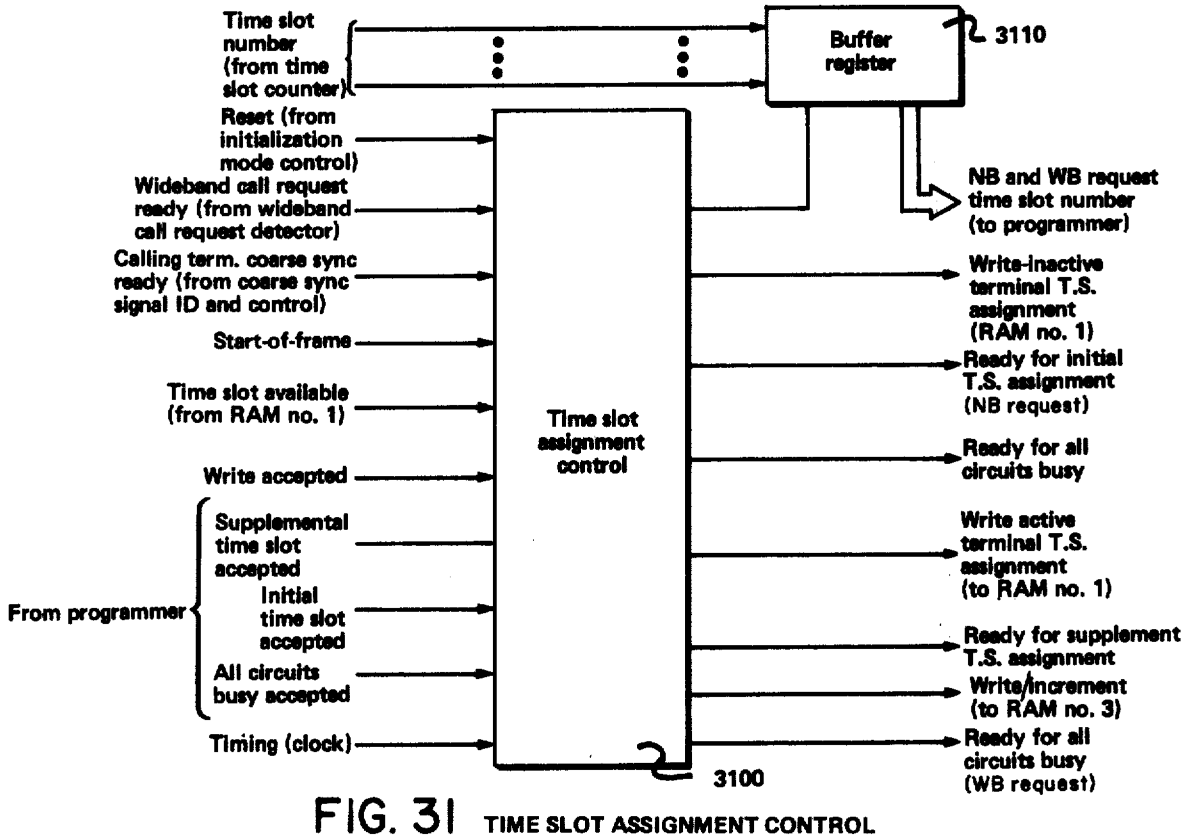
FIG. 31 TIME SLOT ASSIGNMENT CONTROL

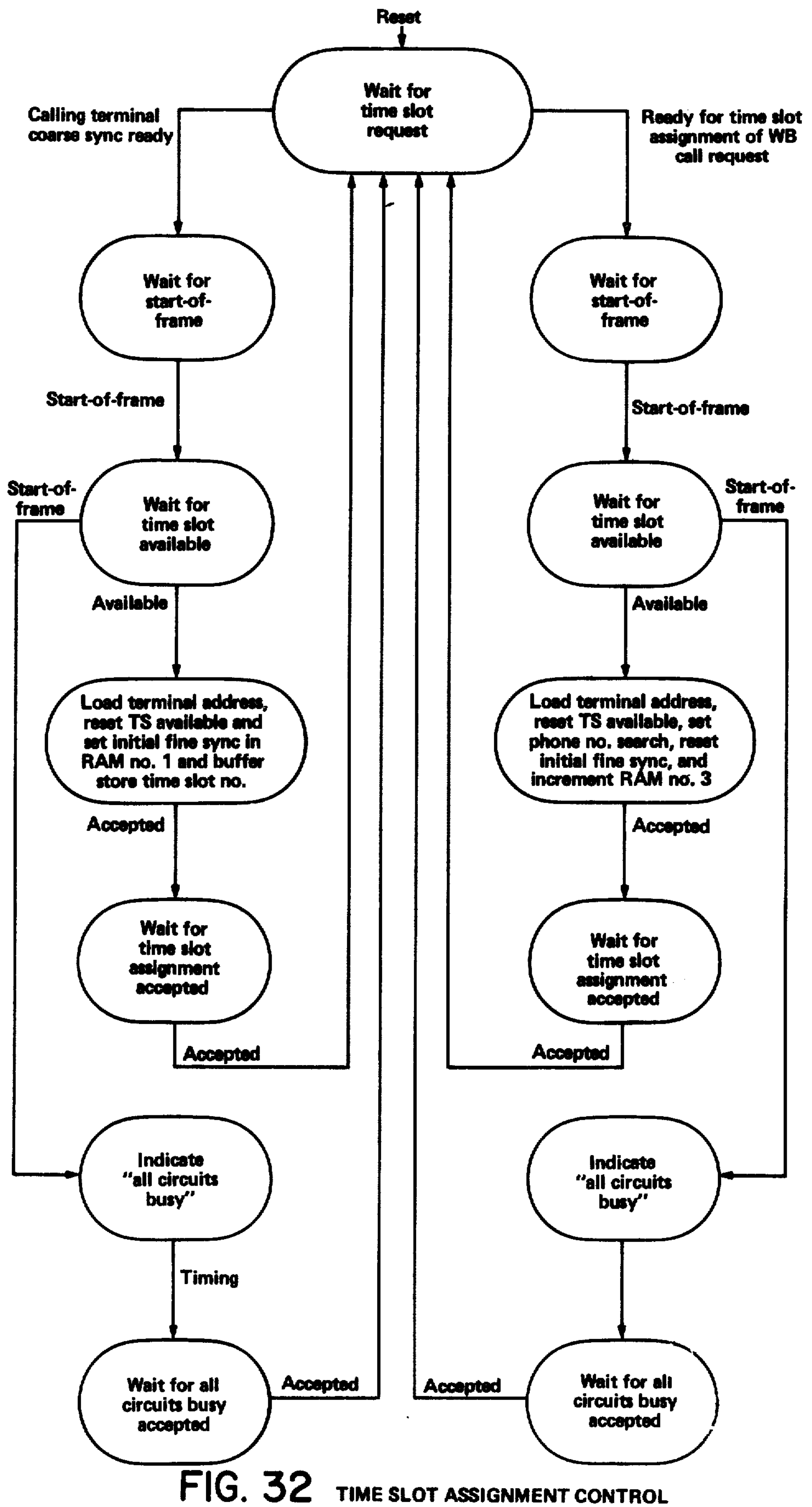
FIG. 32 TIME SLOT ASSIGNMENT CONTROL

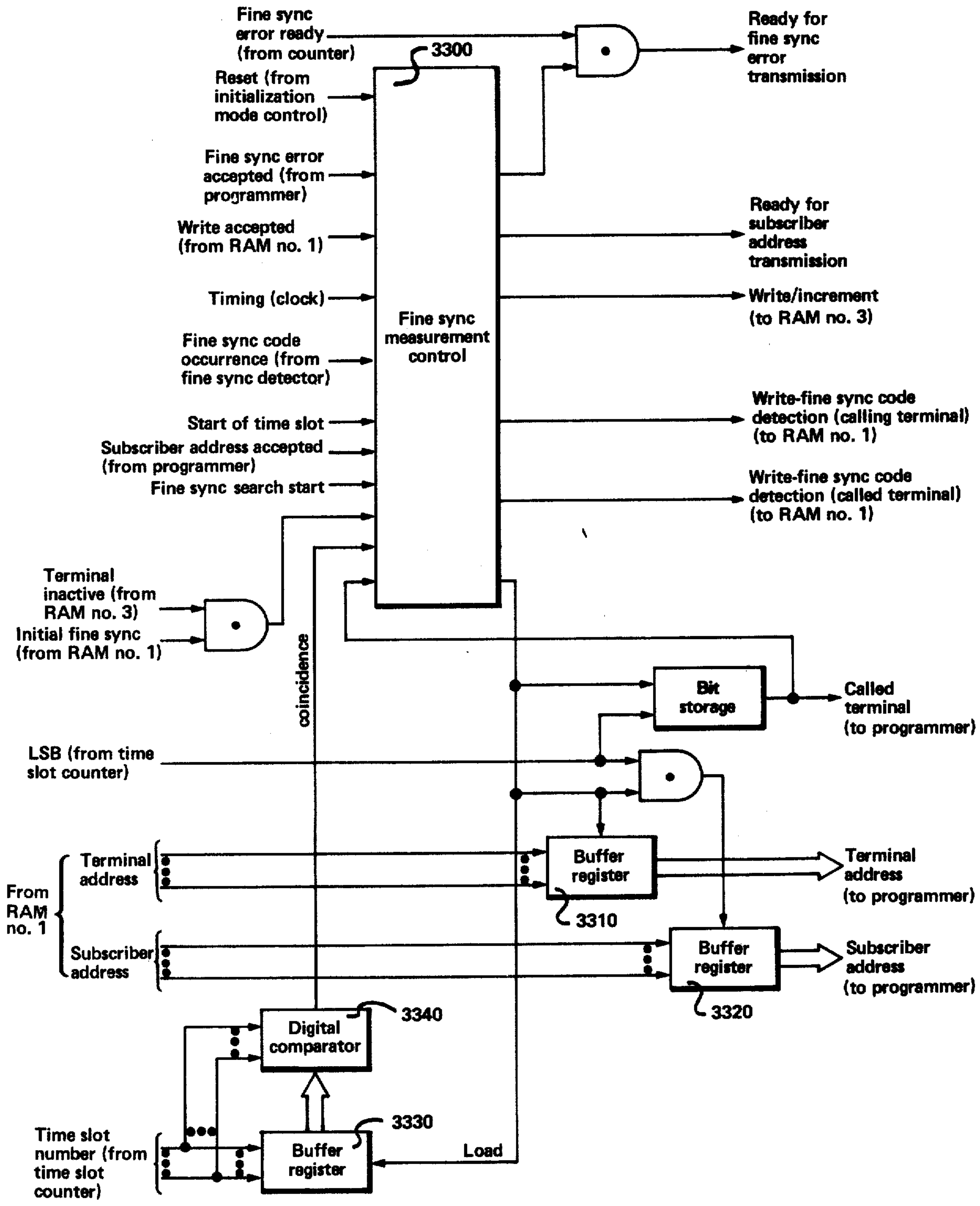
FIG. 33 FINE SYNC MEASUREMENT CONTROL

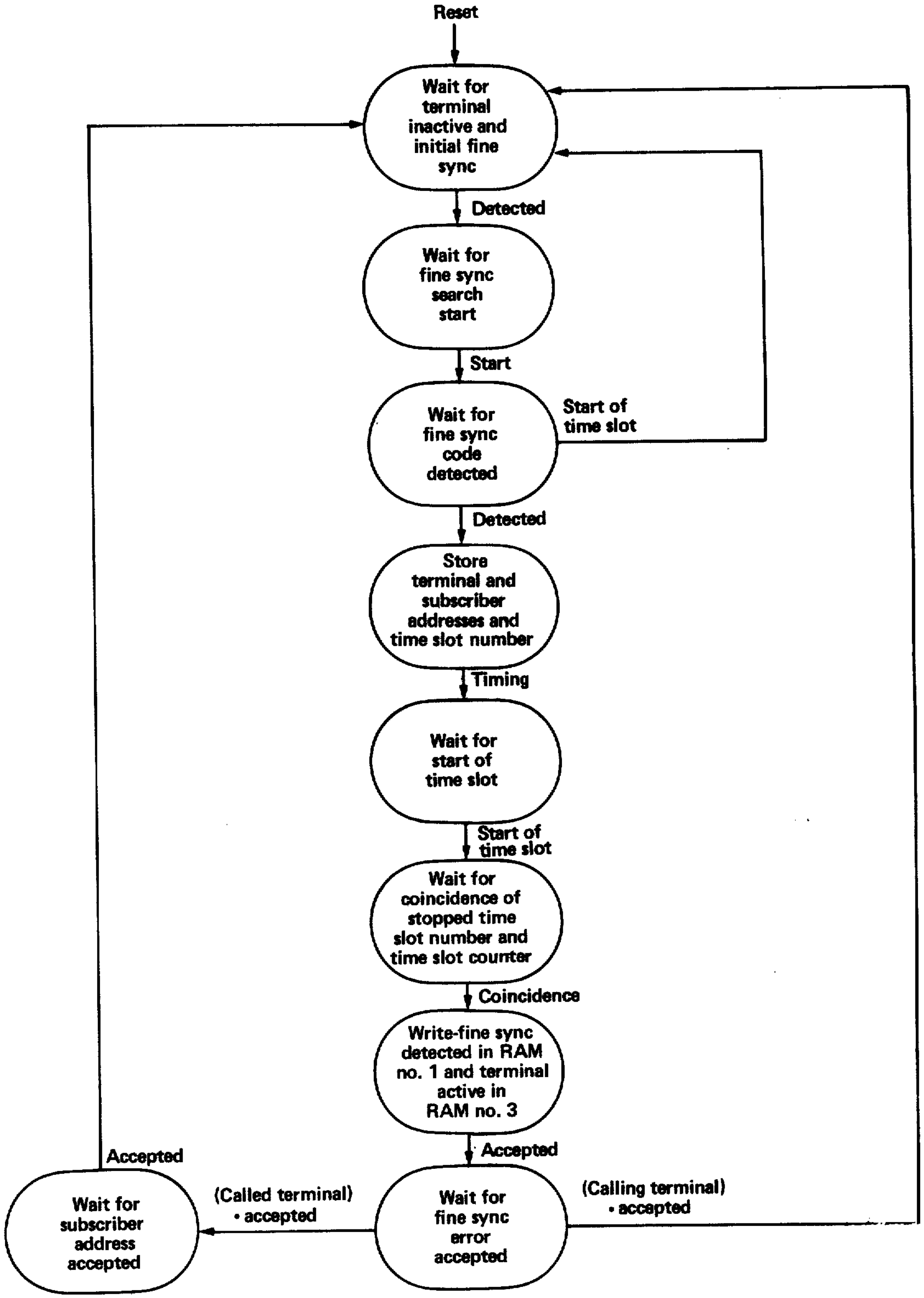
FIG. 34 FINE SYNC MEASUREMENT CONTROL

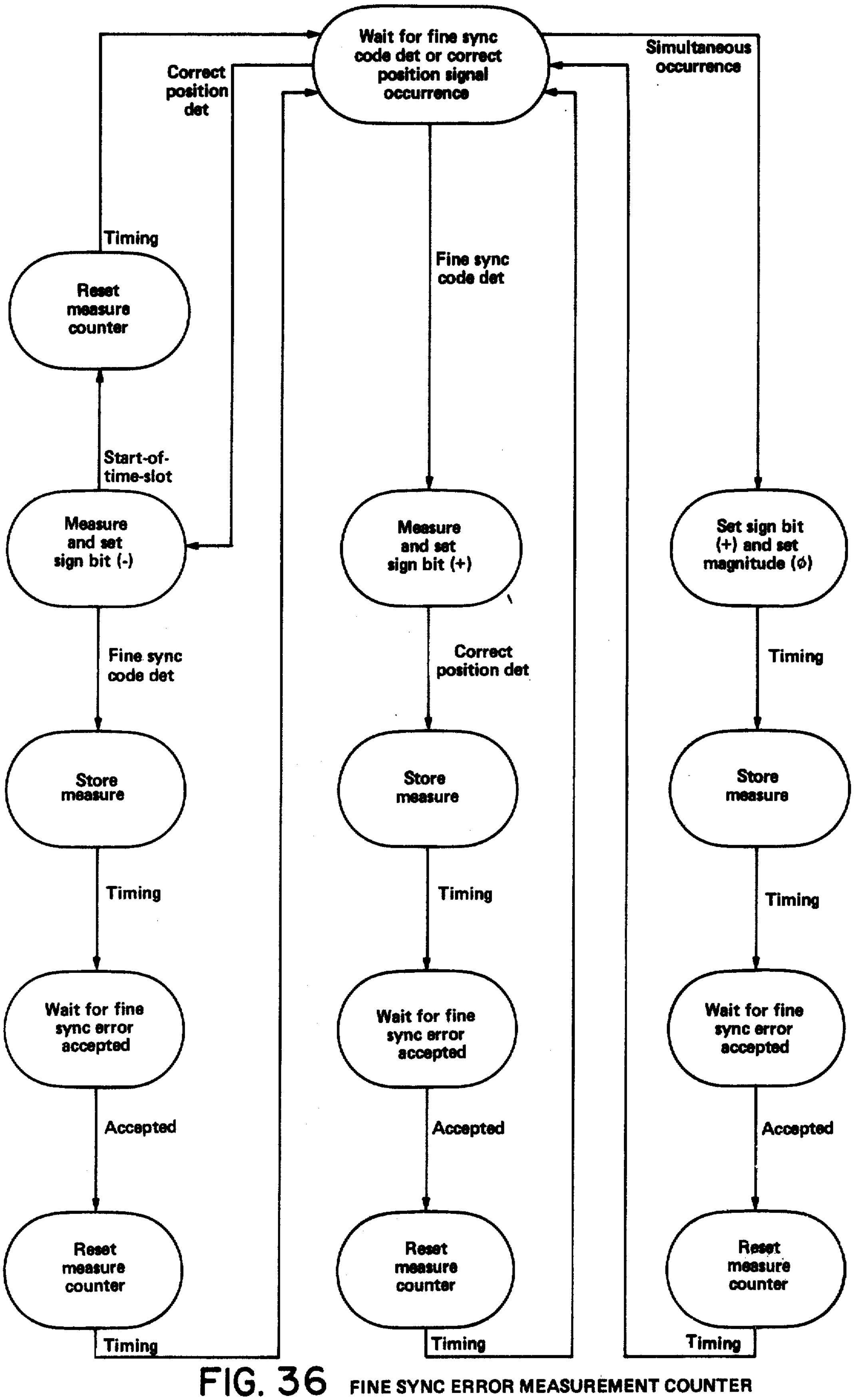
FIG. 36 FINE SYNC ERROR MEASUREMENT COUNTER

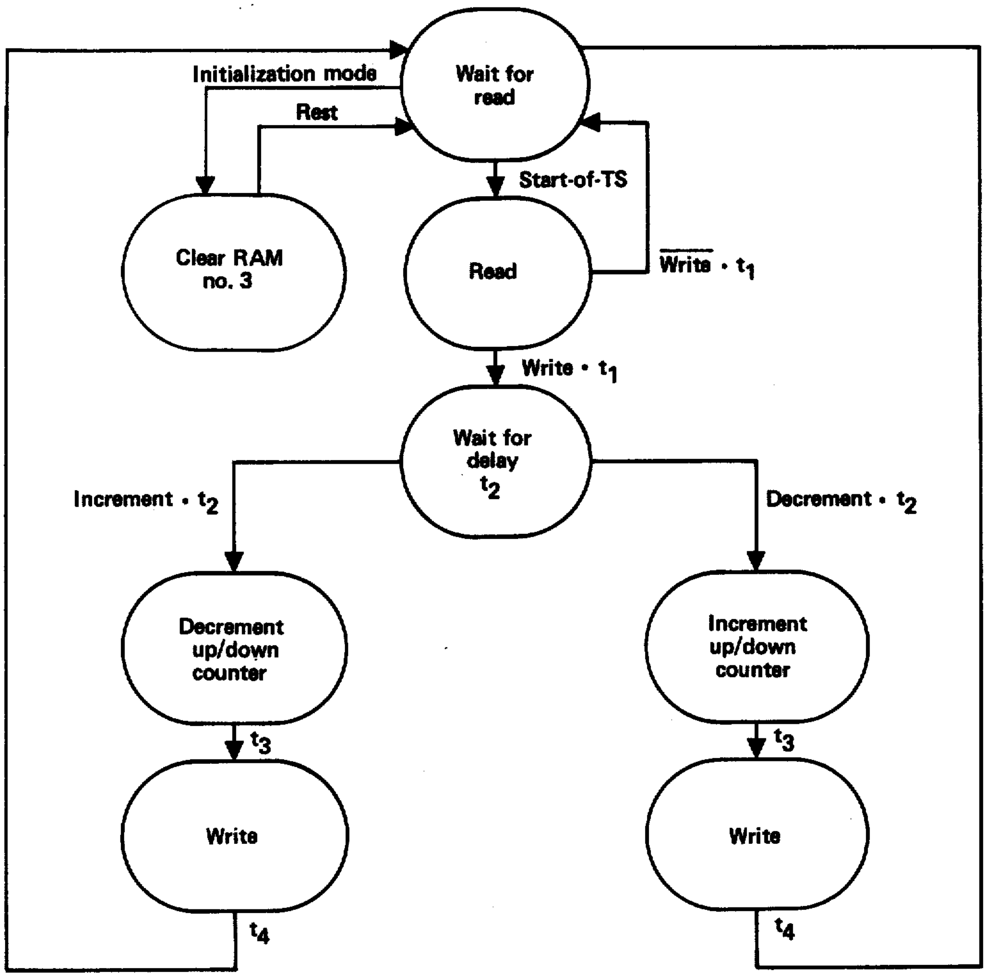
FIG. 38 TERMINAL STATUS MEMORY—STATE DIAGRAM
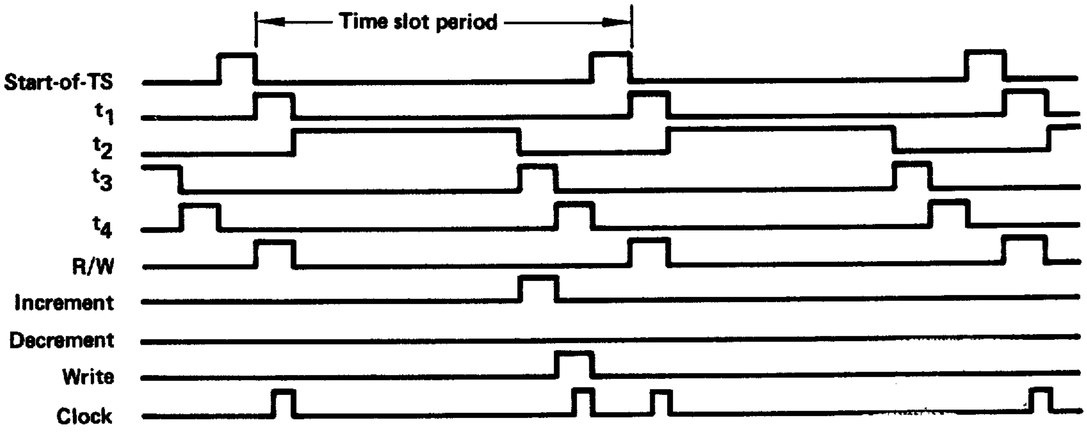
FIG. 39 TERMINAL STATUS MEMORY TIMING

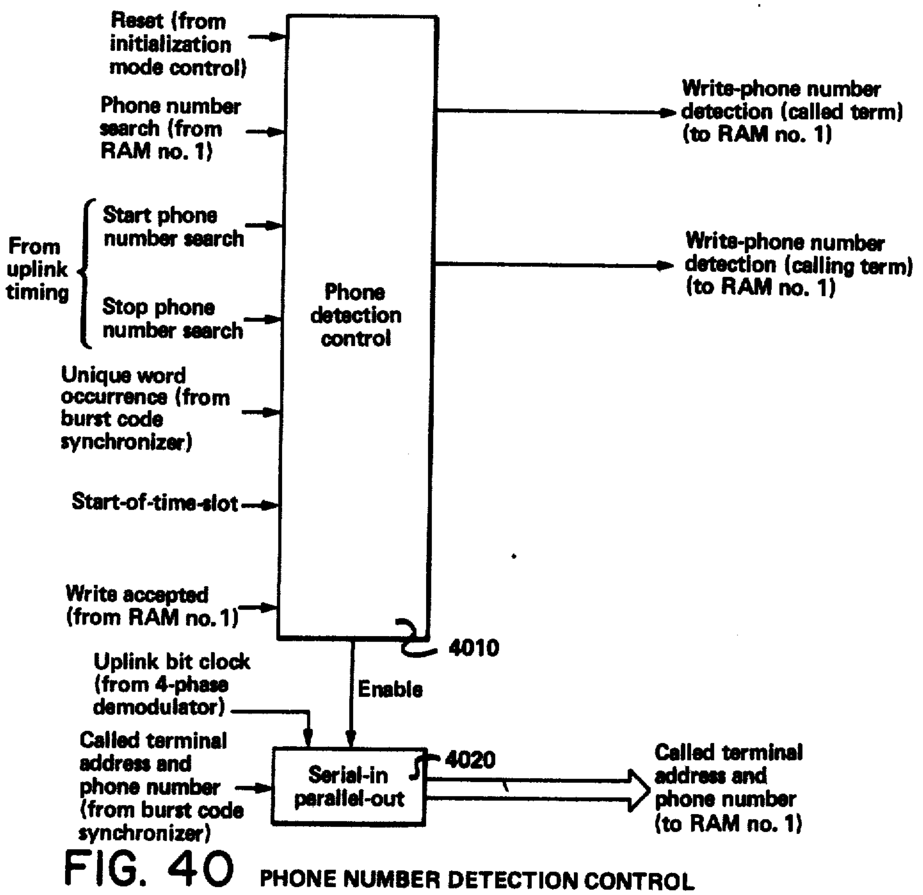
FIG. 40 PHONE NUMBER DETECTION CONTROL
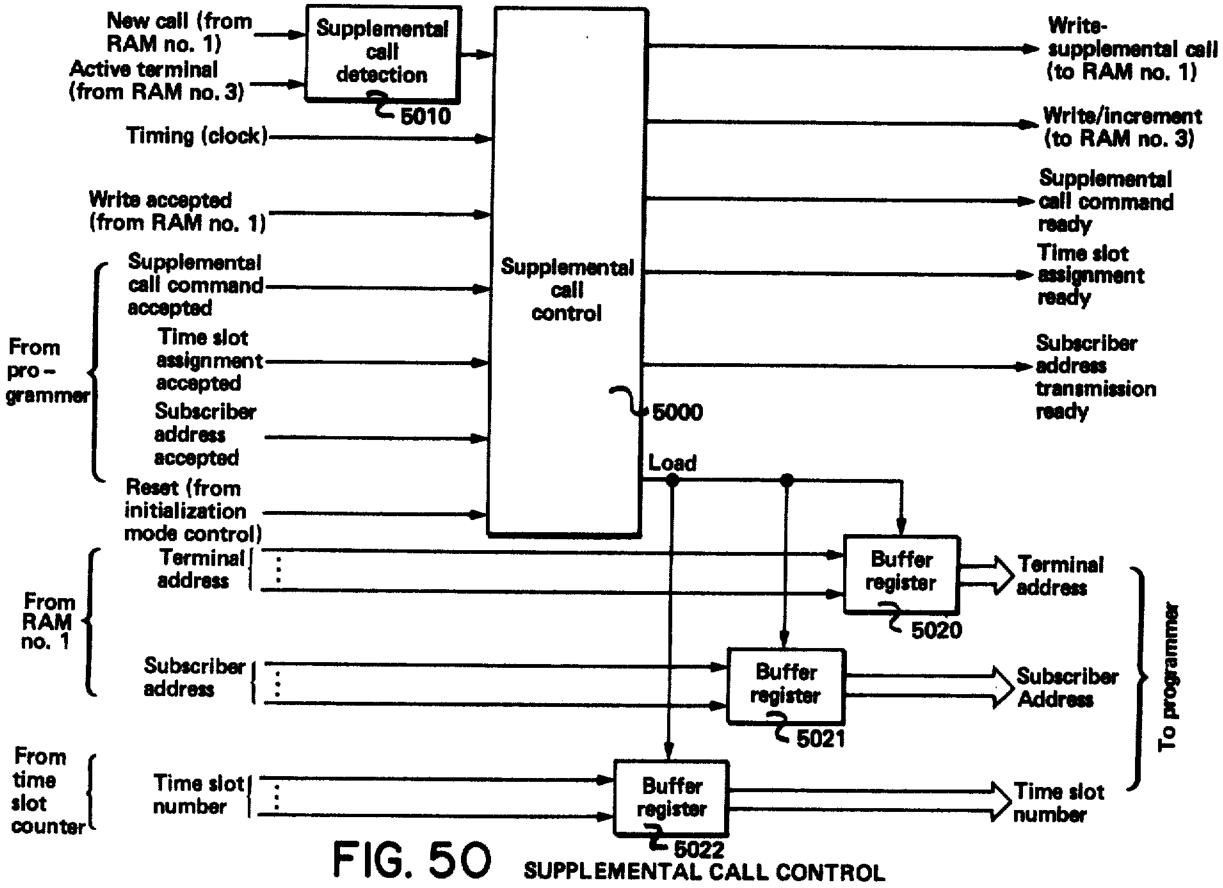
FIG. 50 SUPPLEMENTAL CALL CONTROL

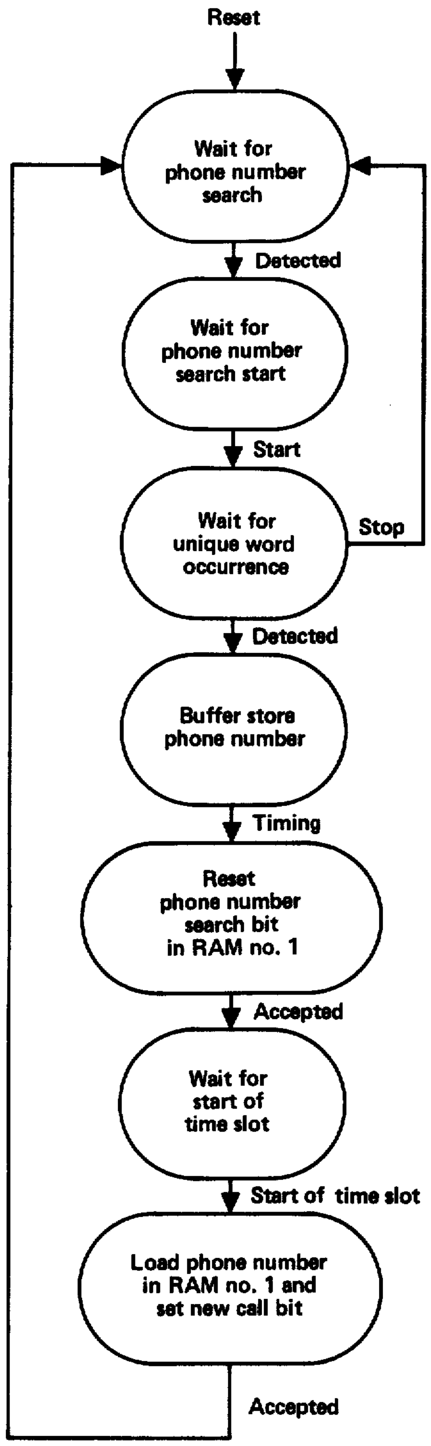
FIG. 41 PHONE NUMBER DETECTION CONTROL
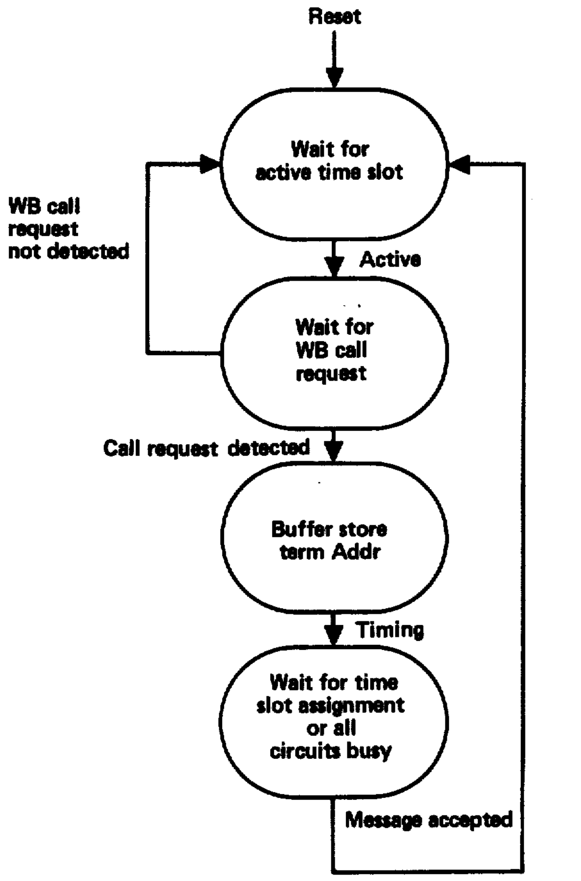
FIG. 49 WIDEBAND CALL REQUEST DETECTION CONTROL

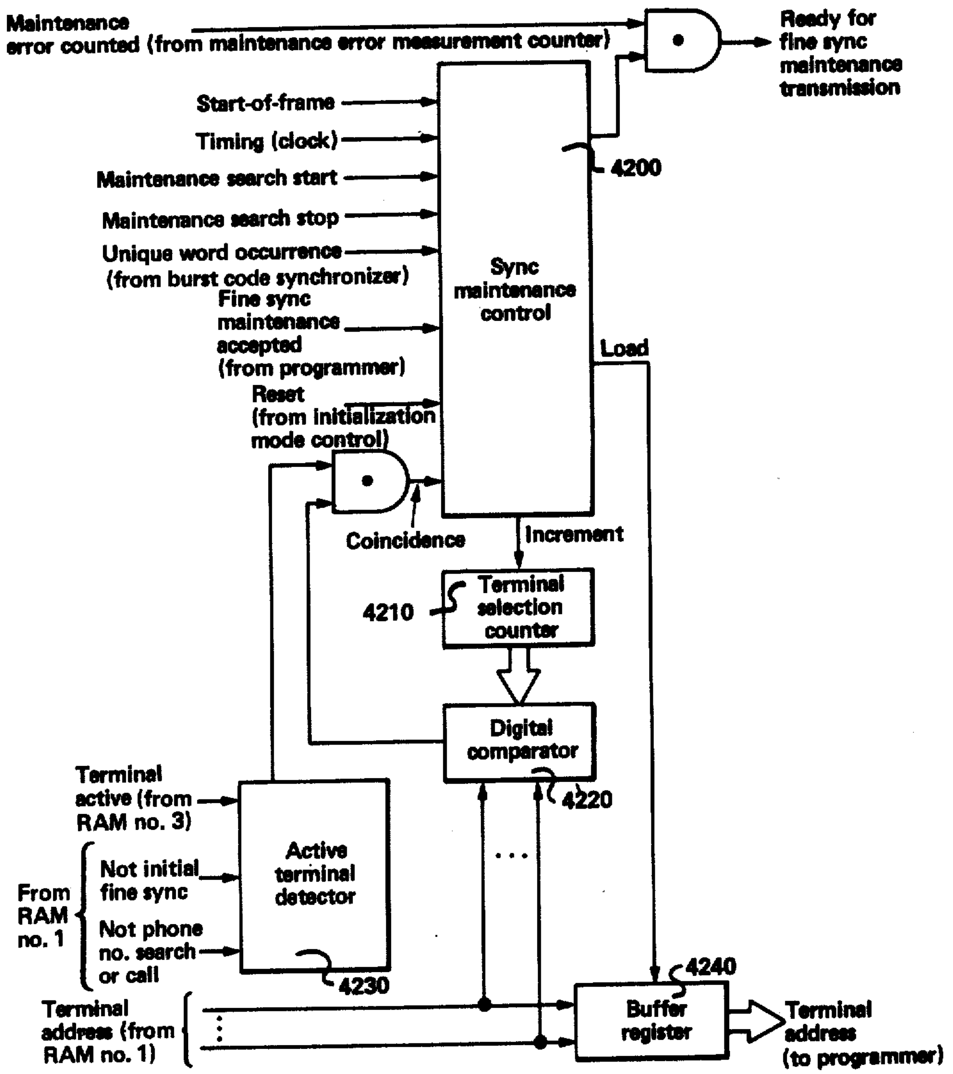
FIG. 42 SYNCHRONIZATION MAINTENANCE CONTROL
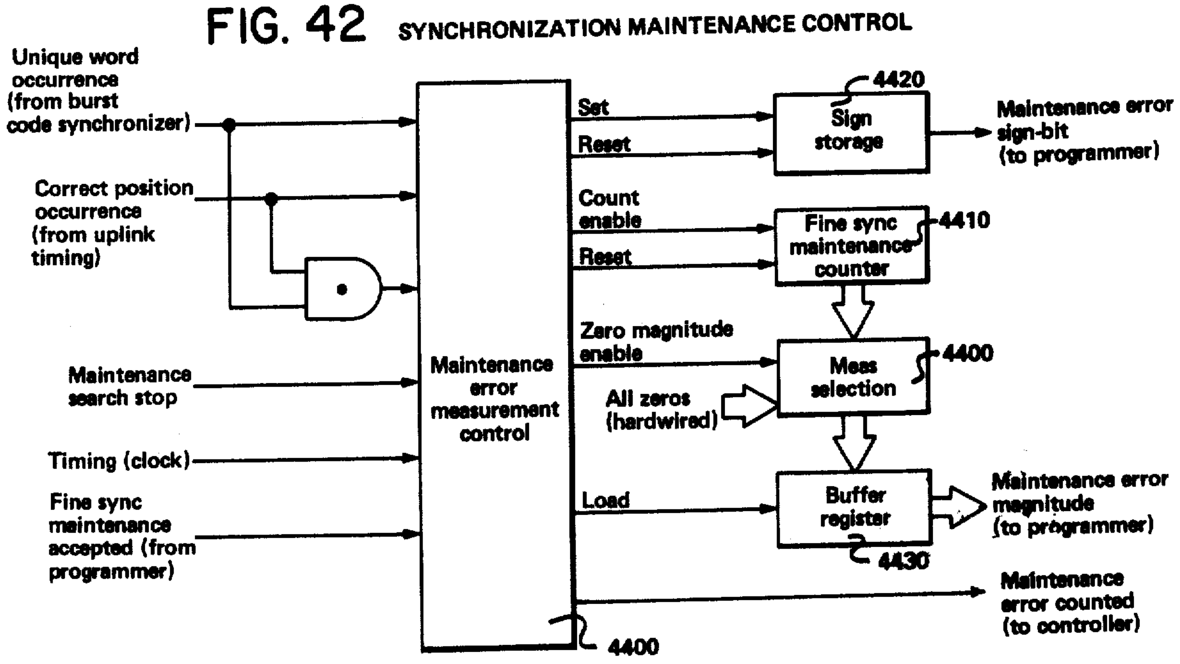
FIG. 44 MAINTENANCE ERROR MEASUREMENT COUNTER

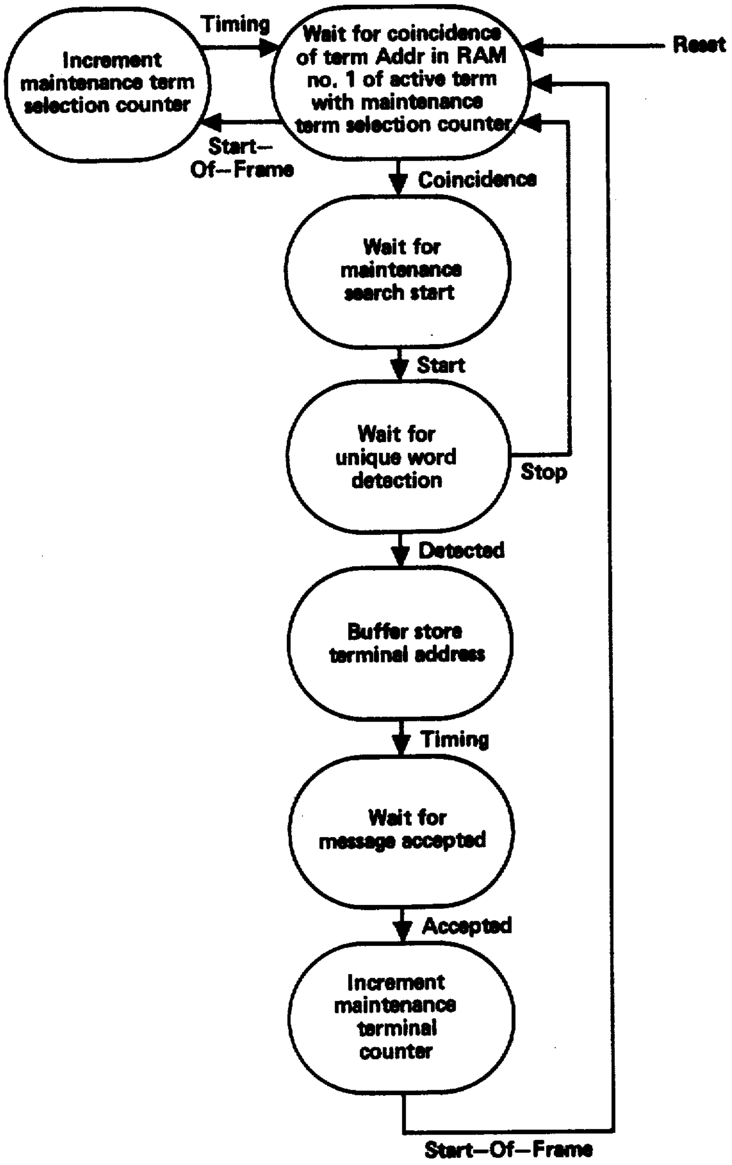
FIG. 43 SYNCHRONIZATION MAINTENANCE CONTROL
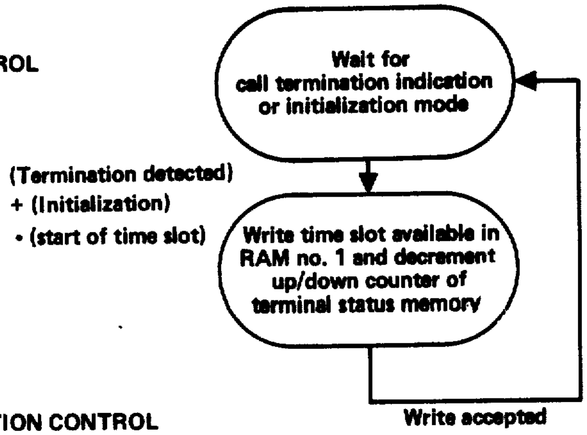
FIG. 47 CALL TERMINATION CONTROL

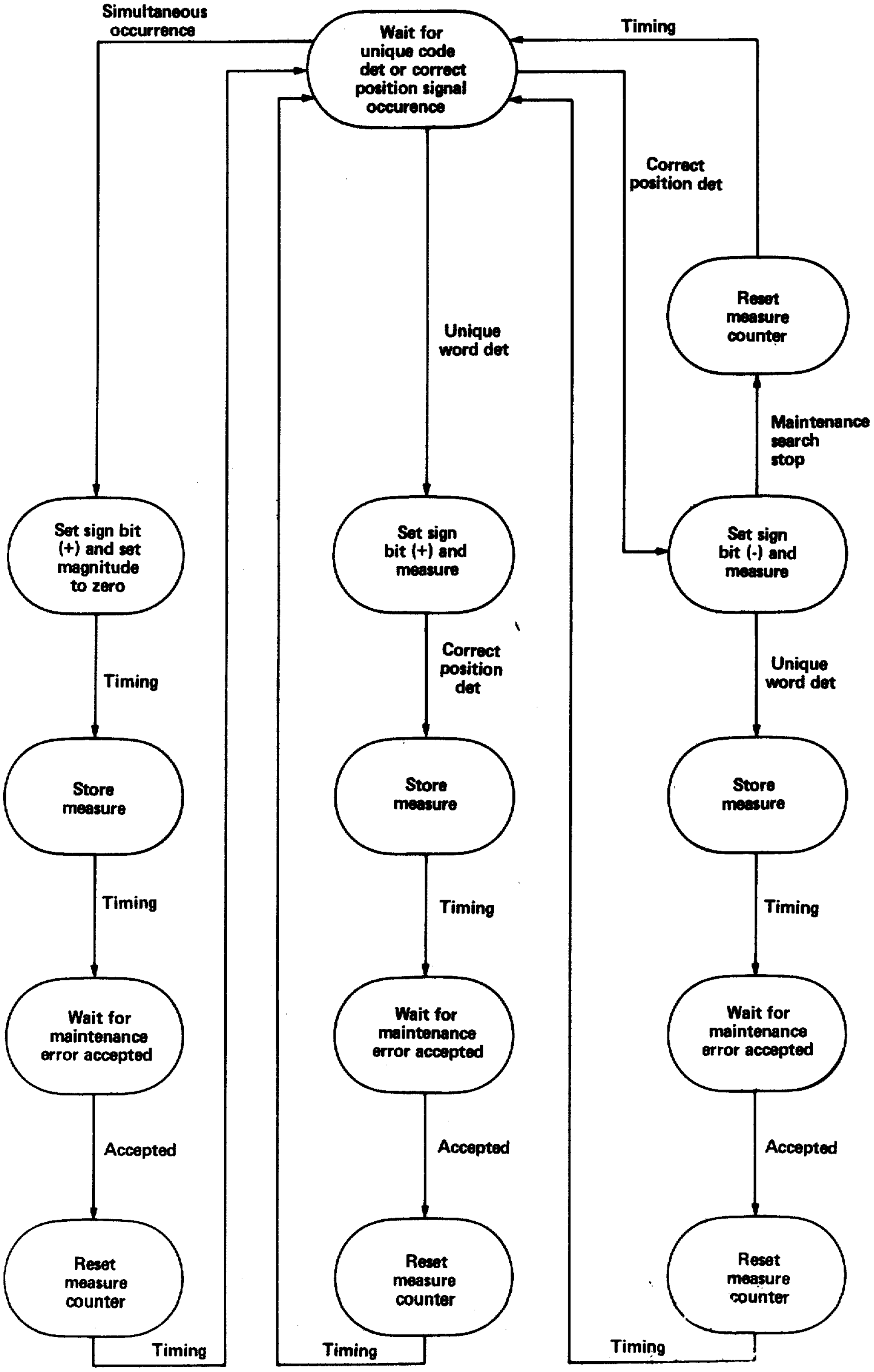
FIG. 45 MAINTENANCE ERROR MEASUREMENT COUNTER

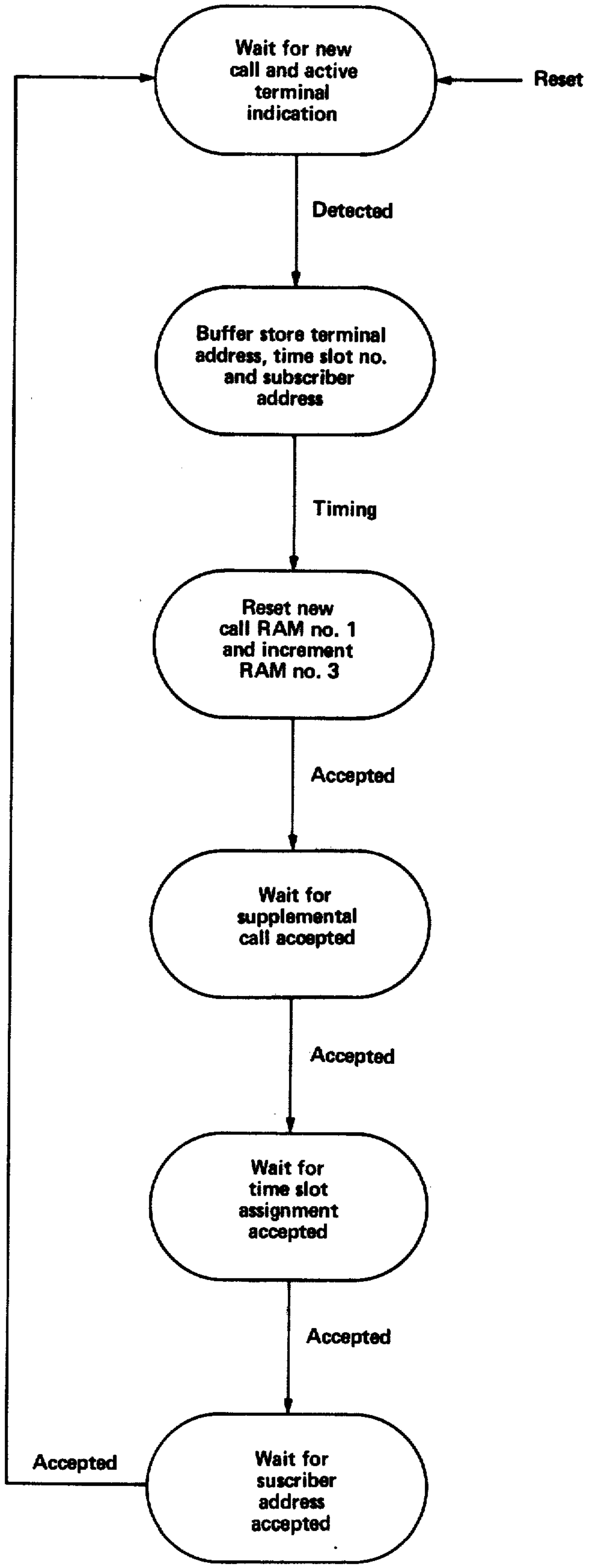
FIG. 51 SUPPLEMENTAL CALL CONTROL

PROCESSING REPEATER FOR TDMA COMMUNICATION SYSTEM

BACKGROUND OF THE INVENTION

The present invention relates generally to time division multiple access (TDMA) communication systems, and more particularly to a processing repeater for such systems which will provide the individual data terminals with synchronization error measurements and other control data.

In a satellite relay TDMA communication system, or other time division multiple access communication system involving multiple end points (data terminals) with a varying link delay between the end points and a common repeater (transponder), it is necessary to provide a guard time between transmission bursts from the different data terminals, and to synchronize the transmissions from the various terminals so that they do not overlap in time and interfere with one another as they are received at the repeater. In some prior art systems, such as represented by U.S. Pat. No. 3,562,432, one of the date terminals is designated a master and the other terminals are slaves. In such a system, each slave terminal must measure the difference in time between a synchronizing signal from the master terminal and a synchronizing signal from the particular slave terminal (after both have been relayed by a transponder on the satellite). Such systems have the disadvantage of requiring the guard time (required in uplink transmissions in order to prevent overlap at the transponder), to be also provided in the downlink from the relay to the data terminals, in order that the date terminal can make the error measurement.

In some prior art TDMA communication systems, such as represented by U.S. Pat. No. 3,634,627, a demand assignment mode of operation is provided by allowing each terminal to seize any available channel. In the type of system represented by U.S. Pat. No. 3,644,678, surplus channels are allocated among the several data terminals according to a predetermined algorithm and each data terminal is required to remember the number of channels presently in use by each data terminal as well as the additional requirements of each terminal. Then, in response to a "freeze" signal, the surplus channels can be re-allocated by data terminals. Both types of systems have the disadvantage of requiring complex circuitry at each data terminal, which results in costly duplication of equipment within the system.

SUMMARY OF THE INVENTION

Accordingly, it is one object of the present invention to provide a processing repeater capable of performing measurements, calculations, and control operations required for data terminal synchronization, thereby removing these functions from the data terminals, as well as allowing more efficient use of the bandwidth from the repeater to the terminal.

A second object of the present invention is to provide a processing repeater capable of controlling the demand assignment of communication channels.

A third object of the present invention is to provide a processing repeater capable of interrogating inactive terminals and providing them with initial synchronization control data, without interfering with transmissions from other terminals.

A fourth object of the present invention is to reduce data terminal complexity by time-sharing various system control functions in a central repeater rather than requiring duplication of equipment between data terminals.

A fifth object of the present invention is to reduce the transmitter power required in the repeater and increase downlink efficiency by transmitting a continuous stream of data and control information derived by the repeater from the various received transmission bursts, rather than transmitting in the same burst mode as the data is received.

The invention which satisfies these and other objectives may be briefly summarized as follows. The transponders of the prior art are replaced with a processing repeater having the capability of measuring synchronization error present in the burst transmission from each data terminal and formatting the error measurement as part of a continuous output transmission free from guard time intervals and uplink preambles. In the particular embodiment disclosed, the processing repeater is capable of receiving a narrowband coarse synchronization signal from an inactive data terminal in response to an interrogation command, thereby permitting rapid initial synchronization to be achieved without interfering with concurrent transmission of wideband data between active terminals.

In accordance with another aspect of the present invention, the demand assignment process is performed by the processing repeater in response to either narrowband or wideband call requests from an inactive or active data terminal respectively. The channel is freed upon the receipt of a call termination request from either calling or called terminal.

The foregoing and other objectives and features of the invention will be more apparent upon examination of the accompanying drawings and the detailed description of a preferred embodiment which follow. It should be noted that in the drawings, the convention has been adopted of using the number of the figure where a detail is first shown as the first digits of the reference numeral for that detail.

BRIEF DESCRIPTION OF THE DRAWINGS

FIG. 1 shows a Spacecraft Synchronized Time Division Multiple Access ($S^2$TDMA) Communication System utilizing the Processing Repeater of the present invention.

FIG. 2 (encompassing FIGS. *2a*, *2b*, *2c*, *2d*, e, *2f*, and *2g*) illustrates various Wideband Uplink and Downlink Formats used by the disclosed embodiment.

FIG. 3 shows the format of a Narrowband Coarse Synchronization Signal.

FIG. 4 is a simplified block diagram of an $S^2$TDMA Processing Repeater; while FIG. 5 is a simplified block diagram of a data terminal suitable for use in an $S^2$TDMA system.

FIGS. 7 through 51 are detailed block diagrams, state diagrams and timing diagrams for various detectors, controllers, memories, counters, and other circuits of the Communication Processor of FIG. 6.

FIG. 7 is a detailed block diagram for the Coarse Sync Detector, while FIG. 8 is the state diagram corresponding to FIG. 7.

FIG. 9 is a detailed block diagram for the Call Termination Detector, while FIG. 10 is the state diagram corresponding to FIG. 9.

FIG. 11 is a detailed block diagram for the Data Formatter, while FIG. 12 is the timing diagram corresponding to FIG. 11.

FIG. 13 is a detailed block diagram for the Uplink Time Slot Timing circuit.

FIG. 14 is a detailed block diagram for the Synchronization and Control Field programmer, while FIG. 15 is the state diagram corresponding to FIG. 14.

FIG. 16 is a detailed block diagram for the Time Slot Status Memory (RAM No. 1), while FIG. 18 is the state diagram and FIG. 19 is the control timing diagram corresponding to FIG. 16, and FIG. 17 is a diagram for the Memory Data Word format.

FIG. 20 is a detailed block diagram for the Initialization Controller, while FIG. 21 is the state diagram corresponding to FIG. 20.

FIG. 22 is a detailed block diagram for the Interrogate and Initial Call Controller, while FIG. 23 is the state diagram corresponding to FIG. 22.

FIG. 24 is a detailed block diagram for the Time Slot Buffer Memory, while FIG. 25 is the state diagram and FIG. 26 is the timing diagram corresponding to FIG. 24.

FIG. 27 is a detailed block diagram for the Coarse Sync Signal Identification and Control circuit, while FIG. 28 is the state diagram corresponding to FIG. 27.

FIG. 29 is a detailed block diagram for the Coarse Sync Error Measurement Counter, while FIG. 30 is the state diagram corresponding to FIG. 29.

FIG. 31 is a detailed block diagram for the Time Slot Assignment Controller, while FIG. 32 is the state diagram corresponding to FIG. 31.

FIG. 33 is a detailed block diagram for the Fine Sync Measurement Controller, while FIG. 34 is the state diagram corresponding to FIG. 33.

FIG. 35 is a detailed block diagram for the Fine Sync Error Measurement Counter, while FIG. 36 is the state diagram corresponding to FIG. 35.

FIG. 37 is a detailed block diagram for the Terminal Status Memory (RAM No. 3), while FIG. 38 is the state diagram and FIG. 39 is the timing diagram corresponding to FIG. 37.

FIG. 40 is a detailed block diagram for the Phone Number Detection Controller, while FIG. 41 is the state diagram corresponding to FIG. 40.

FIG. 42 is a detailed block diagram for the Synchronization Maintenance Controller, while FIG. 43 is the state diagram corresponding to FIG. 42.

FIG. 44 is a detailed block diagram for the Maintenance Error Measurement Counter, while FIG. 45 is the state diagram corresponding to FIG. 44.

FIG. 46 is a detailed block diagram for the Call Termination Controller, while FIG. 47 is the state diagram corresponding to FIG. 46.

FIG. 48 is a detailed block diagram for the Wideband Call Request Detection Controller, while FIG. 49 is the state diagram corresponding to FIG. 48.

FIG. 50 is a detailed block diagram for the Supplemental Call Controller, while FIG. 51 is the state diagram corresponding to FIG. 50.

Figure 6A:
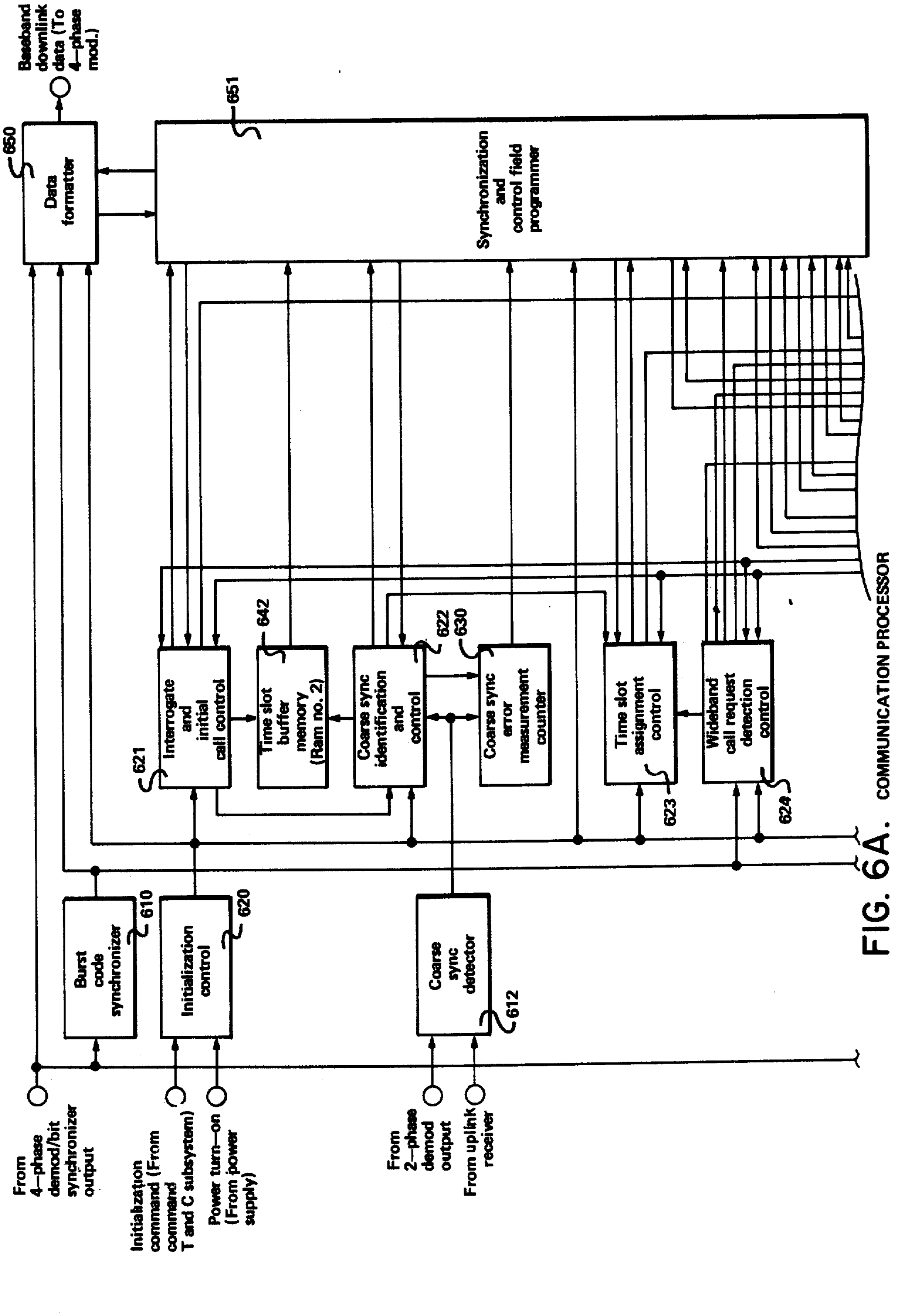
FIG. 6 (comprising FIGS. *6a* and *6b*) is a functional block diagram of the Communication Processor portion of a Processing Repeater in accordance with the present invention.

Each of these figures will now be described in detail.

DETAILED DESCRIPTION OF A PREFERRED EMBODIMENT

FIG. 1 shows a preferred embodiment of a fully variable, demand assignment, time division multiple access communication system in accordance with the present invention.

The complete system comprises a processing repeater spacecraft 100, a number of ground data terminals 110, and various radio frequency communication links 121, 122 and 123. The system operates under the control of a processing repeater contained within spacecraft 100. This repeater handles both the assignment (on a demand basis) of time slots and overall system synchronization, in addition to reformatting bursts of wideband uplink communication data from the various terminals before they are retransmitted via the spacecraft's wideband downlink. For convenience, such a system is hereinafter referred to as a Spacecraft Synchronized Time Division Multiple Access ($S^2$TDMA) System.

The following detailed description of a $S^2$TDMA system and its various components assumes that the digital modulation technique employed is PCM 4-phase PSK and that the system requires a maximum capability of 400 two-way voice or data circuits in the spacecraft, each having a sample rate of 8000 8-bit PCM samples per second, 16 such samples being accumulated prior to transmission. However, depending on the particular requirements of the intended application, it will be obvious to those skilled in the digital communications art to employ other modulation techniques, (for example, delta modulation in 4-phase PSK), as well as other sample rates, resolution and number of channels. It should be noted that a particular data terminal need not be always "active" (currently transmitting wideband transmission bursts via one or more assigned channels); hence it is possible to have more terminals than channels.

COMMUNICATION LINKS

The $S^2$TDMA system utilizes the following types of communication links: (1) wideband downlink 121, (2) wideband uplink 122, and (3) narrowband uplink 123. The wideband links 121 and 122 are utilized primarily for the communication of voice and other data, whereas the narrowband uplink 123 is utilized to accomplish rapid initial coarse synchronization of a data terminal 110. Subsequent fine synchronization, as well as placing a call to another terminal, is accomplished through the wideband uplink on a non-interference basis with any assigned channel. The wideband downlink 121 includes a synchronization and control field, which is utilized by the spacecraft 100 to interrogate and call the date terminals in order to set up a circuit connection, to provide a time reference for uplink synchronization of the terminals, and to provide other control functions.

The uplink frame period is divided into a number of individually assignable time slots. The wideband uplink frame format, shown in FIG. 2*a*, consists of a composite of non-overlapping transmission bursts from the active data terminals in the system. The format is configured to contain 800 time slots, each time slot being employed for a single transmission burst. This corresponds to 400 two-way voice or data circuits comprising two adjacent time slots. Since the data sample rate is assumed to be 8000 samples per second and the number of accumulated data samples is assumed to be 16, the uplink frame period is 2000 microseconds (i.e., 16 × 125 microseconds). A time slot duration is therefore 2.5 microseconds (i.e., 2000 ÷ 800 microseconds). Each data transmission burst time slot, as shown in FIG. 2*b*, consists of a preamble 210 and 16 accumulated 8-bit PCM data samples 220. The number of bits employed for the preamble is 40. The call request portion 230 of the preamble is used to make a call request whenever a terminal 110 has one or more active channels and wishes to place another call. The preamble 210 also includes guard time 231 (required to maintain adequate separation between transmission bursts from different ground terminals 110), carrier acquisition time 232, bit acquisition time 233, and a unique word 234 used in the synchronization maintenance process and for determining the first bit of data. Since the data burst contains the equivalent of 168 bits and the time slot duration is 2.5 microseconds, the wideband uplink bit rate is 67.2 Mbps. Each fine sync code transmission burst, as shown in FIG. 2*c*, consists of guard times 240 and 241, carrier acquisition time 242, bit acquisition time 243, and fine sync code 244. The fine sync code transmission, which is required only during initial synchronization of a terminal, provides the spacecraft's processing repeater with the raw data for measuring the initial fine sync error. A 31-bit pseudo-noise (PN) sequence is chosen for the fine sync code 244. The spacecraft detection algorithm allows three bit errors in the code which, in conjunction with a code length of 31 bits, provides a theoretical false alarm rate of approximately one call in 39,200 and a miss rate of one call in 8,500, assuming a bit error probability of $1 \times 10^{-5}$. The 117-bit total guard time 240 and 241 allows a ± 0.85 microsecond tolerance for the coarse error measurement.

The wideband downlink format is a continuously transmitted PCM telemetry-like frame with a frame period of 2000 microseconds (i.e., the same as the wideband uplink frame period). A typical wideband downlink frame, shown in FIG. 2*d*, consists of a composite of 25 minor frames 250. Each minor frame 250, as shown in FIG. 2*e*, consists of a synchronization and control field 260 and a data field 265. The data field 265 consists of 32 one-way data channels 260 (or 16 two-way data channels). Each data channel 266 consists of 16 accumulated data words, each 8 bits of length. The data field 265 therefore consists of 512 data words or 4096 bits. The synchronization and control field 260, requires an additional 96 bits; hence, a minor frame 250 consists of 4192 bits; resulting in a downlink bit rate of 52.4 Mbps and a downlink efficiency of 4096:4192. The synchronization and control field 260 as shown in FIG. 2f consists of a minor frame sync code 270, minor frame number 280, terminal address 281, command word 282, and command magnitude 283. The minor frame sync code 270 is a unique word which is utilized by all terminals to obtain downlink minor frame synchronization. The minor frame number 280 identifies the particular minor frame 250 is the frame.

UPLINK SYNCHRONIZATION

Before a terminal can transmit voice or other data via the wideband uplink, it must be synchronized to the spacecraft downlink format to assure that its uplink transmission burst does not interfere with a transmission in an adjacent time slot. If the terminal is not currently active, it must be synchronized through the initial synchronization process. If it is active, synchronization is provided through the synchronization maintenance process.

Using the spacecraft 100 as a time reference, the beginning of each uplink frame is assumed to coincide with the beginning of each downlink frame. Thus, in order for a data terminal 110 to be synchronized to uplink transmissions from other terminals, it is sufficient for the terminal to synchronize itself to the spacecraft downlink format compensated for the one-way propagation delay from the data terminal 110 to the spacecraft 100. It should be noted that it is not necessary for the terminal to "know" the absolute link delay; it need know only the incremental delay required to make the link delay an integral number of frame periods. In the $S^2$TDMA system, this incremental delay is measured by the spacecraft's processing repeater. The computed result is transmitted to the ground terminal 110 via the spacecraft's downlink 121.

The INITIAL SYNCHRONIZATION process first utilizes the wideband downlink and the narrowband uplink to achieve coarse synchronization, then the wideband downlink and wideband uplink to achieve fine synchronization. After a particular terminal 110 detects, through the control field 260 of the downlink format, that it is being interrogated or called, the terminal desiring to place a call or being called responds with a coarse sync signal through the 100 kHz bandwidth narrowband uplink 123. The coarse sync signal format is shown in FIG. 3. The first 125 microseconds provides adequate time for narrowband uplink carrier acquisition, and the signal transition 300 provides timing information for the coarse synchronization measurement. The spacecraft's processing repeater detects the occurrence of the coarse synchronization signal transition 300 and measures the time interval between the transition occurrence and the next downlink start-of-frame (i.e., incremental coarse sync error measurement). The provision in the $S^2$TDMA system of a narrowband uplink 123 in addition to the wideband uplink 122 allows the terminal 110 to transmit at full power high signal-to-noise ratio through the narrowband uplink 123. Since the transmitter power at the terminal is such as to assure a wideband uplink ratio of energy per bit to one-sided noise spectral density ($E_b/N_o$) of +10 dB at the input to the spacecraft's 4-phase burst demodulator (to attain a bit error rate of approximately $10^{-5}$), the signal-to-noise ratio of the 100 kHz bandwidth coarse sync signal transmitted at the same power level is approximately +38 dB at the input to the 2-phase burst demodulator. This relatively high signal-to-noise ratio assures the detection of the coarse sync signal with enough precision (3-sigma accuracy better than ±0.8 microseconds) to eliminate the need for a statistical averaging process. Having completed the measurement, the spacecraft's processing repeater provides the digitized coarse sync error measurement and an uplink time slot assignment to the terminal 110 through the control field 260 of the wideband downlink.

After it receives its coarse sync error measurement and assigned time slot, the terminal 110 transmits a fine sync code in its assigned time slot. The fine sync code burst format as shown in FIG. 2*c* includes a total guard time of 117 bits. Since the transmission of fine sync code requires approximately 0.76 microseconds and the time slot duration is 2.50 microseconds, the digitized coarse synchronization error measurement accuracy must actually be better than ±0.87 microseconds, in order that the fine sync code transmission not interfere with data transmissions from other terminals. The spacecraft's processing repeater detects the occurrence of the fine sync code within a window about the assigned time slot and measures the fine sync error. The fine sync error is determined within ± 1 uplink bit times. The processing repeater then transmits the digitized fine sync error measurement to the terminal through the wideband downlink. Upon receipt of the fine sync error, the terminal is ready for wideband uplink communication with a synchronization accuracy of ± 1 uplink bit time.

Once initial synchronization is achieved, the spacecraft must continue to perform a FINE SYNCHRONIZATION MAINTENANCE function for the terminal, since the link delay between the terminal 110 and the spacecraft 100 may vary with time because of spacecraft-terminal relative motion and other variable propagation effects. The terminal, once initially synchronized, continues to transmit in its assigned time slot (or time slots) for as long as it is "active". The spacecraft processor periodically monitors uplink transmissions in each assigned time slot, detects the burst synchronization unique word, and measures the fine sync error. The processor then periodically transmits the digitized fine sync error measurement to the relevant terminal 110 through the wideband downlink 121. The assigned time slots are monitored at a sufficient rate relative to the maximum rate of change of the link delay to assure a typical fine sync tolerance of less than ± 2 uplink bit times.

DEMAND ASSIGNMENT OPERATION

The demand assignment operation consists of three phases: call request, call placement, and circuit release. In the CALL REQUEST phase, a terminal wishing to place a call is assigned a data channel. In the CALL PLACEMENT phase, the spacecraft processing relay calls the called terminal and assigns it a data channel, thus completing the two-way channel. In the CIRCUIT RELEASE phase, the previously active channels are returned to the pool of available channels.

The CALL REQUEST operation depends on whether the particular terminal already has an active channel or not, since an active terminal is already synchronized and the inactive terminal is not. The inactive terminal must wait for an interrogate command from the spacecraft before it can initiate its call request and receive initial synchronization. The active terminal need wait only for its next active uplink time slot to place its call request.

When an inactive data terminal receives a request to place a call from one of its incoming subscriber lines, the terminal temporarily stores the request and waits to be interrogated by the spacecraft through the wideband downlink. A terminal 110 is able to detect that it is being interrogated by recognizing its terminal address along with an interrogate command in the control field 260 of the wideband downlink format. When the terminal detects such an interrogate command, it responds with a coarse synchronization signal through the narrowband uplink 123. This initiates the initial synchronization process discussed previously. Since the spacecraft's processing relay sequentially interrogates each data terminal in the system, it can space the interrogations in time to assure that the narrowband uplink transmission bursts do not overlap. Upon receiving the relevant fine sync error measurement, the data terminal corrects its transmission burst position, thereby completing its initial synchronization and one-half of the two-way channel. The terminal then transmits a phone number (consisting at a minimum of the address of the other terminal and of the subscriber to which it wishes to be connected) in order to establish the second half of the channel.

When an active terminal receives a request to place a call from one of its subscriber lines, the data terminal temporarily stores the request and waits for one of its active uplink time slots. The data terminal then responds with a "Call Request" signal in the call request field 230 of its uplink burst format. Since the spacecraft normally monitors each uplink burst from each data terminal, it detects the call request, assigns a channel, and transmits the time slot assignment to the terminal. When the terminal receives its new time slot assignment, it transmits the address to the terminal and of the subscriber to which it wishes to be connected.

To complete the two-way channel (circuit) connection, the spacecraft must call the data terminal that has been addressed. This CALL PLACEMENT operation also depends on whether the called terminal has an active channel or not. The inactive terminal must wait for an "Initial Call" command from the spacecraft before the call placement process can be initiated, while an active terminal waits only for a "Supplemental Call" command and the subscriber address. When an inactive terminal receives such an initial call command, it responds with a coarse synchronization signal which initiates the initial synchronization process previously described. Once the called terminal is properly synchronized, and informed of its assigned time slot and the address of the subscriber being called, data communication may commence through the established circuit.

The maximum call setup time for the system occurs when making a circuit connection between two inactive terminals. The call setup time depends principally on two factors: (1) the maximum difference in link delay between any two terminals in the system and (2) the number of data terminals in the system. The maximum link delay difference affects the call setup time by limiting the interrogation and initial call rate of the system.

The CIRCUIT RELEASE operation frees the assigned channels for a new assignment. When a terminal detects a termination signal from an incoming subscriber line, it transmits a termination pattern in its assigned time slot. The spacecraft processor and the other terminal detect this termination pattern and proceed to free the relevant channels.

Thus it may be seen that a $S^2$TDMA system in accordance with the present invention permits any data terminal to complete a circuit to any other data terminal, the synchronization function for all terminals being under the central control of a processing repeater located onboard the spacecraft. Such a system, in the particular embodiment described, also optimizes the use of both terminal and spacecraft transmitters by permitting terminals to be in an "inactive" state wherein they are not regularly transmitting synchronization and data signals, by providing for a narrowband uplink (having a high signal-to-noise ratio) for "Coarse Synchronization" signal from an inactive terminal, and by reformatting the wideband uplink transmission burst data into a continuous downlink of narrower bandwidth. A particular embodiment of a $S^2$TDMA spacecraft processing repeater will now be discussed in detail with reference to FIGS. 4–51 of the drawings. It should be noted that the application of the $S^2$TDMA concept need not be limited to a digital communication system having fixed ground stations and a satellite relay, but rather may find application to mobile ground, airborne, or space data terminals, while the processing relay itself need not be located on a spacecraft nor be airborne but may be in a fixed or mobile ground station, provided it can maintain reliable direct communication links to the various data terminals in the system.

$S^2$TDMA SPACECRAFT PROCESSING REPEATER

The processing repeater included within spacecraft 100, is shown in block form in FIG. 4. It consists of the following components: receive antenna 400, uplink receiver 410, 4-phase burst demodulator/bit synchronizer 420, 2-phase burst demodulator 430, communication processor 440, 4-phase modulator 450, downlink transmitter 460, and transmit antenna 470. Functionally, it receives uplink data bursts from data terminals 110 in the system; translates them to intermediate frequency (IF) signals; demodulates these IF signals to baseband signals; processes and reformats the baseband signals, providing system control and a processed output signal; remodulates the processed signal onto an IF signal; translates this signal to an RF signal; and transmits this signal to all the data terminals in the system. The individual components will now be discussed.

The RF equipment includes the receiver 410 and the transmitter 460. The uplink receiver 410 accepts the receive antenna output, amplifies the received signal, and translates it to an intermediate frequency (IF). Its performance characteristics are typical of any receiver, having a bandwidth somewhat greater than the received signal rate frequency. The downlink transmitter 460 need satisfy no additional requirements beyond those normally imposed for handling a four-phase PSK IF signal input.

The IF equipment includes demodulators 420 and 430 as well as modulator 450. The four-phase demodulator/bit synchronizer 420 accepts the receiver IF output and provides a serial non-return to zero (NRZ) binary data stream as an output. The demodulator portion has the function of rapidly acquiring a coherent IF reference and coherently demodulating the in-phase and quadrature phase four-phase phase shift keyed (PSK) data to two baseband signals. The demodulator configuration is a so-called modified Costas loop. The output signals are sent to the bit synchronizer portion and to filters. The filters are sampled by the timing signal from the bit synchronizer thereby regenerating the NRZ bit stream sent from the data terminal. The bit synchronizer must rapidly acquire bit timing which is synchronized to the two demodulator output baseband signals. This unit is typical of four-phase PSK demodulators used with conventional TDMA systems. Bit error rate versus required $E_b/N_o$ should be typically within 3db of theoretical.

The two-phase burst demodulator 430 is similar to, but simpler than the four-phase PSK demodulator 420. Acquisition requirements can be less rapid and the demodulator configuration is a Costas loop, rather than a modified Costas loop. Furthermore, no bit synchronization is required; this is replaced by a simpler zero crossing detector which follows the demodulator filter output.

The four-phase modulator 450 is a standard four-phase PSK modulator, having a continuous bit stream as its input and producing as an output two PSK signals, one on an IF which is in quadrature with the other. Its function is to split the input data stream into two bit streams, each at half the bit rate of the input stream. One of the two lower rate bit streams PSK modulates the IF reference; the second bit stream PSK modulates the IF reference after it is shifted by 90°.

Antennas 400 and 470 are conventional broadband spacecraft antennas having a gain pattern sufficient to receive from or transmit to all data terminals in the system.

The communication processor 440 is unique to the $S^2$TDMA system and is shown in functional block diagram form in FIG. 6, while its component parts and their operation are further detailed in FIGS. 7 through 51. It performs the following principal functions: (1) converting the sequence of uplink transmission bursts into a continuous downlink PCM transmission format, inserting system control commands as required, (2) sequentially interrogating terminals for initial call requests, (3) providing inactive data terminals participating in a call with initial synchronization, (4) assigning time slots to data terminals upon demand, (5) maintaining synchronization of all active data terminals in the system, (6) providing initial call commands to all inactive terminals being called, (7) providing called subscriber addresses to called terminals, (8) accepting call requests from active terminals, (9) providing "all circuits busy" commands when all repeater time slots are full, and (10) initializing the system upon ground command or upon power turn-on.

$S^2$TDMA DATA TERMINAL

A typical $S^2$TDMA data terminal 110 is shown in FIG. 5. The data terminal receives and translates a continuous four-phase PSK signal to an intermediate frequency (IF) signal, demodulates the IF signal to a baseband signal, decommutates its assigned data channels, and digital to analog converts them for transmission to its subscriber lines. The terminal also accepts analog data from its subscriber lines, multiplexes and analog-to-digital converts them into digital data channels, four-phase modulates the data channels onto an IF signal for burst transmission, and translates and transmits the four-phase burst modulation signals. Rate buffering is necessary to convert the data sample bit rate to the uplink bit rate, to convert the downlink bit rate to the data sample bit rate, and for storing the 16 data samples of each active data channel.

In addition to its data transfer function, the data terminal must perform the following control functions: placing calls upon demand from the interface unit in response to spacecraft commands; receiving calls from other terminals in response to spacecraft comands; and accepting and executing control signals from, and providing control signals to, the user interface unit as part of the call placement and call request operations.

Data terminal 110 therefore comprises RF equipment, IF equipment, and digital equipment. The RF equipment includes a transmit/receive antenna 510, an uplink transmitter 520, and a downlink receiver 521. The IF equipment includes a four/two-phase burst modulator 530 and a four-phase PSK demodulator/bit synchronizer 531. The digital equipment operates under the control of terminal controller 540 and includes a frame synchronizer 550, an uplink formatter 560, downlink rate buffer 570 and associated decoder 571, as well as uplink rate buffer 580 and its associated decoder 581. The data terminal also includes a user interface unit 590 for interfacing with subscriber lines 591.

Uplink transmitter 520 transmits bursts of data in the same manner as the ground terminal transmitter in a conventional TDMA system. Its input is provided by the four/two-phase PSK burst modulator 530 output signal, which is translated to the transmit frequency, amplified and sent to antenna 510.

Downlink receiver 521 receives a continuous four-phase PSK signal from the terminal antenna 510, amplifies this signal and translates it to an IF which is output to four-phase modulator 531. It is similar in functional requirements to ground terminal receivers for a conventional TDMA system (and $S^2$TDMA spacecraft receiver 410), except that the received signal is continuous rather than in burst format.

Four/two-phase burst modulator 530 in its four-phase portion is functionally similar to the spacecraft four-phase PSK modulator 450 except for the additional requirement to operate in a burst mode, which is typical of conventional TDMA systems modulators. The two-phase mode for modulator 530 is readily provided by disconnecting one of the two-phase modulators from the four-phase modulator output.

Four-phase PSK demodulator/bit synchronizer 531 is basically a standard four-phase PSK demodulator and bit synchronizer. Its input and output signals differ from those for the spacecraft demodulator bit synchronizer 420 in that they are continuous, i.e., not in bursts. The continuous signal simplifies the demodulator/bit synchronizer, as compared to the spacecraft unit, since neither acquisition of the IF or bit timing must be rapid.

The digital equipment portion of data terminal 110 comprises controller 540, synchronizer 550, formatter 560, downlink rate buffer 570 and decoder 571 and uplink rate buffer 580 and encoder 581. This equipment is required to perform the following functions: multiplexing, encoding, and rate buffering active data channels from user (subscriber) interface unit 590; formatting uplink data bursts; downlink frame synchronizing, decommutating, and rate buffering active data channels from frame synchronizer 550; decoding and demultiplexing data from rate buffer 570 to user interface unit 590; accepting, decoding, and executing spacecraft commands to place calls upon demand from the interface unit; accepting, decoding, and executing spacecraft commands to receive calls from other terminals; and accepting and executing control signals from, and providing control signals to, the user interface unit 590 as part of the call placement operation.

A particular embodiment of a ground data terminal suitable for use in an $S^2$TDMA system is described in detail in the application of Messrs. Schlosser and Moreno entitled "Data Terminal for use with TDMA Processing Repeater", filed on even date herewith and assigned to the same assignee.

REPEATER COMMUNICATION PROCESSOR

Communication processor 440 is shown in function block form in FIGS. 6A and 6B. It consists of six types of functional blocks: (1) signal and code detectors, (2) controllers, (3) time interval measurement processors, (4) memories, (5) formatters, and (6) timing.

The SIGNAL AND CODE DETECTORS include the following: burst code synchronizer 610, coarse sync detector 612, fine sync code detector 614, and call termination detector 616. These signal and code detectors detect the occurrence of a particular code or signal and precisely detect its position in the uplink frame format.

The CONTROLLERS include the following blocks: initialization control 620, interrogate and initial call control 621, coarse sync identification and control 622, time slot assignment control 623, wideband call request detection control 624, fine sync measurement control 625, phone number detection control 626, fine sync maintenance control 627, call termination control 628, the supplemental call control 629. The controllers control the programming of the control field portion of the downlink format, control the updating of the time slot status and terminal status memories, and the detection and processing of the detected signals and codes.

The TIME INTERVAL MEASUREMENT PROCESSORS consist of the following: coarse sync error measurement counter 630, fine sync error measurement counter 631, and maintenance error measurement counter 632. These processors measure the time interval between the occurrence of their respective signal or code events and the correct position as provided by the uplink time slot timing.

The MEMORIES consist of the following: time slot status memory 640 (also referred to hereinafter as "RAM No. 1"), terminal status memory 641 (also referred to hereinafter as "RAM No. 3"), and time slot buffer memory 642 (also referred to hereinafter as "RAM No. 2"). The time slot status memory 640 and terminal status memory 641 store the current status of the time slots and the terminals for use by the controllers and also store the addresses of the terminals using each of the time slots as well as the subscriber addresses to be transmitted to the called terminals. The time slot status data may indicate to the controllers any of the following for each time slot: search for fine sync code in time slot, search for phone number in time slot, place a new call, or time slot is available. The terminal status data indicates to the controllers whether a particular terminal is active or inactive. The time slot buffer memory 642 temporarily stores the assigned time slot numbers in the initial call process.

The FORMATTERS include the following blocks: data formatter 650, the synchronization and control field programmer 651. The data formatter 650 controls the formatting of downlink frame format (FIG. 3) and provides the rate buffering for converting the uplink burst data to a continuous downlink bit stream. The synchronization and control field programmer 651 under control of the controllers 620 through 629 formats the synchronzation and control field portion 310 of the downlink, inserting the appropriate terminal address, command, and command magnitude in fields 281, 282, and 283 respectively.

The UPLINK TIME SLOT TIMING 660 provides most of the timing for the communication processor 440 and provides the frame reference for the $S^2$TDMA system.

The functional relationship of the various functional blocks comprising the communication processor having been discussed above with particular reference to FIG. 6, each such block will now be described in sufficient detail to enable one skilled in the digital communication art to practice the present invention.

The COARSE SYNC DETECTOR, as shown in FIG. 7, detects the coarse sync signal and signal transition. The coarse sync signal detector 710 is a bandpass filter, threshold detector, and leading and trailing edge generator. The transition detector 720 generates a pulse at the coarse sync signal transition.

The operation of the coarse sync detector circuit 730 is defined in state diagram form by FIG. 8. The detector circuit 730 begins (state 800) by waiting for the leading edge 741 of coarse sync signal. When the leading edge occurs, the circuit waits (state 810) approximately 50 microseconds for the 2-phase burst demodulator 530 to settle, then waits (state 820) for the coarse signal transition 742. When the transition occurs, the circuit generates (state 830) a coarse sync detected signal 743 and then waits (state 840) for the trailing edge pulse 744 from the coarse signal. The circuit returns to its wait for coarse sync signal (state 800) when the trailing edge pulse 744 occurs.

The BURST CODE SYNCHRONIZER 610 performs functionally like a burst code synchronizer in a conventional TDMA system, except that it is located in the spacecraft. Its input is NRZ data and the uplink data bit rate clock, which is provided by the four-phase burst PSK demodulator/bit synchronizer 420. The data has been formatted as a data burst at a data terminal 110, and each burst of data is preceded by a unique synchronization word 234. Burst code synchronizer 610 searches for and detects that unique word within a narrow search window provided by uplink time slot timing 660. The burst code synchronizer provides a pulse indicating the position of the data burst and a data envelope at its output.

The FINE SYNC CODE DETECTOR 614 performs functionally like the burst synchronizer 610, except that it must detect a longer fine sync code 244 within a wider detection window. The fine sync code detector searches for and detects the fine sync code. This permits the identification of the position of the burst within the assigned time slot and allows the burst synchronization error to be determined by the fine sync measurement counter 631.

The CALL TERMINATION DETECTOR, shown in FIG. 9, detects the call termination pattern. The call termination detector requires that a predetermined number "*k*" of call termination words in a row (each 8 bits in length) be detected by word occurrence detector 910 before call termination is declared. The events counter 920 keeps track of the number of occurrences 930. The shift register 940, call termination word decoder 950, uplink data bit timing 960, are utilized by call termination word occurrence detector 910 to detect the occurrence or non-occurrence of the call termination word.

The operation of the call termination detection control block 970 is defined in the state diagram of FIG. 10.

The DATA FORMATTER 650, shown in FIG. 11 in block diagram form, performs the following functions: converting the uplink bit rate of 67.2 Mbps (168 bits per 2.5$\mu$sec) to the downlink bit rate of 52.4 Mbps (4192 bits per 80$\mu$sec), controlling the downlink formatting, inserting the termination pattern into all downlink channels when the communication processor is in the initialization mode, and providing downlink timing.

The rate buffering is accomplished in shift registers 1101 through 1103. The time slot data is alternately written into shift registers 1101, 1102, and 1103, at the uplink bit rate as indicated in the timing diagram in FIG. 12. The routing of the time slot data is accomplished by the data steering logic 1110, which is controlled by timing pulses "write No. 1", "write No. 2", and "write No. 3". These write pulses are coincident with the uplink time slots. The data in the shift registers are then alternately read at the downlink bit rate, as controlled by the "read No. 1", "read No. 2", and "read No. 3" timing pulses. The timing assures that the data is not read from a shift register, 1101, 1102 or 1103, until the input data is completely written into it.

The formatting is performed by the digital multiplexer 1120. In the normal mode, the multiplexer 1120 multiplexes the synchronization and control data from synchronization and control field programmer 651 into the output bit stream once per minor frame 300 and multiplexes the data channels which are stored in the shift registers 1101, 1102, and 1103 during the remaining portion of the frame. In the initialization mode, digital multiplexer 1120 multiplexes the synchronization and control field data and then multiplexes call termination patterns during the remaining portion of the minor frame. The call termination pattern data is generated by the parallel-in, serial-out shift register 1130 which is periodically loaded with a fixed termination pattern and then read.

The digital multiplexer 1120 is controlled by the downlink timing, consisting of a downlink clock generator 1140, bit timing 1150, channel timing 1160 and minor frame counter 1180. Clock generator 1140 provides the downlink bit rate clock (i.e., 52.4 mHz). Downlink bit timing 1150 provides the termination pattern load pulse and the data channel clock. Downlink channel timing 1160 provides the read envelopes and the synchronization and control field load pulse. Bit timing 1150 and channel timing 1160 get reset every 32 time slot times by a minor frame sync pulse (1 minor frame contains 32 time slots).

The write timing 1170 provides the write envelopes. It is clocked by the time slot clock from the uplink time slot timing 660. It is reset every 32 time slot times with the same minor frame sync pulse as in the downlink timing 1160. A minor frame counter 1180 is also provided, which receives a frame sync pulse every frame time from uplink time slot timing decoder 1350. It supplies the minor frame number to the synchronization and control field programmer 651.

The UPLINK TIME SLOT TIMING 660, shown in block diagram form in FIG. 13, provides all the communication processor timing which is not provided by either the uplink timing from the four-phase burst demodulator/bit synchronization 520 or by the downlink timing from the data formatter 650. Hence, it provides the major portion of the communication processor timing. Uplink clock generator 1310 provides a stable uplink clock of 67.2 mHz. Uplink bit timing 1320 provides all the bit timing within a time slot by dividing the uplink clock from generator 1310 by 168. Uplink time slot timing 1330 provides all the time slot timing within a frame by dividing the time slot clock from the uplink bit timing 1320 by 800. Interrogate timing 1340 provides an interrogate delay pulse having as its period an integral number of frames greater than the maximum difference in link delay between any two terminals in the system. This interrogate delay pulse is used by the interrogate and initial call controller 621 to establish the interrogation and initial call rate of the system. A typical period for the interrogate pulse might therefore be 16 milliseconds. Time decoder 1350 is the source of such miscellaneous timing pulses as "start phone number search" and "stop phone number search", which mark precise bit times, but do not recur every time slot.

The SYNCHRONIZATION AND CONTROL FIELD PROGRAMMER 651, shown in block diagram form in FIG. 14, controls the programming of the synchronization and control field 260 in each minor frame 250. The programmer inserts a "hardwired" minor frame sync code and a minor frame number from the data formatter 650 for the synchronization portions 270 and 280 in each minor frame. The control field data, which as noted above, may consist of a terminal address subfield 281, command subfield 282, and command magnitude subfield 283, is determined by the status of "ready" signals at the programmer input and the state of its priority timing circuit 1410. The ready signals indicate a request for particular control field programs. For example, an "interrogate ready" signal from the interrogate and initial call control circuit 621 requests that an interrogate command be sent to a particular data terminal 110. (The particular terminal address is also furnished to the programmer in this instance by circuit 621). Table 1 lists the various commands, together with the designation of the relevant ready signal or signals, the source of the "ready" signals, the destination of the "accepted" signals, a description of the contents of the command magnitude subfield 283 and their respective sources, together with the respective source of the relevant terminal addresses for terminal address subfield 281. Table 1 also describes the data terminal action to be taken by the addressed data terminal in response to a particular spacecraft command.

Since more than one ready signal may be received simultaneously, a circular priority system is provided. This priority system operates according to the state diagram for the programmer control circuit 1420 shown in FIG. 15 and the various control signals designated on that FIG. 15 are detailed in Table 2. Control circuit 1420 is normally quiescent in the "ready for load" state. It circulates through the ready signal inputs T1 through T8 under control of the priority timing circuit 1410, searching for a ready indication before the next start of minor frame 250. If, for example, it detects a "coarse error measurement ready" signal from coarse error measurement controller 2980 of coarse sync error measurement circuit 630, it advances to the "coarse sync error transmission" state and inhibits advancement of priority timing circuit 1410. The controller 1420 generates a "coarse sync error accepted" signal for digital multiplexer 1430 (which is also received by circuit 630) which multiplexes the terminal address from

TABLE 1

SPACECRAFT GENERATED COMMANDS AND DATA TERMINAL RESPONSE

| SPACECRAFT (S.C.) COMMANDS | READY SIGNAL DESIGNATION | READY SIGNAL SOURCE | ACCEPTED SIGNAL DESTINATION | COMMAND MAGNITUDE DESCRIPTION | COMMAND MAGNITUDE SOURCE | DATA TERMINAL ADDRESS SOURCE | DATA TERMINAL (D.T.) ACTION |
|---|---|---|---|---|---|---|---|
| Interrogate | Ready for interrogate command | Interrogate and initial call control circuit 2200 | Interrogate and initial call control circuit 2200 | Not Applicable (N.A.) | N.A. | Interogate counter 2210 | If D.T. has no user call requests, command is ignored. If D.T. has user call request and is not active, D.T. responds with coarse sync signal which begins the initial synchronization process. |
| Initial Call | Ready for initial call command | Interrogate and initial call control circuit 2200 | Interrogate and initial call control circuit 2200 | N.A. | N.A. | Called terminal address counter 2290 | D.T. responds with coarse sync signal which begins the initial synchronization process. |
| Supplemental Call | Supplemental call command ready | Supplemental call control 5000 | Supplemental call control 5000 | N.A. | N.A. | Buffer register 5020 | D.T. waits for time slot assignment and subscriber address. |
| Time Slot Assignment | Time slot assignment ready | Supplemental call control 5000 | Supplemental call control 5000 | Active called terminal uplink T.S. assignment | Buffer register 5022 | Buffer register 5020 | D.T. uses time slot number (and corresponding down link data channel number) to transmit (and receive) data. |
| | Ready for supplement T.S. assignment | Time slot assignment control 3100 | Time slot assignment control 3100 Wideband call request detection control 4800 | Active calling terminal uplink T.S. assignment | Buffer register 3110 | Buffer register 4810 | |
| | Ready for initial T.S. assignment | Time slot assignment control 3100 | Time slot assignment control 3100 Coarse sync ID control 2700 | inactive calling terminal uplink T.S. assignment | Buffer register 3110 | Buffer register 2730 | |
| | Ready for initial T.S. assignment (called terminal) | Coarse sync ID control 2700 | Coarse sync ID control 2700 | Inactive called terminal uplink T.S. assignment | Buffer register 2430 | Buffer register 2730 | |

TABLE 1 – Continued

SPACECRAFT GENERATED COMMANDS AND DATA TERMINAL RESPONSE

| SPACE-CRAFT (S.C.) COMMANDS | READY SIGNAL DESIGNATION | READY SIGNAL SOURCE | ACCEPTED SIGNAL DESTINATION | COMMAND MAGNITUDE DESCRIPTION | COM-MAND MAGNI-TUDE SOURCE | DATA TERMINAL ADDRESS SOURCE | DATA TERMINAL (D.T.) ACTION |
|---|---|---|---|---|---|---|---|
| Subscriber Address | Ready for subscriber address transmission | Fine sync measurement control 3300 | Fine sync measurement control 3300 | Data terminal subscriber number called (inactive called terminal) | Buffer register 3320 | Buffer register 3310 | D.T. transmits subscriber address to user interface unit as part of call request. |
| | Subscriber address transmission ready | Supplemental call control 5000 | Supplemental call control 5000 | Data terminal subscriber number called | Buffer register 5021 | Buffer register 5020 | |
| All Circuits Busy | Ready for all circuits busy (NB request) | Time slot assignment control 3100 | Coarse sync ID control 2700 Time slot assignment control 3100 | N.A. | N.A. | Buffer register 2730 | D.T. terminates call placement in progress and transmits circuits busy signal to interface unit user. |
| | Ready for all circuits busy (WB request) | Time slot assignment control 3100 | Wideband call request det control 4800 Time slot assignment control 3100 | N.A. | N.A. | Buffer register 4810 | |
| Coarse Sync Measurement | Coarse error measurement ready | Coarse error measurement control 2900 | Coarse error measurement control 2900 | Time interval measurement between S.C. detected coarse sync signal transition and S.C. end of frame. | Buffer register 2930 and sub-tractor 2920 | Buffer register 2730 | D.T. uses measurement to coarse synchronize uplink timing. |
| Fine Sync Measurement | Ready for fine sync error transmission | Fine sync measurement control 3300 | Fine sync measurement control 3300 and fine sync error measurement counter control 3500 | Time interval measurement between S.C. detected fine sync code occurrence and expected code position. | Sign storage 3520 and buffer register 3530 | Buffer register 3310 | D.T. uses measurement to update uplink timing synchronization established with coarse sync measurement |
| Fine Sync Maintenance Measurement | Ready for fine sync maintenance transmission | Sync maintenance control 4200 | Sync maintenance control 4200 and maintenance error measurement control 4400 | Time interval measurement between S.C. detected unique word occurrence and expected unique word position | Sign storage 4420 and buffer register 4430 | Buffer register 4240 | D.T. uses measurement to maintain uplink timing synchronization. |

TABLE 2

FIG. 15 CONTROL SIGNALS

| DESIGNATION NO. | SIGNAL DESCRIPTION |
|---|---|
| 1 | T1.(READY FOR INTERROGATE COMMAND).INITIALIZATION |
| 2 | (LOAD SYNC AND CONTROL FIELD) |
| 3 | T2.(READY FOR INITIAL CALL COMMAND).INITIALIZATION |
| 4 | T3.(COARSE ERROR MEASUREMENT READY).INITIALIZATION |
| 5 | (LOAD SYNC AND CONTROL FIELD) |
| 6 | T4.(READY FOR FINE SYNC ERROR TRANSMISSION).INITIALIZATION |
| 7 | (LOAD SYNC AND CONTROL FIELD).CALLED TERMINAL |
| 8 | (LOAD SYNC AND CONTROL FIELD).(CALLED TERMINAL) |
| 9 | T5.(READY FOR SUPPLEMENT T.S. ASSIGNMENT).INITIALIZATION + T5.(READY FOR INITIAL T.S. ASSIGNMENT).INITIALIZATION |
| 10 | T6.(SUPPLLEMENTAL CALL COMMAND READY).INITIALIZATION |
| 11 | T7.(READY FOR FINE SYNC MAINTENANCE TRANSMISSION).INITIALIZATION |
| 12 | T8.(READY FOR ALL CIRCUITS BUSY (N.B. REQUEST).INITIALIZATION + T8 (READY FOR ALL CIRCUITS BUSY (W.B. REQUEST)).INITIALIZATION |

buffer register 2730 of coarse sync identification control circuit 622, a "hardwired" coarse sync error command, and the coarse error magnitude from register 2930 and subtractor 2920 of coarse sync error measurement circuit 630. When a "load sync and control field" pulse is received from the data formatter, the minor frame sync code, coarse error command, and command magnitude are inserted into the parallel-in serial-out shift register 1440; then the programmer control 1420 advances to the "initial time slot assignment (called terminal)" state. It might be noted that if a particular coarse sync error transmission is addressed to a calling terminal and thus there is no "ready for initial time slot assignment (called terminal)" signal present, the control circuit merely waits for the next "load sync and control field" pulse, and the relevant time slot assignment command (or possibly an all circuits busy command) will be transmitted during priority period T5 (or T8) when time slot assignment controller 623 has already located an available time slot and generated a "ready for initial T.S. assignment" signal.

The output of the synchronization and control field data from shift register 1440 is controlled by the "read No. 4" envelope and the downlink clock from data formatter 650. The synchronization and control field for other types of commands are generated in a similar manner.

The TIME SLOT STATUS MEMORY 640 (RAM No. 1), shown in block diagram form in FIG. 16, provides the following functions: storing the mode of each time slot, and storing addresses of the calling terminal, the called terminal and the subscriber. The data stored in this memory has the format as shown in FIG. 17.

Memory 1600 is addressed by the uplink time slot counter 1330. The data word is read at the beginning of each time slot, is stored in the data output register 1620 to provide current time slot status data to the rest of the communication processor 540, and is also stored in the data input register 1630 for possible updating. Input register 1630 is updated as requested by mutually exclusive write signals to combinatorial logic 1640, which provides the required set and reset signals to data input register 1630 in accordance with Table 3. The relevant terminal and subscriber addresses are loaded into the input register via digital multiplexer 1650, also in accordance with Table 3.

There are three mode bits in each data word (FIG. 17). For those time slots assigned to calling terminals (i.e., having an LSB equal to 0), these bits contain the following status information: initial fine sync search, phone number search, and time slot available. For those time slots assigned to called terminals (i.e., having an LSB equal to 1), the status bits are the following: initial fine sync search, new call, and time slot available.

counter 1330 with first a "0" LSB during write 2 time, and then a "1" LSB during write 3 time.

The memory read/write control is performed according to the state diagram in FIG. 18. Start of time slot and $t_1$ through $t_6$ signals are generated by the uplink bit timing 1320. The memory control outputs include "Read/Write Control", "Read/Write Clock", "Read Clock", input register "Load", "Write 1", "Write 2", and "Write 3". "Write 1" or "Write 3" are provided as a "write accepted" signal at time slot status memory 640's output to indicate that the write request was actually accepted from the controllers. FIG. 19 shows the relevant signals and their associated timing for a "call termination" sequence.

The INITIALIZATION CONTROL circuit 620, shown in block diagram form in FIG. 20, accepts a "power turn-on" indication from the power supply (not shown) or an "initialization" command from the spacecraft command decoder (not shown) whereupon it initiates the "communication processor initialization" mode. This mode indication causes a termination pattern to be inserted into all downlink channels, inhibits all processing of communication control command requests at the input to the synchronization and control field programmer 651, clears the time slot status memory 640 and terminal status memory 641, which makes all time slots available for new assignments, and resets the various controllers within the communication processor 540. The initialization mode lasts for 300 milliseconds, which is sufficiently greater than the two-way

TABLE 3

LIST OF SET/RESET AND LOAD OPERATIONS RELATIVE TO PARTICULAR EVENTS

| | WRITE | | | | |
|---|---|---|---|---|---|
| Event | Initial Fine Sync | Phone Number Search (Calling Terminal) | New Call (Called Terminal) | Time Slot Available | Terminal and Subscriber Addresses |
| Call Termination (Active Terminal) | Reset | Reset | Reset | Set | |
| Inactive Terminal) Time Slot Assignment (Calling Terminal) | Set | | | Reset | Load (Terminal Address Only) |
| Fine Sync Code Detection (Inactive Calling Terminal) | Reset | Set | | | |
| Phone Number Detection (Calling Terminal) | | Reset | | | |
| Phone Number Detection (Called Terminal) | | | Set | Reset | Load |
| Initial Call (Inactive, Called Terminal) | Set | | Reset | | |
| Fine Sync Code Detection (Inactive Called Terminal) | Reset | | | | |
| Active Terminal Time Slot Assignment (Calling Terminal) | | Set | | Reset | Load (Terminal Address Only) |
| Supplemental Call (Called, Active Terminal | | | Reset | | |

The least-significant-bit (LSB) selection gating 1660 assures that the mode status of each time slot of a time slot pair (corresponding to a single two-way circuit) gets cleared when a call termination is indicated, by replacing the time slot number LSB from the time slot link delay to allow all data terminals 110 in the system to detect the termination pattern and to terminate any on-going calls. The communication system is thus initialized.

The initialization control circuit 620 consists of simple control logic 2010 and a counter 2020. The operation of this control circuit is defined in the circuit state diagram of FIG. 21. The control logic 2010 provides an initialization mode indication to the rest of processor 540, a reset signal to the controllers, and resets for counter 2020. Counter 2020 indicates when the circuit has been in the initialization mode for 300 milliseconds whereupon the circuit returns to its quiescent state.

The INTERROGATE AND INITIAL CALL CONTROL circuit 621, shown in block diagram form in FIG. 22, performs three functions: (1) interrogating all inactive data terminals 110 for initial call requests, (2) providing synchronization to the coarse sync signal identification control circuit 622, and (3) calling all inactive terminals for which call requests have been received from calling terminals. The "interrogate" and "call" processes are performed separately and are non-overlapping. In other words, circuit 621 alternately performs the interrogate process, then performs the call process and so on. The individual interrogations and calls are separated by at least the maximum delay difference between any two terminals in the system (as established by an "interrogate delay" pulse from uplink time slot timing circuit 660) to guarantee that the coarse sync responses are non-interfering and that they can be identified by the order of their reception.

The operation of control portion 2200 of interrogate and initial call control circuit 621 is defined in the state diagram of FIG. 23. A reset pulse from initialization circuit 620 resets control portion 2200 to the interrogate mode, which causes the interrogate counter 2210 to be reset and an "ID counter sync pulse" to be generated a minimum link delay time after the resetting of counter 2210, which thereby provides synchronization to the coarse synchronization identification circuit 622.

After the interrogate counter 2210 has been reset, the circuit provides a "ready for interrogate command" signal to programmer 651. The programmer then generates an interrogate command with the terminal address specified by interrogate counter 2210. After this interrogate request is accepted by programmer 651, control circuit 2200 waits for the interrogate delay pulse from uplink time slot timing circuit 660 (which, as noted above, has a period greater than the maximum link delay difference between any two terminals in the system). When the "interrogate delay" pulse is accepted, the circuit increments interrogate counter 2210, then digital comparator 2220 determines if all terminals (there being a maximum of "N" terminals in the system) have been interrogated or not. If they haven't, the circuit again generates a "ready for interrogate command" signal. If they have, the circuit switches to the call mode.

In the call mode, a "start initial calls" pulse resets called terminal address counter 2250. Then, the circuit waits for a "start of frame" pulse from uplink timing 660. During the ensuing uplink frame period, the initial call detector 2270 circuit searches through all time slots in the time slot status memory 640 for a new call indication with the same terminal address as is in the called terminal address counter 2250. As determined by digital comparator 2280 initial call detector 2270 also monitors the output of terminal status memory 641 to determine if the called terminal is "inactive". If an initial call to an inactive terminal is detected, the circuit stores the terminal address, writes the time slot number in the time slot buffer memory 642, and sets the "initial fine sync" bit in the time slot status memory 640. If an initial call is not detected before the next start of frame pulse, the circuit increments the called terminal address counter and digital comparator 2260 determines if all terminals have been processed. If they haven't, the circuit waits for the "interrogate delay" pulse, then looks for an initial call again. If they have, the circuit switches back to the interrogate mode, resetting interrogate counter 2210. If an initial call had been detected, the terminal address and time slot number are stored, and the circuit generates a ready for initial call command signal. When the ready for initial call command signal (and terminal address from counter 2290) is accepted by programmer 651, the circuit waits for the interrogate delay pulse, then increments the called address counter 2250. Again, the circuit must determine by means of comparator 2260 whether all terminals have been called.

The TIME SLOT BUFFER MEMORY 642, shown in FIG. 24, stores the assigned time slot for an inactive terminal being called, in order that when the called terminal responds with a coarse sync signal, the assigned time slot number is immediately available to the synchronization and control field programmer 651 for transmission to the called terminal via control field 260 of wideband downlink 122.

The operation of the time slot buffer memory control 2400 is defined in the state diagram in FIG. 25, with FIG. 26 showing the corresponding timing diagram. The "write/read" (W/R) signal determines the write/-read mode of the memory 2410 and of the memory address selection circuit 2420. The read signal causes the contents of RAM No. 2 to be loaded into buffer register 2430, where it is available to programmer 651.

The COARSE SYNC SIGNAL IDENTIFICATION CONTROL CIRCUIT 622, shown in block diagram form in FIG. 27, performs the following functions: identifying the data terminal which transmitted the detected coarse sync signal, and controlling the transmission of the coarse sync error measurement to the data terminal. In the case of a called terminal, it also controls the transmission of the time slot assignment (from RAM No. 2) to the terminal.

The operation of control circuit 2700 is defined in the state diagram of FIG. 28. The coarse sync identification control circuit 2700 is synchronized by an identification (ID) sync pulse from interrogate and initial call controller 621. This assures that the identification counter 2710 always lags the interrogation counter 2210 (or counter 2250) by a fixed time period greater than the minimum two-way link delay. A "start interrogate ID detection" pulse is then generated to reset the ID counter 2710 and to start the interrogate ID detection cycle. The circuit then waits for a duration equal to the maximum link delay difference as established by the "interrogate delay" pulse. If a coarse sync signal is not detected within this maximum link delay difference time window, the ID counter is incremented. If a coarse sync signal is detected, the coarse sync measurement counter circuit 630 is activated. The terminal address is stored in buffer 2730 and at the start of the next time slot, that circuit will have stored the error measurement in its output buffers. A "calling terminal coarse sync ready" signal is also output to the time slot controller circuit 623, which will result in a time slot assignment (or all circuits busy) being accepted by programmer 651. When this occurs, the circuit waits for the rest of the interrogate delay period, then increments the ID counter 2710. It then waits for the next coarse sync detection, incrementing the counter 2710 after each interrogate delay period. If the ID counter 2710 has not sequenced through all possible terminals as determined by digital comparator 2720, control circuit 2700 waits (for the time period established by the interrogate delay pulse) for the next coarse sync signal detection.

When ID counter reaches the maximum number of terminals N, indicating that the coarse sync signal identification cycle has been completed for all the interrogated terminals, it generates a "start call ID detection" pulse and control circuit 2700 then switches to the call ID detection mode.

The call ID detection is begun when a start call ID detection pulse is generated at the end of the interrogate ID detection cycle, thereby resetting the ID counter 2710. The circuit then waits for a coarse sync detected signal. If coarse sync is detected the circuit operates the same as it did in the "interrogate ID detection" mode, except that the time slot number is already stored in the time slot buffer memory 642 and thus a "Ready for Initial T.S. Assignment (called terminal)" signal is output to programmer 651.

The COARSE SYNC ERROR MEASUREMENT COUNTER 630, shown in FIG. 29, measures the coarse sync error. The coarse sync error is the amount of time between the coarse sync signal transition 300 occurrence and the start of frame. This measurement is made by counting uplink bit timing clock pulses between the coarse sync detection and the start of the next time slot by means of counter 2910 and noting the number of time slots to the start of frame by means of subtractor 2920.

The operation of control block 2900 is defined in the state diagram of FIG. 30.

The TIME SLOT ASSIGNMENT CONTROL circuit 623 as is shown in block diagram form in FIG. 31, comprises a control block 3100 and a buffer register 3110. It performs the following functions: locating an available calling terminal time slot in the time slot memory 640 upon demand, buffer storing the assigned time slot number for eventual transmission by the synchronization and control field programmer 651, controlling the transmission of the time slot assignment, and controlling the transmission of an "all circuits busy" command. Time slot assignments are made when there is either a narrowband call request detected by the coarse sync identification control 622 or upon the detection of a wideband uplink call request by wideband call request detection control 624.

The operation of control circuit 3100 is defined in the state diagram of FIG. 32. Both narrowband call requests ("calling terminal coarse sync ready") and wideband call requests are processed in a similar manner. A call request advances this circuit to "wait for start of frame". The "start-of-frame" pulse initiates the time slot search. Control circuit 3100 monitors the "time slot available" bit read-out of time slot status memory 640 each time slot time to find an available calling terminal time slot. If an available time slot is not located by the next start of frame pulse, the circuit provides the appropriate "ready for all circuit busy" signal to synchronization and control field programmer 651. If an available time slot is located before the start of the next frame, the "time slot number" is loaded into buffer register 3110 and the respective data word in the time slot status memory is modified by loading the calling terminal address and modifying the status bits (if a narrowband call request is being processed, the "initial fine sync" bit is set and the "time slot available" bit is reset. If a wideband call request is being processed, the "phone number search" bit is set and the "time slot available" bit is reset). After writing into the time slot status memory 640, control circuit 3100 provides the appropriate (initial or supplement) "Ready for T.S. Assignment" signal. When the time slot assignment is accepted by the synchronization and control field programmer 651, circuit 3100 returns to its "wait for time slot request" state.

The FINE SYNC MEASUREMENT CONTROL 625 is shown in block diagram form in FIG. 33. It performs the following functions: controlling the detection of fine sync code, and controlling the transmission of fine sync error and subscriber address. The operation of the fine sync measurement controller 625 is defined in the state diagram of FIG. 34. When control circuit 3300 detects that the current time slot is in the "initial fine sync" mode (from the time slot status memory 640) and that the terminal is inactive (from the terminal status memory 641), it waits for a "fine sync search start" pulse. When this pulse occurs, the circuit waits for fine sync code occurrence. If the fine sync code is not detected by detector 614 before the end of the time slot, circuit 3300 returns to the "wait for initial fine sync-/terminal inactive" mode. If fine sync code is detected, the circuit stores the terminal address in buffer register 3310, the subscriber address, if relevant, in buffer register 3320 and the time slot number in buffer register 3330, then waits for start of time slot. At start of time slot, it waits for the coincidence as determined by digital comparator 3340 of the time slot number stored in register 3330 and the time slot number from time slot counter 1330 (a delay of slightly less than one frame). When coincidence occurs, the "phone number search" and "initial fine sync" bits in the time slot status memory 640 are set and reset respectively, and the terminal status memory 641 is incremented. The circuit then provides a "ready for fine sync error transmission" signal to synchronization and control field programmer 651. If a message accepted signal is received from the programmer and the terminal is a calling terminal (i.e., the time slot is the first of a circuit pair of therefore its LSB is a "0"), the circuit returns to the wait for initial fine sync and terminal inactive state. If a "fine sync error" accepted signal is received and the terminal is a called terminal (i.e., the time slot number is odd), control circuit 3300 provides a "ready for subscriber address transmission". When the "subscriber address accepted" signal is received, circuit 3300 returns to its "wait for initial fine sync and terminal inactive" state.

The FINE SYNC ERROR MEASUREMENT COUNTER 631, shown in block diagram form in FIG. 35, measures the fine sync error. The measurement may be positive or negative, indicating that the delay correction must be positive or negative respectively. This measurement is made by counting with counter 3510 the uplink bit time clock pulses between the "fine sync code occurrence" (detected by fine sync detectors 614) and the correct position occurrence as provided by the uplink bit timing 660. The sign bit in sign storage 3520 is set (+) or reset (−) depending on whether or not the fine sync code occurs prior to the correct position occurrence. The magnitude is output via buffer register 3530, measurement selection circuitry 3540 being provided with an all zero output in the event of simultaneous occurrence.

The operation of control circuit 3500 is defined in the state diagram of FIG. 36.

The TERMINAL STATUS MEMORY (RAM No. 3) 641, shown in block diagram form in FIG. 37, stores the inactive/active status of each terminal in the system. The terminal status is held in memory 3700 in terms of the number of active calls at each terminal. The status word is addressed by the terminal address portion of the data word in the time slot status memory output which is read during each time slot. The status word is temporarily stored in the up/down counter 3710. The up/down counter is incremented each time either a fine sync code, or supplemental call is detected or a wideband call request time slot assignment is made, and decremented each time a call termination is detected. Hence the terminal is active when the up/down counter has a count of one or greater and inactive when the count is zero.

The operation of the terminal status memory controller 3720 is defined in the state diagram in FIG. 38. Its associated timing diagram is given in FIG. 39.

The PHONE NUMBER DETECTION CONTROL circuit, shown in block diagram form in FIG. 40, performs the following functions: controlling the detection of the phone number, and controlling the loading of the phone number (terminal and subscriber addresses) in the time slot status memory 640.

The operation of the phone number detection controller 4010 is defined in the state diagram of FIG. 41. When "phone number search" is detected from the time slot status memory 640, circuit 4010 waits for the phone number search start pulse from the uplink bit timing 660. When the start pulse occurs, the circuit waits for the start of the phone number transmission as indicated by a "unique word occurrence" from burst synchronizer 610. If "phone number search stop" pulse from the uplink bit timing circuit 660 occurs before phone number occurrence, the circuit returns to the wait for phone number search mode. If phone number occurrence is detected before stop, the circuit stores the phone number in buffer register 4020. Then, the phone number search bit is reset in the time slot status memory 640. During the next time slot (i.e., the channel to be used by the called terminal) the phone number, including both terminal and subscriber addresses, is loaded into the time slot status memory 640, and the new call bit is set. The circuit then returns to the "wait for phone number search" mode.

The SYNCHRONIZATION MAINTENANCE CONTROL circuit 627 shown in block diagram form in FIG. 42, performs the following functions: controlling the detection of the unique word within the preamble of an uplink data burst, and controlling the transmission of synchronization maintenance error signals to all active terminals.

The operation of the synchronization maintenance controller 4200 is defined in the state diagram of FIG. 43. During each frame, this circuit waits for the coincidence between the terminal address output by the time slot status memory 640 and the address in the terminal selection counter 4210 as determined by digital comparator 4220. If the terminal is active, as determined by detector 4230, the circuit waits for the occurrence of the "maintenance search start" pulse. When this pulse occurs, the circuit waits for a unique code occurrence indication from burst code synchronizer 610. If a "maintenance search stop" pulse occurs before the unique word is detected, the circuit returns to the "wait for coincidence" mode. If unique word is detected before the "stop" pulse occurs, the terminal address at the output of the time slot status memory 640 is loaded in the buffer register 4240. The circuit then provides a "ready for fine sync maintenance transmission" signal. When the "fine sync maintenance accepted" signal is received, the circuit increments counter 4210 and waits for the next "start of frame" indication. It then returns to the "wait for coincidence" mode.

The MAINTENANCE ERROR MEASUREMENT COUNTER 632, shown in block diagram form in FIG. 44, measures the synchronization maintenance error. The measurement may be positive or negative, indicating that the delay correction must be positive or negative respectively. This measurement is made by counting the uplink bit time clock pulses between the unique word occurrence detected by burst code synchronizer 610 and the correct position occurrence, decoded in the uplink timing circuit 660.

The operation of this circuit is defined in the state diagram in FIG. 45. It is similar in operation to fine sync error measurement count 631, having a controller 4400, counter 4410, sign store 4420, output register 4430 and selection circuit 4440.

The CALL TERMINATION CONTROL shown in block diagram form in FIG. 46, performs the following functions: writing "time slot available" in the time slot status memory 640 for each of the particular time slot pair involved, and decrementing the terminal status memory 641 up/down counter. Call termination may be initiated by either call termination pattern occurrence or the initialization mode.

The operation of the call termination control 4600 is defined in the state diagram in FIG. 47. It should be noted that the initialization mode must remain "true" for sufficient duration (i.e., at least one frame time) to write "time slot available" in every data word in the time slot status memory 640 (actually, it lasts 300 milliseconds).

The WIDEBAND CALL REQUEST DETECTION CONTROL 624, shown in block diagram form in FIG. 48, performs the following functions: controlling the detection of the wideband call requests from active terminals, and controlling the transmission of the time slot assignment.

The operation of the wideband call request detection controller 4800 is defined in the state diagram of FIG. 49. This circuit detects when an active terminal is transmitting by monitoring the terminal status memory 641. When an active time slot is detected, the circuit waits for a "wideband call request detected" signal. If a call request is not detected, the circuit returns to the "wait for active time slot mode". If a call request is detected, it stores the terminal address from the time slot status memory 640 in buffer register 4810 and waits for the time slot assignment to be completed by synchronization and control field programmer 651, providing a "ready for time slot assignment" signal to the programmer. When time slot assignment is completed, the circuit returns to its "wait for active time slot" mode.

The SUPPLEMENTAL CALL CONTROL circuit 629, shown in block diagram form in FIG. 50, performs the following functions: detecting a supplemental call, and controlling the transmission of the supplemental call command, time slot assignment, and subscriber address.

The operation of the supplemental call control 5000 is defined in the state diagram in FIG. 51. The circuit waits for the concurrence of a "new call" and an "active terminal" indication from the time slot status memory 640 and the terminal status memory 641 respectively as determined by detector 5010. When this is detected, buffer registers 5020, 5021, and 5022 are loaded with the terminal address, subscriber address, and time slot number respectively, and the "new call" bit in the time slot status memory 640 is reset. The circuit then provides a "ready for supplemental call" signal to the synchronization and control field programmer 651. When this supplemental call request is accepted, controller 5000 next provides a "time slot ready" signal. When this is accepted by programmer 651, the "subscriber address ready signal" is provided. After the subscriber address has also been accepted by the programmer, supplemental call control circuit 5000 returns to the "wait for new call and active terminal" mode.

What is claimed is:

1. In a time division multiple access communication system having a plurality of data terminals, each terminal capable of transmitting an uplink burst of data within an assigned time slot, and all capable of receiving an essentially continuous stream of downlink data, a processing repeater for receiving a burst transmission from one of said data terminals and for transmitting it within a frame of said stream of data to another of said terminals, said processing repeater comprising:

means for generating a common timing standard;

means for receiving and demodulating uplink transmission bursts within assigned time slots;

means for detecting a predetermined unique word within each of said bursts;

means for measuring the synchronization error of the detected unique word within an uplink transmission burst from a particular one of said plurality of data terminals with respect to said common timing standard; and means for encoding the measured synchronization error as digital data within a synchronization and control field provided as part of said stream of data, whereby said particular data terminal is provided an indication of the timing correction required to maintain synchronization between the data bursts transmitted by said terminal and said common timing standard generated by said processing repeater.

2. The processing relay of claim 1 further comprising means for selecting which of successive ones of said data terminals is to have its uplink transmission burst synchronization error measured by said measuring means, whereby uplink transmission interference between said successive data terminals actively transmitting bursts of data may be avoided.

3. The processing relay of claim 2 further comprising:

means for assigning a second time slot to a data terminal already transmitting data bursts in a first assigned time slot; and means for encoding a digital representation of the second assigned time slot as part of said stream of downlink data.

4. The processing relay of claim 2 further comprising:

means for assigning an initial time slot to a data terminal not already transmitting data bursts in an assigned time slot;

means for encoding a digital representation of the initial time slot assignment as part of said stream of downlink data.

5. In a communications satellite adapted for use in a time division multiple access communications system, the combination comprising:

means for receiving and demodulating wideband uplink data bursts;

means for establishing synchronization between various ones of said data bursts originating from different data terminals such that they are received by said satellite sequentially in a non-overlapping fashion separated by a guard time;

means for buffering and encoding said data bursts as part of a downlink stream of free from any guard time intervals having a narrower bandwidth than that of said data bursts; and means for transmitting said downlink stream of data.

6. In the satellite of claim 5:

means for receiving and demodulating a narrowband coarse synchronization burst from a particular data terminal;

coarse synchronization error detection means responsive to a received narrow-band burst for measuring coarse synchronization error between said data terminal and said spacecraft with an accuracy better than a single uplink time slot duration;

means for encoding a digital representation of said measured coarse synchronization error as part of said downlink stream of data;

means for receiving and demodulating a wide-band fine synchronization burst;

means for measuring the fine synchronization error associated with said fine synchronization burst; and means for encoding a digital representation of said measured fine synchronization error as part of said downlink stream of data, whereby fine synchronization between said data terminal and said satellite to an accuracy better than an average unlink guard time duration may be attained.

* * * * *